United States Patent
Pyun et al.

(10) Patent No.: US 11,078,333 B2
(45) Date of Patent: Aug. 3, 2021

(54) COPOLYMERIZATION OF ELEMENTAL SULFUR TO SYNTHESIZE HIGH SULFUR CONTENT POLYMERIC MATERIALS

(71) Applicant: ARIZONA BOARD OF REGENTS ON BEHALF OF THE UNIVERSITY OF ARIZONA, Tucson, AZ (US)

(72) Inventors: Dong-Chul Pyun, Tucson, AZ (US); Richard S. Glass, Tucson, AZ (US); Robert A. Norwood, Tucson, AZ (US); Jared J. Griebel, Tucson, AZ (US); Soha Namnabat, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 64 days.

(21) Appl. No.: 15/744,398

(22) PCT Filed: Jul. 13, 2016

(86) PCT No.: PCT/US2016/042057
§ 371 (c)(1),
(2) Date: Jan. 12, 2018

(87) PCT Pub. No.: WO2017/011533
PCT Pub. Date: Jan. 19, 2017

(65) Prior Publication Data
US 2018/0208686 A1    Jul. 26, 2018

Related U.S. Application Data

(60) Provisional application No. 62/329,402, filed on Apr. 29, 2016, provisional application No. 62/313,010, (Continued)

(51) Int. Cl.
*C08G 75/14* (2006.01)
*C08G 75/16* (2006.01)
(Continued)

(52) U.S. Cl.
CPC .............. *C08G 75/14* (2013.01); *C08F 12/08* (2013.01); *C08F 12/30* (2013.01); *C08F 212/08* (2013.01);
(Continued)

(58) Field of Classification Search
CPC .... C08F 230/04; C08F 228/02; C08F 228/04; C08F 228/06; C08G 75/16; C08G 75/14; C08G 75/00; C08G 79/00
See application file for complete search history.

(56) References Cited

U.S. PATENT DOCUMENTS 2,779,761 A    1/1957 Kibler
2,989,513 A    6/1961 Hendry et al.
(Continued)

FOREIGN PATENT DOCUMENTS

CN    104713968 A1    6/2015
EP    0806451 A1    11/1997
(Continued)

OTHER PUBLICATIONS

Laitinen, Risto S. "Selenium Sulfide Ring Molecules" 1987, Acta Chemica Scandinavica, A41, p. 361-376) (Year: 1987).*
(Continued)

*Primary Examiner* — Ling Siu Choi
*Assistant Examiner* — David L Miller
(74) *Attorney, Agent, or Firm* — Nguyen Tarbet LLC

(57) ABSTRACT

Copolymerization of elemental sulfur with functional comonomers afford sulfur copolymers having a high molecular weight and high sulfur content. Nucleophilic activators initiate sulfur polymerizations at relative lower temperatures and in solutions, which enable the use of a wider range of comonomers, such as vinylics, styrenics, and non-homopolymerizing comonomers. Nucleophilic activators promote ring-opening reactions to generate linear poly-
(Continued)

sulfide intermediates that copolymerize with comonomers. Dynamic sulfur-sulfur bonds enable re-processing or melt processing of the sulfur polymer. Chalcogenide-based copolymers have a refractive index of about 1.7-2.6 at a wavelength in a range of about 5000 nm-8μπι. The sulfur copolymer can be a thermoplastic or a thermoset for use in elastomers, resins, lubricants, coatings, antioxidants, cathode materials for electrochemical cells, dental adhesives/ restorations, and polymeric articles such as polymeric films and free-standing substrates. Optical substrates are constructed from the chalcogenide copolymer and are substantially transparent in the visible and infrared spectrum.

18 Claims, 22 Drawing Sheets

Related U.S. Application Data filed on Mar. 24, 2016, provisional application No. 62/306,865, filed on Mar. 11, 2016, provisional application No. 62/212,188, filed on Aug. 31, 2015, provisional application No. 62/210,170, filed on Aug. 26, 2015, provisional application No. 62/203,525, filed on Aug. 11, 2015, provisional application No. 62/191,760, filed on Jul. 13, 2015.

(51) Int. Cl.

| *C08G 79/00* | (2006.01) |
|---|---|
| *C08L 81/04* | (2006.01) |
| *C08F 12/08* | (2006.01) |
| *C08F 212/08* | (2006.01) |
| *C08G 75/00* | (2006.01) |
| *H01M 10/052* | (2010.01) |
| *C08L 81/00* | (2006.01) |
| *H01M 4/60* | (2006.01) |
| *H01M 4/38* | (2006.01) |
| *C08F 12/30* | (2006.01) |
| *C08K 3/06* | (2006.01) |
| *C08F 228/04* | (2006.01) |
| *C08F 228/06* | (2006.01) |
| *C08F 228/02* | (2006.01) |
| *C08F 230/04* | (2006.01) |
| *C08F 2/38* | (2006.01) |
| *C08F 2/44* | (2006.01) |

(52) U.S. Cl.
CPC ............ *C08G 75/00* (2013.01); *C08G 75/16* (2013.01); *C08G 79/00* (2013.01); *C08K 3/06* (2013.01); *C08L 81/00* (2013.01); *C08L 81/04* (2013.01); *H01M 4/38* (2013.01); *H01M 4/602* (2013.01); *H01M 10/052* (2013.01); *C08F 2/38* (2013.01); *C08F 2/44* (2013.01); *C08F 228/02* (2013.01); *C08F 228/04* (2013.01); *C08F 228/06* (2013.01); *C08F 230/04* (2013.01); *H01M 4/382* (2013.01)

(56) References Cited

U.S. PATENT DOCUMENTS

| 3,251,797 | A | 5/1966 | De Pugh et al. |
|---|---|---|---|
| 3,290,266 | A | 12/1966 | Barnes et al. |
| 3,542,701 | A | 11/1970 | van Raamsdonk |
| 3,563,962 | A | 2/1971 | Mirviss |
| 3,767,613 | A | 10/1973 | Dix et al. |
| 3,892,686 | A | 7/1975 | Woo |
| 4,000,347 | A | 12/1976 | Ranney et al. |
| 4,094,751 | A | 6/1978 | Nozik |
| 4,238,585 | A | 12/1980 | Bertozzi |
| 4,346,191 | A | 8/1982 | Blount |
| 4,382,846 | A | 5/1983 | Gratzel et al. |
| 4,568,435 | A | 2/1986 | Shelnutt |
| 4,606,798 | A | 8/1986 | Sasse et al. |
| 4,671,896 | A | 6/1987 | Hasegawa et al. |
| 4,749,347 | A | 6/1988 | Valavaara |
| 4,752,507 | A | 6/1988 | Johansson et al. |
| 4,833,048 | A | 5/1989 | DeJonghe et al. |
| 5,115,060 | A | 5/1992 | Grey |
| 5,121,329 | A | 6/1992 | Crump |
| 5,279,910 | A | 1/1994 | Sasaki et al. |
| 5,371,176 | A | 6/1994 | Bezwada et al. |
| 5,362,493 | A | 11/1994 | Skotheim et al. |
| 5,811,470 | A | 9/1998 | Prindle et al. |
| 5,929,202 | A | 7/1999 | Arita et al. |
| 6,011,094 | A | 1/2000 | Planche et al. |
| 6,072,026 | A | 6/2000 | Kawase et al. |
| 6,111,030 | A | 8/2000 | Hartman et al. |
| 9,306,218 | B2 | 4/2016 | Pyun et al. |
| 9,463,597 | B2 | 10/2016 | Van De Vrie et al. |
| 9,567,439 | B1 | 2/2017 | Pyun et al. |
| 2001/0047043 | A1 | 11/2001 | Okoroafor et al. |
| 2001/0047403 | A1 | 11/2001 | Okoroafor et al. |
| 2002/0039680 | A1 | 4/2002 | Hwang et al. |
| 2007/0010600 | A1 | 1/2007 | Goodman et al. |
| 2007/0253772 | A1 | 11/2007 | Kubo et al. |
| 2008/0038645 | A1 | 2/2008 | Kolosnitsyn et al. |
| 2010/0029163 | A1 | 2/2010 | Ogle et al. |
| 2010/0331515 | A1* | 12/2010 | Takeuchi ............... C08G 75/08 528/374 |
| 2011/0245360 | A1 | 10/2011 | Hahn et al. |
| 2011/0263755 | A1 | 10/2011 | Mohamed et al. |
| 2012/0264837 | A1 | 10/2012 | Eberstaller et al. |
| 2013/0040197 | A1 | 2/2013 | Liu et al. |
| 2013/0064904 | A1 | 3/2013 | Gojon-Romanillos et al. |
| 2014/0110881 | A1 | 4/2014 | Keledjian et al. |
| 2014/0199592 | A1 | 7/2014 | Pyun et al. |
| 2015/0203638 | A1 | 7/2015 | Sivanandan et al. |
| 2018/0079865 | A1 | 3/2018 | Pyun |
| 2018/0105649 | A1 | 4/2018 | Pyun et al. |

FOREIGN PATENT DOCUMENTS

| EP | 1882713 A1 | 1/2008 | |
|---|---|---|---|
| EP | 2093605 A1 | 8/2009 | |
| EP | 2896644 A1 | 7/2015 | |
| GB | 1203577 A | 8/1970 | |
| GB | 1516554 A | 7/1978 | |
| WO | WO1995018652 A1 | 7/1995 | |
| WO | WO2007076067 A3 | 7/2007 | |
| WO | WO2009158385 A | 12/2009 | |
| WO | 2013023216 A1 | 2/2013 | |
| WO | WO-2013023216 A1 * | 2/2013 | ............ H01M 4/382 |
| WO | WO2013023216 A1 | 2/2013 | |
| WO | WO2013155038 A1 | 10/2013 | |
| WO | WO2014052255 A1 | 4/2014 | |
| WO | WO2014179100 A1 | 11/2014 | |
| WO | WO2015123552 A1 | 8/2015 | |

OTHER PUBLICATIONS

Chung, W.J. et al., "Elemental Sulfur as a Reactive Medium for Gold Nanoparticles and Nanocomposite Materials", Angewandte Chemie International Edition, 2011, 50, 11409-11412.

Colquhoun, Howard M., "Materials that heal themselves", Nature Chemistry, Jun. 2012, vol. 4, 435-436.

Yang, Ying and Urban Marek W., "Self-healing polymeric materials", Chem. Soc. Rev., 2013, 42, 7446-7467.

Hasegawa, Urara and Van Der Vlies, André J., "Design and Synthesis of Polymeric Hydrogen Sulfide Donors", Bioconjugate Chemistry, 2014, 25 (7), 1290-1300.

Foster, Jeffrey C., et al., "S-Aroylthiooximes: A Facile Route to Hydrogen Sulfide Releasing Compounds with Structure-Dependent Release Kinetics", Organic Letters. 2014, 16, 1558-1561.

(56) References Cited

OTHER PUBLICATIONS

Wurthner, F., "Perylene bisimide dyes as versatile building blocks for functional supramolecular architectures", Chem. Commun. 2004, 1564-1579.
Chung, W.-. et al., "The use of elemental sulfur as an alternative feedstock for polymeric materials", Nature Chemistry 2013, vol. 5, 518-524.
Simmonds, A.G. et al., "Inverse Vulcanization of Elemental Sulfur to Prepare Polymeric Electrode Materials for Li—S Batteries", ACS Macro Lett. 2014, 3, 229-232.
Liu, G. et al., "α-Sulfur Crystals as a Visible-Light-Active Photocatalyst", J. Am. Chem. Soc. 2012, 134, 9070-9073.
Asmus, K.-D., "Pulse Radiolysis Methodology", Methods in Enzymology 1984, 105, 167-178.
Nishide, et al., "Toward Flexible Batteries", (2008) Science, vol. 319, 737-738.
Niishide, et al., "Emerging N-Type Redox-Active Radical Polymer for a Totally Organic Polymer-Based Rechargeable Battery", (2009), Adv Mater, 21, 1627-1630.
Tarascon, et al., "Key challenges in future Li-battery research", (2010) Phil Trans R Soc A, 368, 3227.
Bacon, et al., "The Viscosity of Sulfur", (1943) J Am Chem Soc, 65, 639.
Eyring, et al., "The Properties of Liquid Sulfur", (1943) J Am Chem 65, 648.
Tobolsky, A. V. et al., "Equilibrium Polymerization of Sulfur", Am. Chem. Soc.1959, 81, 780.
Penczek, et al. (1974) Nature, 273, 738.
Nazar et al., "A highly ordered nanostructured carbon-sulphur cathode for lithium-sulphur batteries", Nature Mater. 2009, 8, 500-506.
Scrosati, et al., "A High-Performance Polymer Tin Sulfur Lithium Ion Battery", Angew. Chem. Int. Ed. 2010, 49, 2371-2374.
Chen, et al., J. Phys. Chem. C 2011, 115, 6057-6063.
Yang, et al., ACS Nano 2011, 5, 9187-9193.
Bartlett, et al., (1956) J Am Chern Soc, 78, 3710.
McGrath, et al. (2006) Polymer, 47, 4042.
Ueda et al., (2009) J Mater Chem, 19, 8907.
Trofimov, et al. (2002) "Sulfur-rich copolymers of sulfur with 5-vinylbicyclo hept-2-ene and tricyclo deca-3,8-diene as prospective cathode materials for lithium cells," Sufur Letters, 25: 219-227.
Ning, et al., (2004) "Novel cathode material based on chloropolystyrene," PMSE Preprints, American Chemical Society 90: 396-397.
Wang, et al., Nano Lett. 2011, 11, 2644-2647.
Zheng, et al., Nano Lett. 2011, 11, 4462-4467.
Li, et al., Proc. Nail. Acad. Sci. U.S.A. 2013, 110, 7148-7153.
Zheng, et al., Nano Lett. 2013, 13, 1265-1270.
Zhou, et al., ACS Nano 2013, 7, 8801-8808.
Seh, et al., Nat. Commun. 2013, 4.
Li, et al., Nano Lett. 2013, 13, 5534.
Liu, et al., Nat. Nanolech. 2014, 9, 187.
Pyun, J. Angew. Chem Int. Ed., 2011, 50, 11409-11412.
Woo et al. Nature Chemistry. Jun. 2013. vol. 5, pp. 518-524. Published online Apr. 14, 2013.
Suzuki et al. Hydrogen generation using water-insoluble polymer-bound ruthenium(ii) Complexes. Chemical Communications, 1997, Issue 2, p. 227.
Suzuki et al. Photoinduced hydrogen generation from water-insoluble polymer photosensitizer films. Polymer, 1998, vol. 39, Issue 8, p. 1539-1543.
Suzuki et al. Photoinduced hydrogen generation using polymer photosensitizers. Macromolecular Chemistry and Physics, Jun. 1998, vol. 199, Issue 6.
Wang et al. A metal-free polymeric photocatalyst for hydrogen production from water under visible light. Nature Materials 8, 76-80 (2009).
Goldsmith et al. Discovery and High-Throughput Screening of Heteroleptic Iridium Complexes for Photoinduced Hydrogen Production. J. Am. Chem. Soc., 2005, 127 (20), pp. 7502-7510.
Tinker et al. Visible Light Induced Catalytic Water Reduction without an Electron Relay. Chemistry—A European Journal, 2007, vol. 13, Issue 31, pp. 8726-8732.
Happ et al. Towards Hydrogen Evolution Initiated by LED Light: 2-(1 H -1,2,3-Triazol-4-yl)pyridine containing Polymers as Photocatalyst. Macromolecular Rapid Communications, Apr. 2015, vol. 36, Issue 7, 671-677.
Aguirre De Carcer et al. Active-Site Models for Iron Hydrogenases: Reduction Chemistry of Dinuclear Iron Complexes. Inorg. Chem., 2006, 45 (20), pp. 8000-8002.
Alongia et al. Caseins and hydrophobins as novel green flame retardants for cotton fabrics. Polymer Degradation and Stability vol. 99, Jan. 2014, pp. 111-117.
Beom-Young Ryu and Todd Emrick. Thermally Induced Structural Transformation of Bisphenol-1,2,3-triazole Polymers: Smart, Self-Extinguishing Materials. Angew. Chem. Int. Ed. 2010, 49, 9644-9647.
Laufer et al. Clay-Chitosan Nanobrick Walls: Completely Renewable Gas Barrier and Flame-Retardant Nanocoatings. ACS Appl. Mater Interfaces 2012, 4, 1643-1649.
Laufer et al. Exceptionally Flame Retardant Sulfur-Based Multilayer Nanocoating for Polyurethane Prepared from Aqueous Polyelectrolyte Solutions. ACS Macro Lett., 2013, 2 (5), pp. 361-365.
Li et al. Intumescent All-Polymer Multilayer Nanocoating Capable of Extinguishing Flame on Fabric. Adv. Mater. 2011, 23, 3926-3931.
Ding et al. Photoelectrocatalytic Water Splitting: Significance of Cocatalysts, Electrolyte, and Interfaces. ACS Catal. 2017, 7, 675-688.

\* cited by examiner structure:
Poly(S-r-Sty) is branched with terminal, linear and branched microstructure Mechanistic Questions:
Reversible thiol-ene reactions that result in abstraction of hydrogen atoms from polystyrene backbone that affords branching and cyclic sulfides (S-S bonds)

Observed: $^1$H NMR integration indicates loss of methine backbone protons

FIG. 7
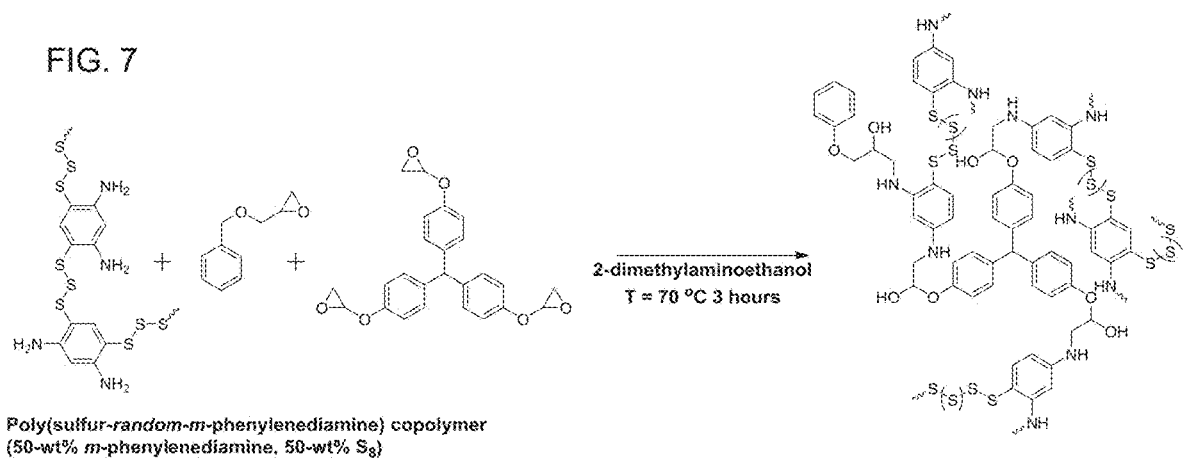
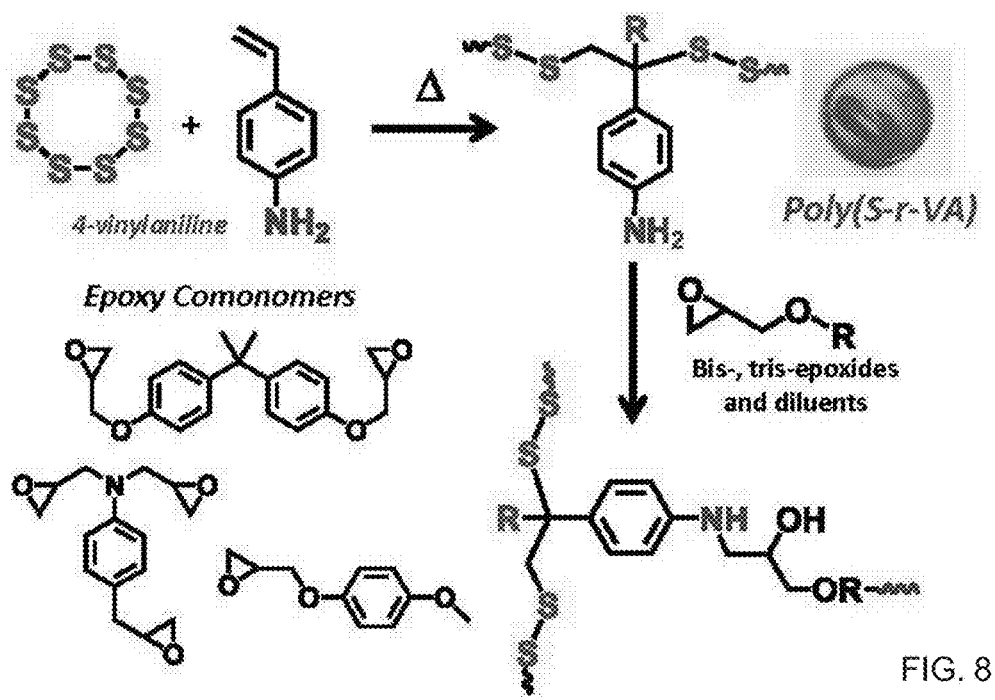
FIG. 8
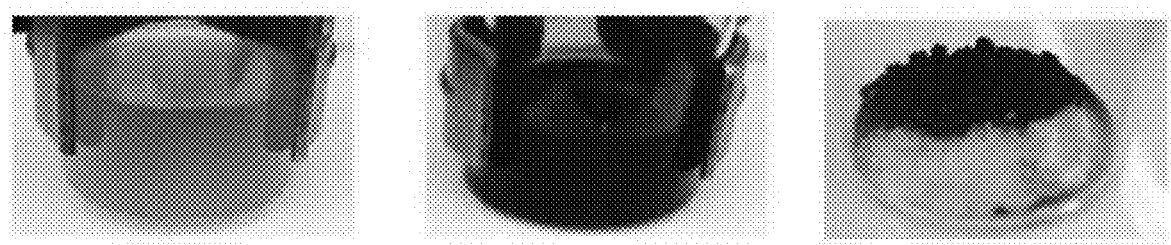
FIG. 9

Poly(S-r-Se-r-DIB) Copolymers

Controlled # of S-S bonds and C-H bonds

Amorphous, high refractive index copolymer

COPOLYMERIZATION OF ELEMENTAL SULFUR TO SYNTHESIZE HIGH SULFUR CONTENT POLYMERIC MATERIALS

CROSS REFERENCE

This application claims priority to U.S. Provisional Patent Application No. 62/191,760 filed Jul. 13, 2015, U.S. Provisional Patent Application No. 62/203,525 filed Aug. 11, 2015, U.S. Provisional Patent Application No. 62/210,170 filed Aug. 26, 2015, U.S. Provisional Patent Application No. 62/212,188 filed Aug. 31, 2015, U.S. Provisional Patent Application No. 62/306,865 filed Mar. 11, 2016, U.S. Provisional Patent Application No. 62/313,010 filed Mar. 24, 2016, and U.S. Provisional Patent Application No. 62/329,402 filed Apr. 29, 2016, the specification(s) of which is/are incorporated herein in their entirety by reference.

GOVERNMENT SUPPORT

This invention was made with government support under Grant No. CHE1305773 awarded by NSF. The government has certain rights in the invention.

FIELD OF THE INVENTION

The present invention relates to polymeric compositions and materials prepared from elemental sulfur. Methods of forming sulfur copolymers utilize sulfur polymerizations with nucleophilic activators that can solubilize elemental sulfur, enhance rate of reactions and widen the scope of accessible comonomers that can copolymerize with elemental sulfur. The attractive chemical accessibility and functional diversity of styrenic comonomers and non-homopolymerizing comonomers are used with elemental sulfur to prepare a new chemical platform for sulfur-based polymeric materials and to further enable post-polymerization modifications for improving the properties of sulfur-based materials.

The present invention further relates to polymeric materials prepared from sulfur copolymers and chalcogenides having a high refractive index in the visible and infrared (IR) regime and the ability to mitigate IR absorbance in the IR optical window. Furthermore, the polymeric materials of the present invention are amendable to melt and solution processing to fabricate optical materials such as lenses, films, and optical fibers, for use in optical applications such as imaging.

BACKGROUND OF THE INVENTION

An incredible abundance of elemental sulfur, nearly 7-million tons is generated as a waste byproduct from hydrodesulfurization of crude petroleum feedstocks, which converts alkanethiols and other (organo) sulfur compounds into $S_8$. Before the invention of the inverse vulcanization process, there were only a limited number of synthetic methods available to utilize and modify elemental sulfur. Current industrial utilization of elemental sulfur is centered around sulfuric acid, agrochemicals, and vulcanization of rubber. For example, elemental sulfur is used primarily for sulfuric acid and ammonium phosphate fertilizers, where the rest of the excess sulfur is stored as megaton-sized, above ground sulfur towers.

While sulfur feedstocks are plentiful, sulfur is difficult to process. In its original form, elemental sulfur consists of a cyclic molecule having the chemical formulation $S_8$. Elemental sulfur is a brittle, intractable, crystalline solid having poor solid state mechanical properties, poor solution processing characteristics, and there is a limited slate of synthetic methodologies developed for it. Hence, there is a need for the production of new materials that offers significant environmental and public health benefits to mitigate the storage of excess sulfur in powder, or brick form.

Elemental sulfur has been explored for use in lithium-sulfur electrochemical cells. Sulfur can oxidize lithium when configured appropriately in an electrochemical cell, and is known to be a very high energy-density cathode material. The poor electrical and electrochemical properties of pure elemental sulfur, such as low cycle stability and poor conductivity) have limited the development of this technology. For example, one key limitation of lithium-sulfur technology is the ability to retain high charge capacity for extended numbers of charge-discharge cycles ("cycle lifetimes"). Cells based on present lithium ion technology has low capacity (180 mAh/g) but can be cycled for 500-1000 cycles. Lithium-sulfur cells based on elemental sulfur have very high initial charge capacity (in excess of 1200 mAh/g, but their capacity drops to below 400 mAh/g within the first 100-500 cycles. Hence, the creation of novel polymer materials from elemental sulfur feedstocks would be tremendously beneficial in improving sustainability and energy practices. In particular, improved battery technology and materials that can extend cycle lifetimes while retaining reasonable charge capacity will significantly impact the energy and transportation sectors and further mitigate US dependence on fossil fuels.

There have been several recent attempts to form sulfur into nanomaterials for use as cathodes in lithium-sulfur electrochemical cells, such as impregnation into mesoporous carbon materials, encapsulation with graphenes, encapsulation into carbon spheres, and encapsulation into conjugated polymer spheres. While these examples demonstrate that the encapsulation of elemental sulfur with a conductive colloidal shell in a core/shell colloid can enhance electrochemical stability, these synthetic methods are challenging to implement to larger scale production required for industrial application. Hence, a new family of inexpensive, functional materials obtained by practical methods is desirable.

Reported styrenic polymers consumption in 2013 was estimated to be about 35,007 kilotons and will grow by 4.81% annually till 2018. Some key factors driving the styrenic polymer market are increasing global demand, particularly in Asia, lack of competitive substitutes that can replace styrenic polymers, and growing use in various applications. For example, styrenic polymers can be used in the manufacturing of packaging, consumer goods, tires, pipes and tanks, marine accessories, wind blades, rotors, ventilators etc. Moreover, styrenics are inexpensive and are available in a wide family of functional derivatives for use as reagents in the chemical and polymer industry. The demand for styrenic polymers coupled to the overabundance of elemental sulfur can be resolved with the novel sulfur-styrenic polymers of the present invention. This new discovery with styrenics can lead to an entirely new platform of functional sulfur-styrenic polymers with exemplary applications in improved batteries and tougher plastics.

Conventional, industrially-used vinyl comonomers, such as styrenics and (meth)acrylics, do not readily copolymerize with sulfur when conducted in solution copolymerizations and are often insoluble in liquid sulfur at elevated temperatures. Instead, these comonomers tend to homopolymerize, particularly when the copolymerization is conducted in a solution. As used herein, the term "homopolymerize" is defined as the polymerization of monomer units from the same monomer. The term "copolymerize" refers to the polymerization of monomer units of two or more different monomers. While a number of conventional vinylic comonomers are capable of reacting with sulfur via free radical processes, either in liquid sulfur or in solution, the resulting sulfur polymer tends to have a low molar mass, i.e. less than 2,000 g/mol. Low molecular weight polymers can have limited functionalities, hence, higher molecular weight polymers are more desirable. For example, as known to one of ordinary skill in the art, higher molecular weight polymers can have improved mechanical properties than that of lower molecular weight polymers. Therefore, there is a need for high, molecular weight and functional sulfur polymers derived from the copolymerizations of sulfur and unsaturated monomers that can copolymerize free-radically with sulfur, or polymeric sulfur radicals, but cannot homopolymerize via free radical processes during these copolymerization reactions.

Previous works have shown that elemental sulfur can be used in its molten form at elevated temperature (T>120° C.) and directly used as the reaction medium to react with other comonomers at elevated temperature (T≈120-180° C.). However, the synthetic chemistry of this process is limited to comonomers that are soluble in liquid sulfur at elevated temperatures. Comonomers such as vinylic, styrenic and (meth)acrylic comonomers that are commonly used in the polymer chemical industry for free radical polymerizations are typically not miscible with liquid sulfur, and hence, are not suitable for preparing sulfur copolymers. For example, since copolymerizations reactions must be conducted above the melting point of sulfur (T>120° C.), a large number of important industrial monomers (e.g. methacrylates, acrylonitrile) are excluded from forming sulfur copolymers due to their low boiling points (i.e. these comonomers would boil, or be chemically unstable if heated to T=120° C.). Previous attempts to conduct copolymerizations of these commercial comonomers while dissolved in a co-solvent (to homogenize the medium with sulfur) do not proceed, since dilution of elemental sulfur greatly reduces the rate of these polymerizations and suppresses formation of reactive sulfur radicals.

The present invention features a novel method of forming sulfur copolymers using nucleophilic activators that promote polymerization of elemental sulfur with comonomers, in particular, with challenging comonomers. The methods described herein exploit the reactivity of reactive intermediates generated by the nucleophilic ring-opening of elemental sulfur with nucleophiles, such as amines, to access new polymerization chemistry. The closest technology is from the known areas of rubber vulcanization for tire production, where accelerators are used to promote cross-linking of sulfur with the rubber phase. Elemental sulfur can be solubilized using nucleophilic activators to form sulfur copolymers by promoting miscibility and polymerization of elemental sulfur with comonomers that are of industrial interest, such as styrenics, methacrylates, acrylates, vinyl ethers, vinyl esters and functional vinylic comonomers (e.g., acrylonitrile). Moreover, theses copolymerizations may be conducted with conventional solvents and at much lower temperatures (T≤130° C.). Since current plastics are solely derived from dwindling fossil fuel feedstocks, the huge surfeit of elemental sulfur may be used as an alternative feedstock to prepare a new class of sulfur plastics. Utilization of these sulfur plastics as electrode components in Li—S batteries may exhibit significant improved battery performance.

Development of polymeric materials for infrared (IR) optical applications has not been achieved due to challenges in designing systems with sufficiently high refractive index (n) and transparency in the IR spectral regime. To date, organic plastics exhibit poor performance in the optical window of 1 to 10 μm due to strong IR absorption from the plastic material. IR optical technology has numerous potential applications in the civil, medical, and military areas, where inorganic semiconductors (e.g., Ge, Si) and chalcogenide glasses have been widely used as materials for device components due to their high refractive index (n~2.0-4.0) and low losses from 1-10 μm. Other examples of glass materials currently in use are InSb, InGaAs, HgCdTe, ArSe, and ArS. While such materials are well suited for these applications, they are inherently more expensive, toxic, and difficult to process in comparison to organic or organic/inorganic hybrid polymeric materials.

Sulfur has an inherently high refractive index (n is about 1.9-2.0), which is significantly higher than all organic plastic materials. Moreover, the S—S bonds are largely IR inactive in this same optical window. Therefore, it is desirable to use elemental sulfur as the chemical feedstock for these materials was desirable due to both the low cost of $S_8$ and favorable optical properties. However, sulfur is inherently difficult to process into films and molded objects, and previous synthetic methods have limited abilities to incorporate sulfur and create polymers with a high content of S—S bonds. There remains a need to improve the optical properties of these polymers to enable the development of these types of materials for mid-IR applications.

Using the inverse vulcanization method, sulfur is enabled to be prepared into chemically stable polymer plastic materials with tunable optical and thermochemical properties by simply controlling the feed ratios of the chemical monomers added to the sulfur monomers. The resulting sulfur copolymer may be fabricated into useful optical devices such as films, waveguides, and molded (nano, micro-) objects and lenses. Currently, chalcogenide glasses are the primary material of choice for IR optics in the 3-5 micron range since all organic polymers strongly absorb in the IR optical regime. The chalcogenide-based copolymers of the present invention exhibits superior processing advantages over chalcogenide glasses since the chalcogenide-based copolymer may be solution or melt processed at relatively lower temperatures.

Chalcogenide-based copolymers can utilize selenium to provide for the optical properties. The polymerization of liquid $S_8$ and elemental selenium ($Se_8$) to form the chalcogenide copolymer greatly increases the refractive index of said copolymers. However, $Se_8$ is expensive, and can be challenging to work with since it exhibits different reactivity than $S_8$ and other comonomers. Therefore, there is a need for cheaper and simpler solution to incorporate Se units to form the chalcogenide copolymers. While the homopolymerization of elemental sulfur or elemental selenium ($Se_8$) are known, the polymerization of cyclic selenium sulfides has not been explored. Using the inverse vulcanization method, cyclic selenium-sulfides are shown to be a viable comonomer to prepare chemically stable polymer plastic materials with tunable optical and thermochemical properties by controlling the feed ratios of the chemical monomers added. The resulting chalcogenide-based copolymer may be fabricated into useful optical devices such as films, waveguides, and molded (nano-, micro-) objects and lenses.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

It is an objective of the present invention to provide for functional sulfur polymers having a high molecular weight and sulfur content, and methods of making said sulfur polymers. Embodiments of the invention are given in the dependent claims. Embodiments of the present invention can be freely combined with each other if they are not mutually exclusive.

The copolymerization of elemental sulfur with functional styrenics, when in liquid sulfur or when dissolved in solution, can afford new functional sulfur-styrenic polymers carrying side chain groups thru the styrenic units. New functional groups that can be introduced into these sulfur-styrenic polymers include halogens (X=Cl, Br, F), amines (—NH$_2$), alkoxy groups (—OCH$_3$), carboxylic acids, carboxylate salts, sulfonic acids, sulfonate salts, quaternary ammonium salts, ethers, oligo-ethers, polyethers, polyamines, esters, amides, and alcohols.

The presence of one vinyl group, coupled with the unexpected polymerization mechanism of benzylic proton abstraction from the polymer backbone can provide a novel approach to prepare sulfur-styrenic polymers. A wide range of functional sulfur-styrenic polymer materials can be prepared by direct copolymerization of a styrenic comonomer with sulfur, or post-polymerization modification of the sulfur-styrenic polymer with other monomers (e.g., aniline, epoxides, isocyanates).

In one embodiment, the present invention features a sulfur polymer comprising about 10-95 wt % of sulfur monomers, and about 5-50 wt % of non-homopolymerizing monomers. The non-homopolymerizing monomers can copolymerize with the with the sulfur monomers, via free radical polymerization, to form the sulfur polymer having a molar mass of at least 2,000 g/mole.

In another embodiment, the present invention features a sulfur polymer comprising about 10-95 wt % of sulfur copolymers, and about 5-50 wt % of non-homopolymerizing monomers. The non-homopolymerizing monomers can copolymerize with the sulfur copolymers, via free radical polymerization, to form the sulfur polymer. Preferably, the sulfur polymer has a molar mass of at least 2,000 g/mole. In some embodiments, the sulfur copolymers comprises sulfur monomers at about 10-95 wt % of the sulfur copolymers, and one or more comonomers at about 5-50 wt % of the sulfur copolymers. The comonomers may be amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, and acrylonitrile comonomer, wherein the one or more comonomers are copolymerized with the sulfur monomers.

In some embodiments, the non-homopolymerizing monomers are ethylenically unsaturated monomers, such as maleimide monomers, norbornene monomers, allylic monomers, monomers having at least one vinyl ether moiety, and monomers having at least one isopropenyl moiety.

One of the unique inventive technical features of the present invention is the use of non-homopolymerizing monomers. Without wishing to limit the invention to any theory or mechanism, it is believed that this technical feature of the present invention advantageously provides for a sulfur polymer having a high molecular weight, high sulfur content, and improved functionality, particularly for copolymerizations done in solution (i.e., organic aromatic solvents). Further, the non-homopolymerizing monomers can incorporate new functional groups in the sulfur polymer. For example, inexpensive and commercially available allylic monomers are monomers that are unable to polymerize with its own monomers, but can readily copolymerize with sulfur or sulfur copolymer radicals via free radical polymerizations. The wide range of functional allylic monomers can provide for functional sulfur polymers. Other examples of non-homopolymerizing monomers include, but are not limited to, isopropenyls, maleimides, norbornenes, vinyl ethers, and methacrylonitriles.

Novel chemical synthetic processes to dramatically expand the scope of functional comonomers and copolymers that can be prepared to convert elemental sulfur ($S_8$) into polymeric materials are described herein. Previous synthetic systems required synthetic methods to be conducted in liquid sulfur and at very high temperatures (T~180° C.), which dramatically limits the range of comonomers that can be reacted with sulfur to make polymeric materials. By using nucleophilic activators, elemental sulfur can be activated toward polymerization at lower temperatures (T≤130° C.) and at lower concentrations, which allows for polymerizations to be performed in organic solvent and potentially aqueous media. Since co-solvents can be used for the first time, a wide host of commercially available comonomers, such as vinylic comonomers (e.g. styrenic compounds) may be utilized to expand the functionality of sulfur copolymers that can be prepared. Expanding this scope of chemical functionality in the sulfur copolymer may result in sulfur materials having new and improved physical properties (e.g., improved electrical conductivity, improved barrier properties as coatings, water solubility, and flame retardancy). These materials may be used as electrode materials in Li-batteries (specifically, cathode materials in Li—S batteries) and is various specialty polymer applications (e.g., lubricants, adhesives, antioxidants, coatings).

In an embodiment of the present invention, nucleophilic activators comprising amine- or heteroatom- (e.g., nitrogen, sulfur, oxygen) containing aromatic or heterocyclic compounds may be used to activate elemental sulfur ($S_8$), which allows for a wider scope of synthetic conditions and comonomers that can copolymerize with elemental sulfur to form functional sulfur copolymers. Inexpensive activators and vinylic comonomers may be used in making a diverse family of polymer products which are otherwise inaccessible without the activation elemental sulfur. For example, the nucleophilic activators may be used in free radical copolymerizations of $S_8$ with styrenics (e.g., styrene), acrylates, and methacrylates. Non-limiting examples of nucleophilic activators include, but are not limited to, imidazoles, functional imidazoles, anilines, aminostyrene derivatives, 1,4-diazabicyclo[2.2.2]octane (DABCO), 1,8-diazabicyclo[5.4.0.] undec-7-ene (DBU), nucleophilic heterocycles such as N-heterocyclic carbenes, phosphines, and other widely used nucleophilic organocatalysts.

In further embodiments, these amine containing compounds may also be used as both the activator and the comonomer, which enables the formation of sulfur copolymers that carry amine functional groups or other nucleophilic functional groups into the copolymer material. These amine functional groups may be used in further post-polymerization modifications. For instance, the amine functional sulfur copolymer can be reacted with other inexpensive comonomers, such as epoxies, to make copolymers with a high content of sulfur and with improved mechanical properties.

It is another objective of the present invention to provide polymeric materials that have a high refractive index of n>2.0 in the visible and mid-IR regimes, high transparency in the mid-IR regime, and that can be amenable to melt and solution processing into lenses, films, or optical fibers. The present invention features a novel composition and process of incorporating selenium units into polymeric materials by using and copolymerizing cyclic selenium sulfides, which is a comonomer ring system that possesses both sulfur and selenium, with other comonomers. The use of cyclic selenium sulfides allows for easier and more controllable incorporation of Se to afford chalcogenide hybrid copolymers with refractive indices above n>2.0, which is the key benchmark to warrant use of these polymeric transmitting materials in IR thermal imaging as lenses, windows and other devices.

In one embodiment, the present invention features compositions and methods of making a chalcogenide copolymer comprising one or more cyclic selenium sulfide monomers having the formula $Se_nS_{(8-n)}$, wherein the cyclic selenium sulfide monomers comprises at most about 70 wt % of selenium; and one or more comonomers each selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, and acrylonitrile comonomers at a level in the range of about 5-50 wt % of the chalcogenide copolymer. In preferred embodiments, the chalcogenide copolymer has a refractive index of about 1.7-2.6 at a wavelength in a range of about 500 nm to about 8 μm. In some embodiments, the chalcogenide copolymer may further comprise one or more sulfur monomers, at a level of about 5-50 wt % of the chalcogenide copolymer. In still other embodiments, the chalcogenide copolymer may further comprise elemental selenium ($Se_8$), at a level of about 5-50 wt % of the chalcogenide copolymer.

One of the unique inventive technical features of the present invention is the use of cyclic selenium sulfide as an inexpensive single source precursor for both selenium and sulfur units that can be incorporated into high refractive index materials. The present invention has surprisingly discovered that cyclic selenium sulfides can be used as a comonomer for copolymerizations with organic comonomers. Furthermore, copolymerizations of cyclic selenium sulfides with either $S_8$ or $Se_8$ can initially be conducted to tune the chalcogenide composition of Se and S units, followed by addition of an organic comonomer to form terpolymers, or more complex copolymer compositions. Without wishing to limit the invention to any theory or mechanism, it is believed that this technical feature of the present invention advantageously provides for an optical copolymer having a high refractive index as compared to other polymers. None of the presently known prior references or works have used the unique inventive technical feature of the present invention for preparing polymers or use in IR thermal imaging.

Furthermore, the sulfur polymer of the present invention may have the ability to self-heal upon reprocessing. Without wishing to limit the present invention to any particular theory or mechanism, it is believed that the self-healing property of these polymers are due to their reversible S—S bonds, which allows for broken S—S bonds to be reconnected by methods such as heat processing. Any article constructed from the sulfur polymers may be reprocessable and repairable.

BRIEF DESCRIPTION OF THE DRAWINGS

The features and advantages of the present invention will become apparent from a consideration of the following detailed description presented in connection with the accompanying drawings in which:

FIG. 7 shows a reaction schematic of epoxide comonomers polymerizing with a sulfur copolymer formed using phenylenediamine comonomers, and resulting in a termonomer. The amine functional groups of the sulfur copolymer are free to react with the epoxide functional groups of the epoxide monomers.

FIG. 8 shows a reaction schematic of epoxide comonomers polymerizing with a sulfur copolymer formed using vinylaniline comonomers, and resulting in a termonomer.

FIG. 9 shows samples of a sulfur copolymer (left) reacting with a second comonomer (middle) to form a terpolymer (right).

DESCRIPTION OF PREFERRED EMBODIMENTS

Figure 1:
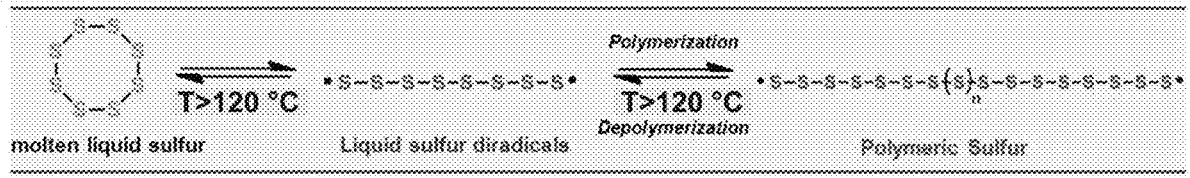
FIG. 1 shows a reaction schematic of a sulfur ring ($S_8$) opening and polymerizing.
Figure 2:
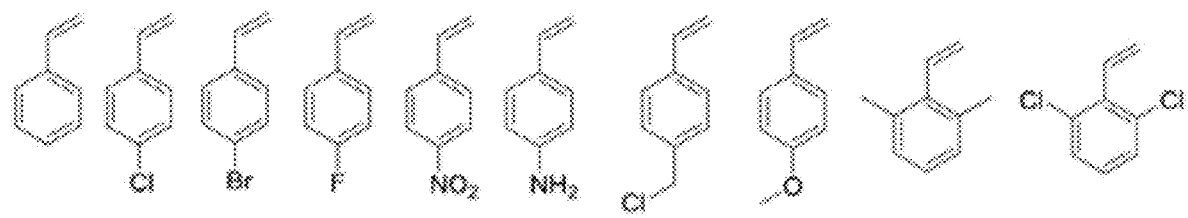
FIG. 2 shows non-limiting examples of functional styrenic comonomers that can copolymerize with sulfur by inverse vulcanization.
Figure 3:
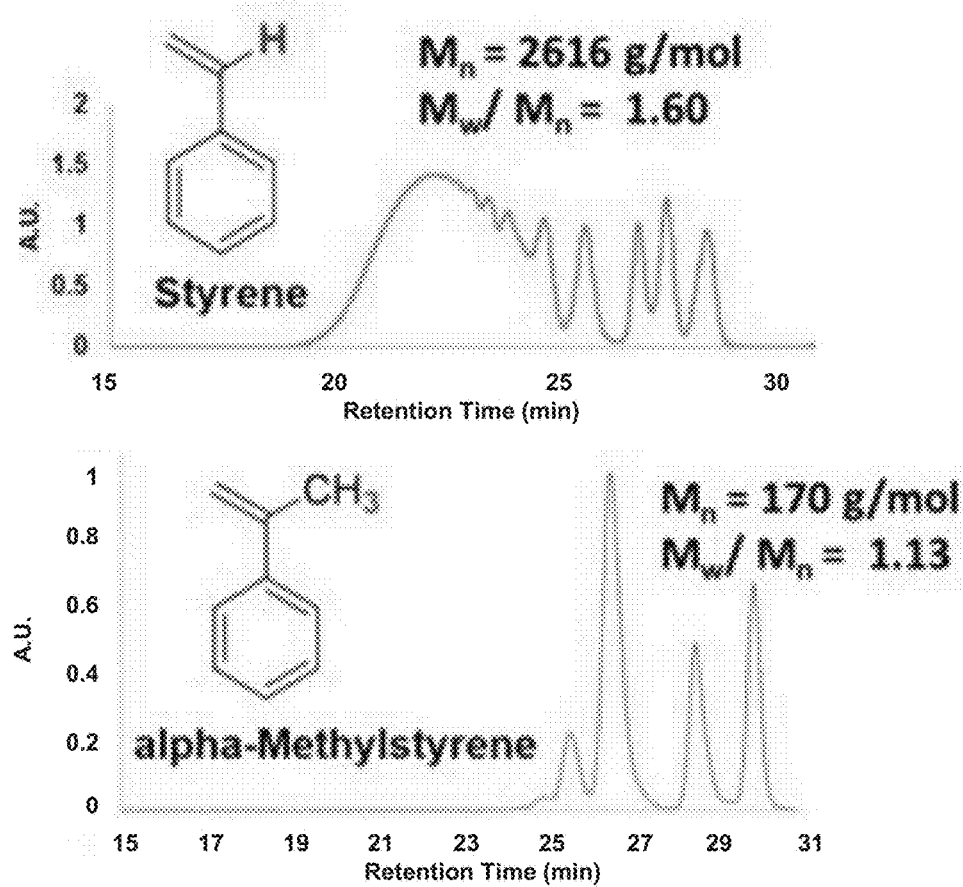
FIG. 3 shows GPC data for examples of styrenic comonomers.
Figure 4:
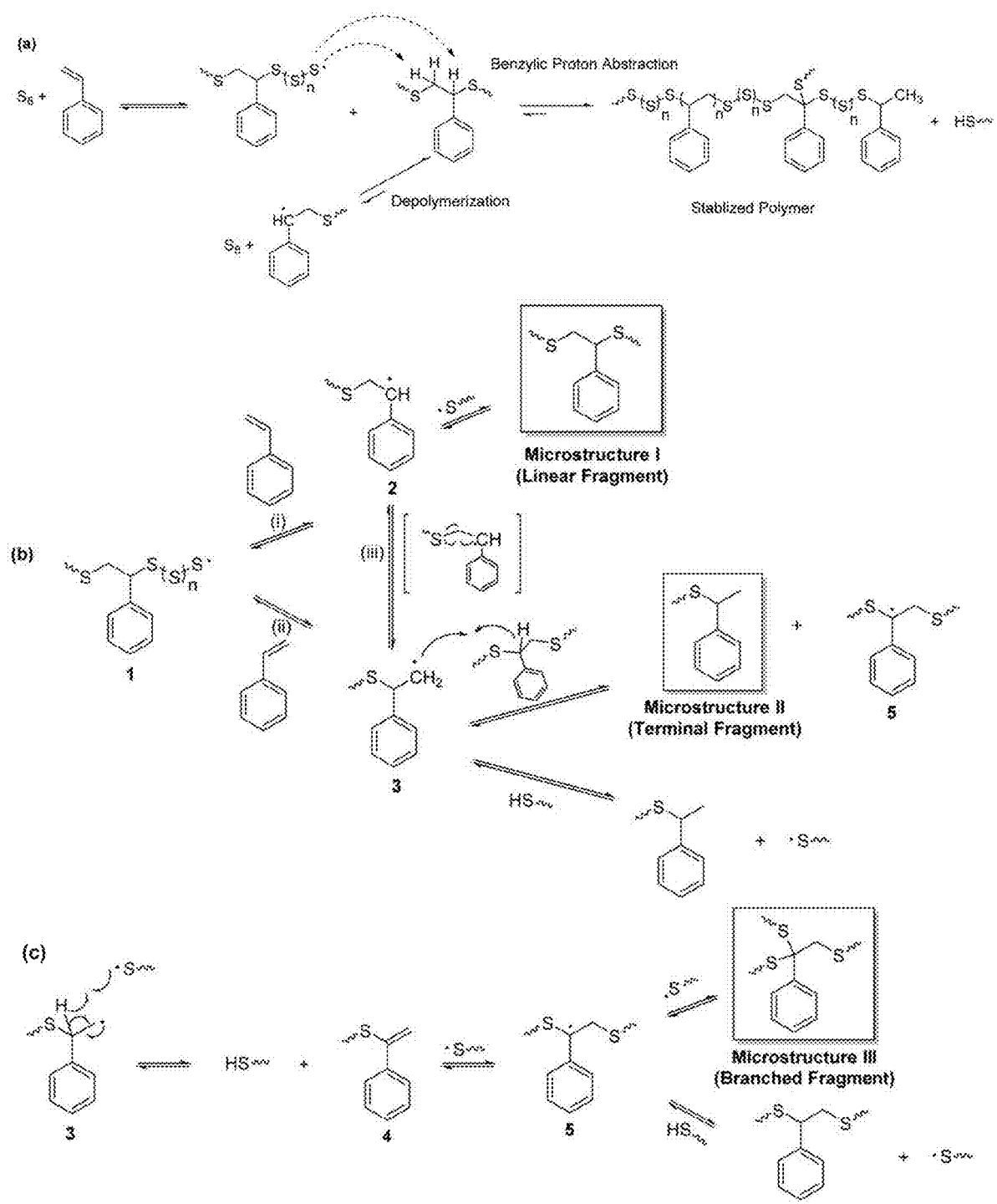
FIG. 4 shows an exemplary reaction mechanism for stabilization of polymeric sulfur radicals in styrene copolymerization. The key intermediate is the formation of primary methyl radical via the propagation reactions to a substituted side of the vinyl or reversible thiol-ene processes. Both can result in radicals that abstract hydrogen atoms from the polymer backbone, resulting in branching and cyclic S—S bonds.
Figure 5:
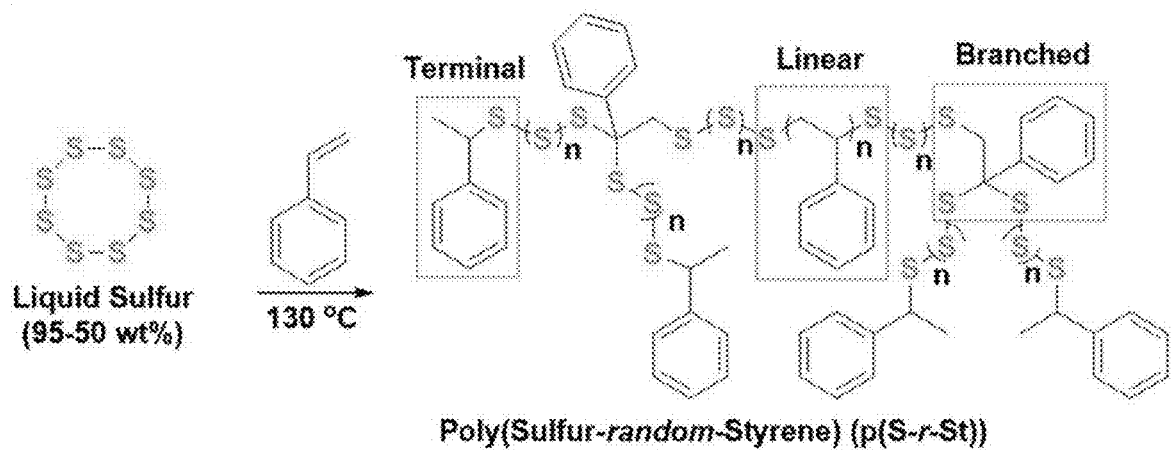
FIG. 5 shows another reaction schematic for copolymerizing sulfur and styrene.
Figure 5:
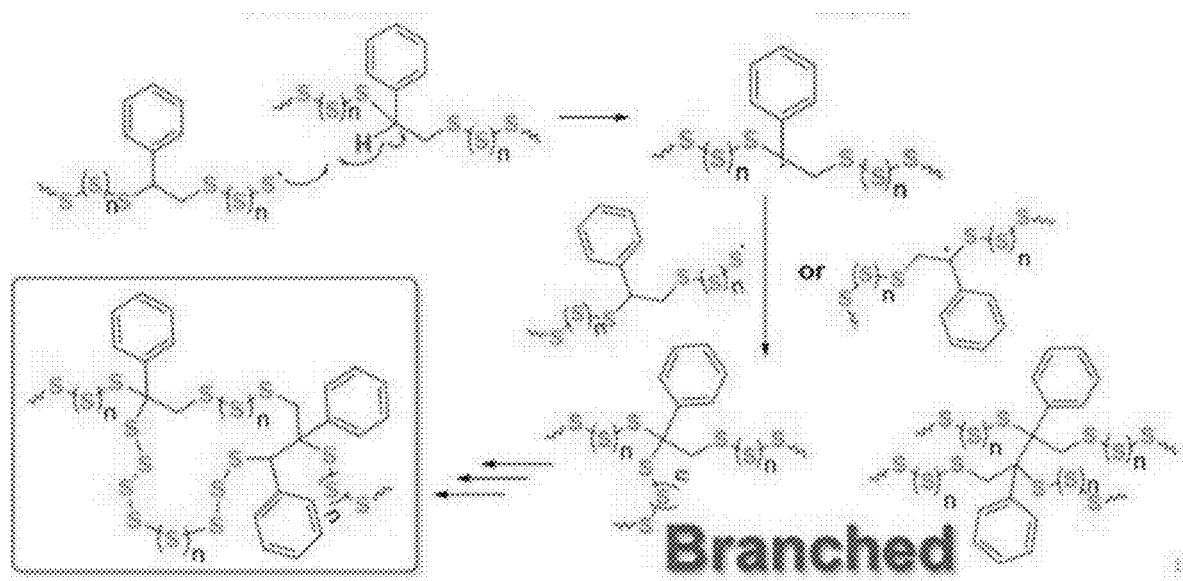
Figure 6:
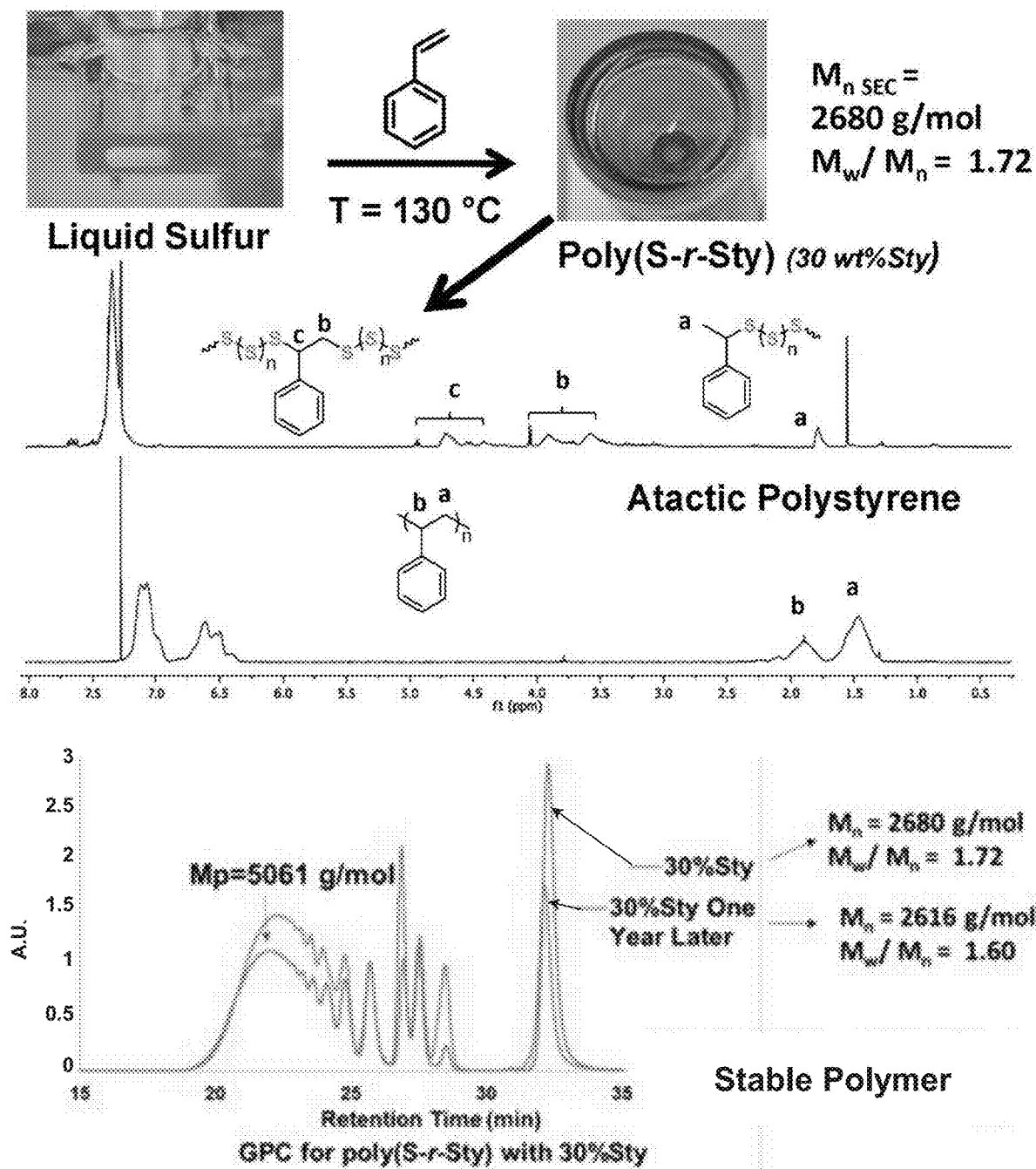
FIG. 6 shows an example of a sulfur-styrenic copolymer of the present invention. GPC data comparing results taken one year from the initial results for a sulfur-styrenic copolymer demonstrates that the copolymer is a stable polymer.
Figure 10:
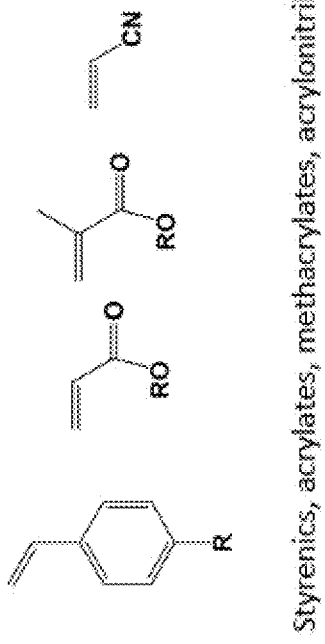
FIG. 10 shows a polymerization reaction scheme of homopolymerizing or non-homopolymerizing monomers. Non-limiting examples thereof are also shown.
Figure 10:
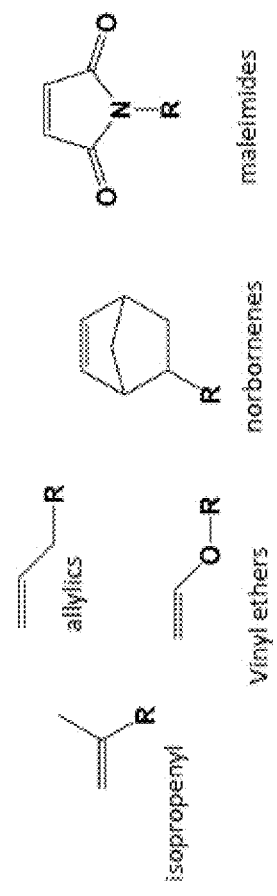
Figure 10:
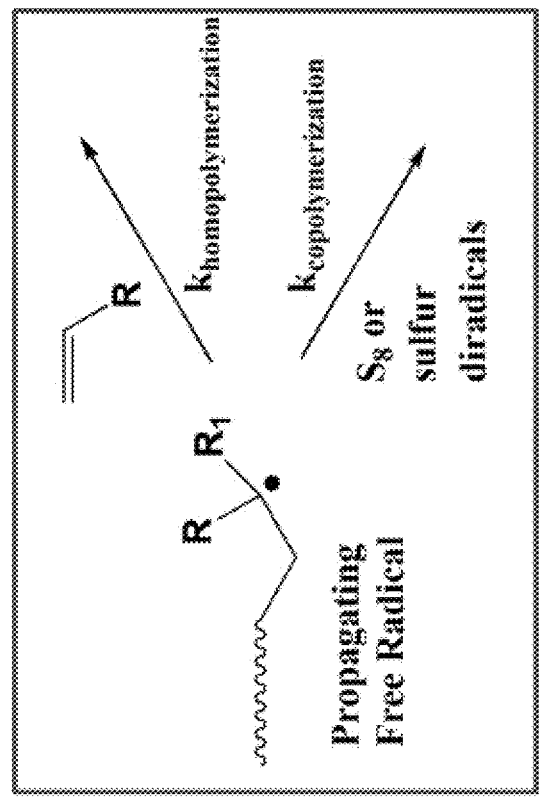
Figure 11:
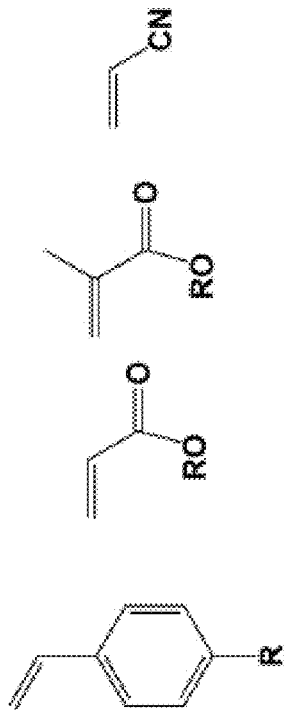
FIG. 11 shows an exemplary copolymerization reaction scheme of sulfur and ethylenically unsaturated monomers. Non-limiting examples of non-homopolymerizing monomers are also provided.
Figure 11:
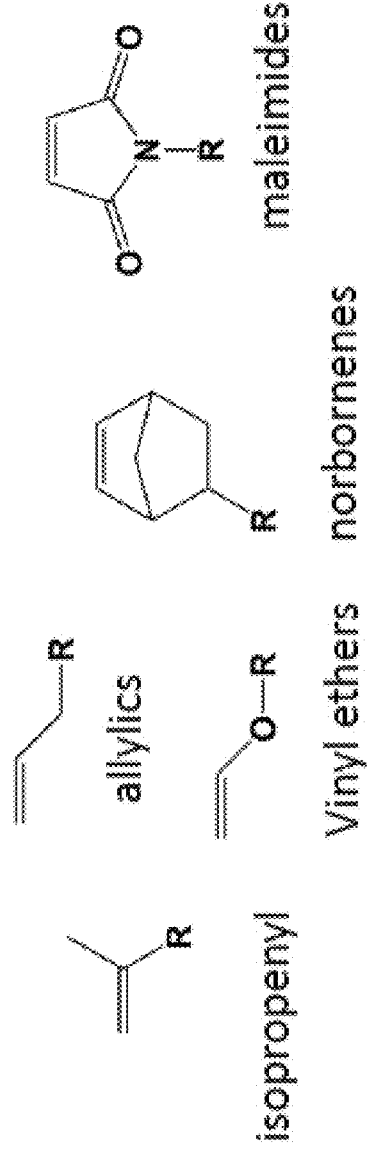
Figure 11:
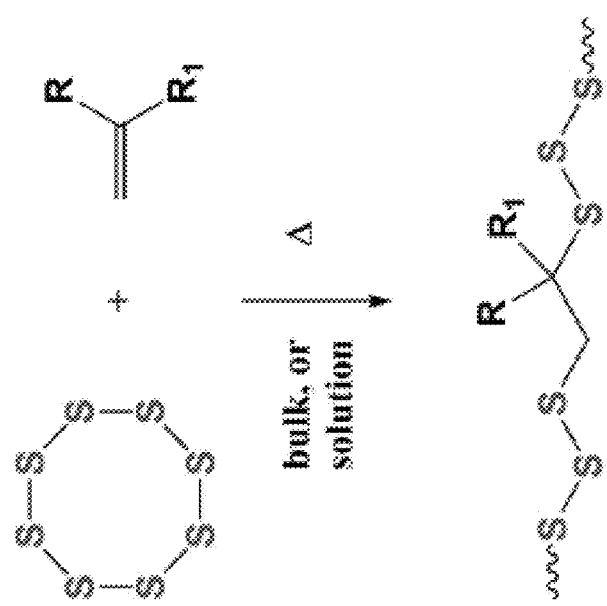
Figure 12:
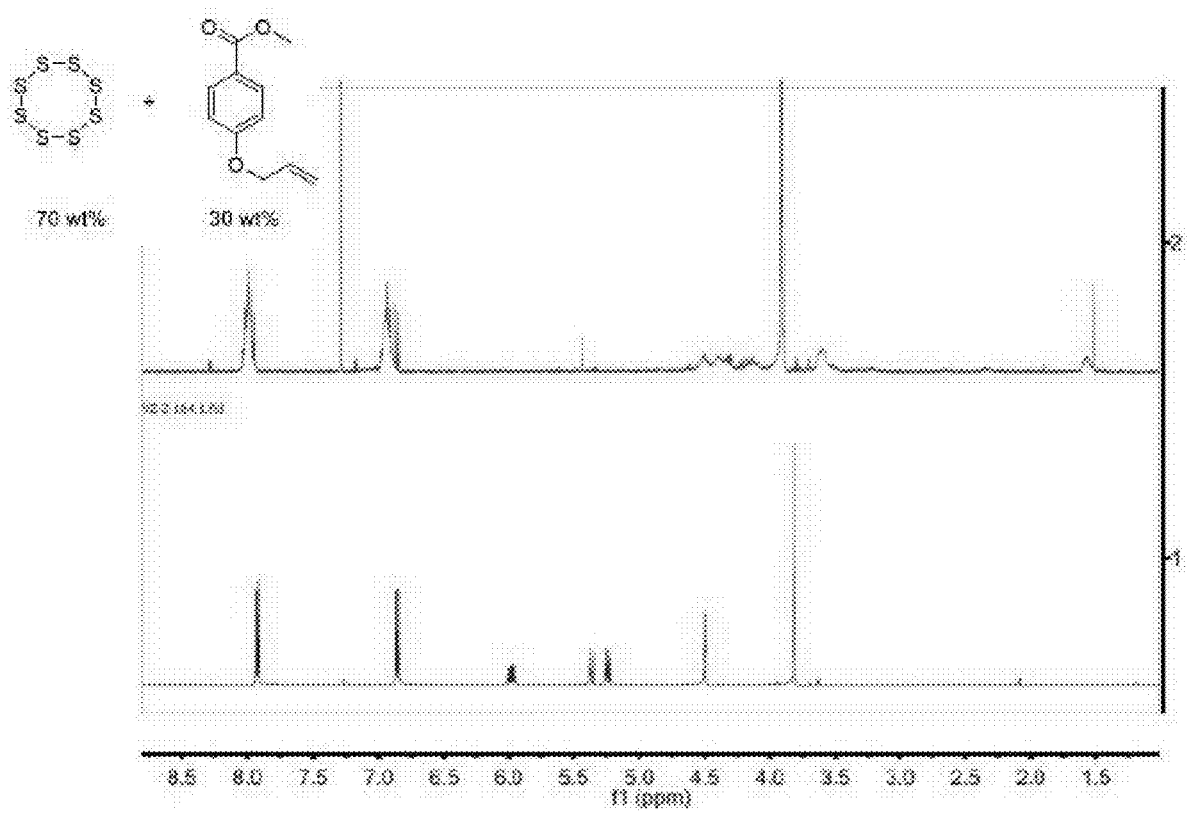
FIG. 12 shows $^1$H NMR spectroscopic evidence of $S_8$-allylic copolymer formation.
Figure 13:
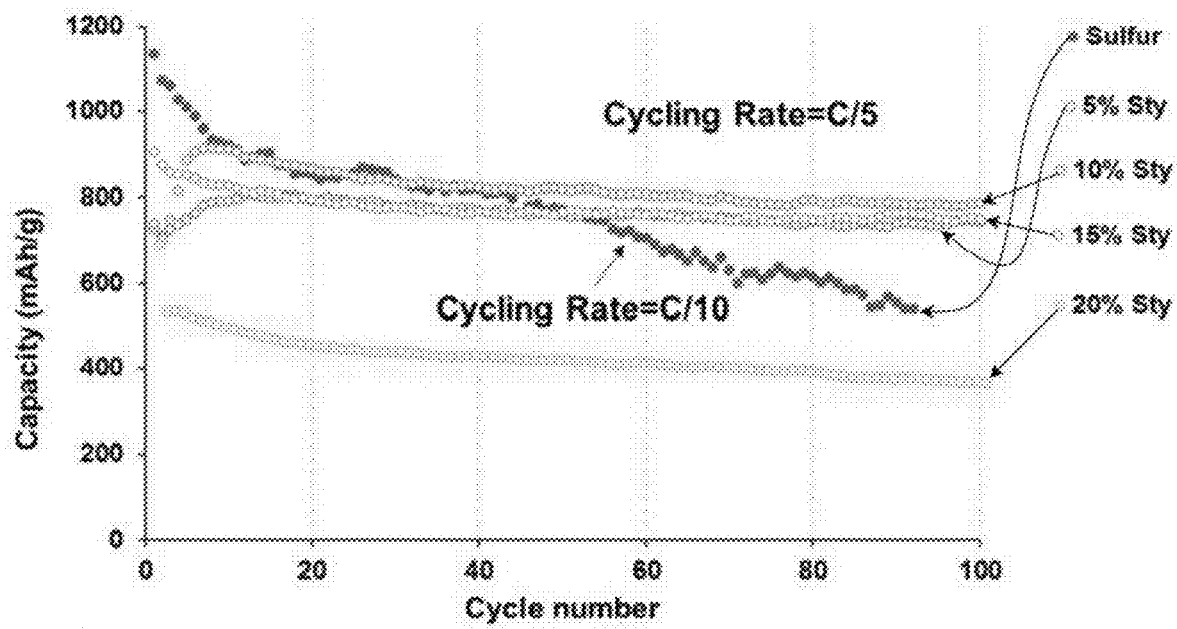
FIG. 13 shows a cycling experiment (C/10 and C/5) comparing sulfur-styrenic polymers and elemental sulfur as cathodes for electrochemical cells. Excellent retention of charge capacity in Li—S batteries is demonstrated when poly(sulfur-random-styrene) copolymers are used as active cathode material.

As used herein, sulfur can be provided as elemental sulfur, for example, in powdered form. Under ambient conditions, elemental sulfur primarily exists in an eight-membered ring form ($S_8$) which melts at temperatures in the range of 120° C.-130° C. and undergoes an equilibrium ring-opening polymerization (ROP) of the $S_8$ monomer into a linear polysulfane with diradical chain ends. As the person of skill in the art will appreciate, while $S_8$ is generally the most stable, most accessible and cheapest feedstock, many other allotropes of sulfur can be used (such as other cyclic allotropes, derivable by melt-thermal processing of $S_8$). Any sulfur species that yield diradical or anionic polymerizing species when heated as described herein can be used in practicing the present invention.

As used herein, the term "sulfur polymer" generally refers to any polymer or copolymer that contains sulfur monomers. Sulfur polymer may be used interchangeably with sulfur copolymer, optical sulfur copolymer or polymer, chalcogenide copolymer or polymer, sulfur polymer composition, or sulfur terpolymer, unless specified otherwise.

As used herein, a "styrenic comonomer" is a monomer that has a vinyl functional group. The styrenic comonomer may comprise a styrene and at least one reactive functional group. As known to one of ordinary skill in the art, a styrene is a derivative of benzene ring that has a vinylic moiety. The sulfur diradicals can link to the vinylic moieties of the styrenic commoners to form the sulfur-styrenic polymer. In certain embodiments, the reactive functional group may be a halogen, an alkyl halide, an alkyl, an alkoxy, an amine, or a nitro functional group. Non-limiting examples of styrenic comonomers include bromostyrene, chlorostyrene, fluorostyrene, (trifluoromethyl)styrene, vinylaniline, acetoxystyrene, methoxystyrene, ethoxystyrene, methylstyrene, nitrostyrene, vinylbenzoic acid, vinylanisole, and vinylbenzyl chloride.

As used herein, the term "amine monomer" is a monomer that has an amine functional group. In one embodiment, aromatic amines and multi-functional amines may be used. Amine monomers include, but are not limited to, aromatic amines, vinylaniline, m-phenylenediamine, and p-phenylenediamine. The various types of phenylenediamines are inexpensive reagents due to their wide-spread use in the preparation of many conventional polymers, e.g., polyureas, polyamides.

As used herein, the term "thiol monomer" is a monomer that has a thiol functional group. Thiol monomers include, but are not limited to, 4,4'-thiobisbenzenethiol and the like. The term "sulfide monomers" are monomers that have sulfide functional groups.

As used herein, an alkynylly unsaturated monomer is a monomer that has an alkynylly unsaturated functional group (i.e. triple bond). The term "alkynylly unsaturated monomer" does not include compounds in which the alkynyl unsaturation is part of a long chain alkyl moiety (e.g., unsaturated fatty acids, or carboxylic salts, or esters such as oleates, and unsaturated plant oils). In one embodiment, aromatic alkynes, both internal and terminal alkynes, multi-functional alkynes may be used. Examples of alkynylly unsaturated monomers include, but are not limited to, ethynylbenzene, 1-phenylpropyne, 1,2-diphenylethyne, 1,4-diethynylbenzene, 1,4-bis(phenylethynyl)benzene, and 1,4-diphenylbuta-1,3-diyne.

As used herein, the term "nitrone monomer" is a monomer that has a nitrone groups. In one embodiment, nitrones, dinitrones, and multi-nitrones may be used. Examples include, but are not limited to, N-benzylidene-2-methylpropan-2-amine oxide.

As used herein, an "aldehyde monomer" is a monomer that has an aldehyde functional group. In one embodiment, aldehydes, dialdehydes, and multi- aldehydes may be used.

As used herein, the term "ketone monomer" is a monomer that has a ketone functional group. In one embodiment, ketones, di-ketones, and multi-ketones may be used.

As used herein, the term "epoxide monomer" is a monomer that has epoxide functional groups. Non-limiting examples of such monomers include, generally, mono- or polyoxiranylbenzenes, mono- or polyglycidylbenzenes, mono- or polyglycidyloxybenzenes, mono- or polyoxiranyl (hetero)aromatic compounds, mono- or polyglycidyl(hetero) aromatic compounds, mono- or polyglycidyloxy(hetero)aromatic compounds, diglycidyl bisphenol A ethers, mono- or polyglycidyl(cyclo)alkyl ethers, mono- or polyepoxy(cyclo) alkane compounds and oxirane-terminated oligomers. In one preferred embodiment, the epoxide monomers may be benzyl glycidyl ether and tris(4-hydroxyphenyl)methane triglycidyl ether. In certain embodiments, the epoxide monomers may include a (hetero)aromatic moiety such as, for example, a phenyl, a pyridine, a triazine, a pyrene, a naphthalene, or a polycyclic (hetero)aromatic ring system, bearing one or more epoxide groups. For example, in certain embodiments, the one or more epoxide monomers are selected from epoxy(hetero)aromatic compounds, such as styrene oxide and stilbene oxide and (hetero)aromatic glycidyl compounds, such as glycidyl phenyl ethers (e.g., resorcinol diglycidyl ether, glycidyl 2-methylphenyl ether), glycidylbenzenes (e.g., (2,3-epoxypropyl)benzene) and glycidyl heteroaromatic compounds (e.g., N-(2,3-epoxypropyl)phthalimide). In certain desirable embodiments, an epoxide monomer will have a boiling point greater than 180° C., greater than 200° C., or even greater than 230° C. at the pressure at which polymerization is performed (e.g., at standard pressure, or at other pressures).

As used herein, the term "thiirane monomer" is a monomer that has a thirane functional group. Non-limiting examples of thiirane monomers include, generally, mono- or polythiiranylbenzenes, mono- or polythiiranylmethylbenzenes, mono- or polythiiranyl(hetero)aromatic compounds, mono- or polythiiranylmethyl(hetero)-aromatic compounds, dithiiranylmethyl bisphenol A ethers, mono- or polydithiiranyl (cyclo)alkyl ethers, mono- or polyepisulfide(cyclo) alkane compounds, and thiirane-terminated oligomers. In some embodiments, thiirane monomers may include a (hetero)aromatic moiety such as, for example, a phenyl, a pyridine, a triazine, a pyrene, a naphthalene, or a poly cyclic (hetero)aromatic ring system, bearing one or more thiirane groups. In certain desirable embodiments, a thiirane monomer can have a boiling point greater than 180° C., greater than 200° C., or even greater than 230° C. at the pressure at which polymerization is performed (e.g., at standard pressure).

As used herein, an ethylenically unsaturated monomer is a monomer that contains an ethylenically unsaturated functional group (i.e. double bond). The term "ethylenically unsaturated monomer" does not include compounds in which the ethylenic unsaturation is part of a long chain alkyl moiety (e.g. unsaturated fatty acids such as oleates, and unsaturated plant oils).

Non-limiting examples of ethylenically unsaturated monomers include vinyl monomers, acryl monomers, (meth)acryl monomers, unsaturated hydrocarbon monomers, and ethylenically-terminated oligomers. Examples of such monomers include, generally, mono- or polyvinylbenzenes, mono- or polyisopropenylbenzenes, mono- or polyvinyl(hetero)aromatic compounds, mono- or polyisopropenyl(hetero)-aromatic compounds, acrylates, methacrylates, alkylene di(meth)acrylates, bisphenol A di(meth)acrylates, benzyl (meth)acrylates, phenyl(meth)acrylates, heteroaryl (meth)acrylates, terpenes (e.g., squalene) and carotene. In some embodiments, non-limiting examples of ethylenically unsaturated monomers that are non-homopolymerizing include allylic monomers, isopropenyls, maleimides, norbornenes, vinyl ethers, and methacrylonitrile. In other embodiments, the ethylenically unsaturated monomers may include a (hetero)aromatic moiety such as, for example, phenyl, pyridine, triazine, pyrene, naphthalene, or a polycyclic (hetero)aromatic ring system, bearing one or more vinylic, acrylic or methacrylic substituents. Examples of such monomers include benzyl (meth)acrylates, phenyl (meth)acrylates, divinylbenzenes (e.g., 1,3-divinylbenzene, 1,4-divinylbenzene), isopropenylbenzene, styrenics (e.g., styrene, 4-methylstyrene, 4-chlorostyrene, 2,6-dichlorostyrene, 4-vinylbenzyl chloride), diisopropenylbenzenes (e.g., 1,3-diisopropenylbenzene), vinylpyridines (e.g., 2-vinylpyridine, 4-vinylpyridine), 2,4,6-tris((4-vinylbenzyl) thio)-1,3,5-triazine and divinylpyridines (e.g., 2,5-divinylpyridine). In certain embodiments, the ethylenically unsaturated monomers (e.g., including an aromatic moiety) bear an amino (i.e., primary or secondary) group, a phosphine group or a thiol group. One example of such a monomer is vinyldiphenylphosphine. In certain desirable embodiments, an ethylenically unsaturated monomer will have a boiling point greater than 180° C., greater than 200° C., or even greater than 230° C. at the pressure at which polymerization is performed (e.g., at standard pressure).

As used herein, the term "self-healing" is defined as to enable a material to repair damage with minimum intervention. In some embodiments, mechanisms and techniques to enable self-healing may include covalent bonding, supramolecular chemistry, H-bonding, ionic interactions, $\pi$-$\pi$ stacking, chemo-mechanical repairs focusing on encapsulation, remote self-healing, or shape memory assisted polymers. In one preferred embodiment, self-healing utilizes thermal reformation. As used herein, thermal reformation involves the use of heat to reform the bonds or cross-links of a polymeric material.

As used herein, "non-homopolymerizing" refers to the same monomers that do not readily polymerize with each other. For example, non-homopolymerizing monomers may be held at a temperature of at least 100° C. for period of time, such as 10 to 100 hours, without forming increasing quantities of a homopolymer. This is not to say that the homopolymer never forms or would not do so under different reaction conditions; however, the homopolymer would depolymerize at a rate greater than the rate of homopolymer formation and an increasing quantity of homopolymer is not observed. As another example, monomers exhibiting no tendency to homopolymerize are monomers that do not polymerize to more than about 5% conversion of monomer to polymer at a temperature of at least 100° C. for period of time, such as 10 to 100 hours. Non-homopolymerizing monomers are known to one of ordinary skill in the art.

As used herein, a high molecular weight polymer can have a molar mass of at least 2,000 g/mol, for example, about 5,000 g/mol or higher. The term "wt %", which is interchangeable with % wt, refers to a weight percent of a component with respect to the sulfur polymer, unless otherwise specified.

As used herein, the term "functional" in correlation with a polymer refers to functional polymers that have specified physical, chemical, biological, pharmacological, or other properties or uses that are determined by the presence of specific chemical functional groups, which are usually dissimilar to those of the backbone chain of the polymer.

As used herein, the term "nucleophilic activator" may be defined as an activator that can react with sulfur via a nucleophilic, or anionic mechanism, to ring-open the $S_8$-elemental sulfur and form reactive sulfur intermediates, such as a linear sulfobetaine intermediate. A nucleophilic mechanising is a mechanism in which an electron pair is donated to an electrophile to form a chemical bond. In nucleophilic activation, an electron nucleophile bonds with the positive or partially positive charge of an atom or a group of atoms. The mechanisms of reactions such as electrophilic substitutions, electrophilic aromatic substitutions, and free radical polymerizations are known to one of ordinary skill in the art.

As used herein, the term "chalcogenide" refers to a compound containing one or more chalcogen elements. One of ordinary skill in the art will understand that the classical chalcogen elements are sulfur, selenium and tellurium. In accordance with the present invention, the use of chalcogenide refers to compounds and/or polymers containing selenium.

As known to one of ordinary skill in the art, the term "isomer" refers to compounds having the same formula but differ in arrangement. For instance, isomers of cyclic selenium sulfides, such as $Se_2S_6$ and $Se_3S_5$, can have different placements of the Se units in the ring (e.g., S—Se—Se—S or S—Se—S). Isomers of $Se_2S_6$ include 1,2-isomers, 1,3-isomers, 1,4-isomers, and 1,5-isomers, wherein the numbers refer to the position of the Se units in the eight-membered ring.

As known to one of ordinary skill in the art, the term "visible" refers to a portion of the electromagnetic spectrum that falls in the range of 390 to 700 nm. As used herein, the term "infrared" (IR) refers to a portion of the electromagnetic spectrum that falls in the range of 700 nm to 1 mm. Subsets of the IR spectrum include near-IR (700 nm to 3 μm), mid-IR (3-8 μm), long-wavelength IR (8-15 μm) and far-IR (15 μm to 1 mm).

As used herein, the terms "those defined above" and "those defined herein" when referring to a variable incorporates by reference the broad definition of the variable as well as any narrow and/or preferred, more preferred and most preferred definitions, if any.

Styrenics and Unconventional Comonomers

Referring now to FIG. 1-13, one embodiment of the present invention features a sulfur polymer comprising one or more sulfur monomers at between about 10 to 95% wt of the polymer, and one or more styrenic comonomers at between about 5 to 90% wt of the polymer. The styrenic comonomers can comprise one or more functional groups. In preferred embodiments, the styrenic comonomers are polymerized with the sulfur monomers via chain transferring of a benzylic hydrogen of the styrenic comonomers to link sulfur radicals, formed via chain braking of the sulfur monomers, to a vinyl moiety of the styrenic comonomers. This surprising polymerization mechanism for the preparation of chemically stable and processable sulfur based copolymers via the reaction of liquid elemental sulfur and styrenic comonomers is described herein.

In some embodiments, the sulfur monomers are between about 10 to 30% wt of the polymer, 30 to 40% wt of the polymer, 40 to 60% wt of the polymer, 60 to 80% wt of the polymer, or 80 to 95% wt of the polymer. For example, the sulfur monomers are at least about 50% wt of the polymer. In other embodiments, the styrenic comonomers are between about 5 to 20% wt of the polymer, 20 to 40% wt of the polymer, 40 to 60% wt of the polymer, 60 to 80% wt of the polymer, or 80 to 90% wt of the polymer. For example, the styrenic monomers are at most about 50% wt of the polymer.

In some embodiments, the one or more functional groups are selected from a group consisting of a halogen functional group, an amine functional group, an alkyl functional group, an alkyl halide functional group, an alkoxyl functional group, a phenyl functional group, a nitro functional group. In other embodiments, the functional groups may be carboxylic acids, carboxylate salts, sulfonic acids, sulfonate salts, quaternary ammonium salts, ethers, oligo-ethers, polyethers, polyamines, esters, amides, and alcohols. In one embodiment, the halogen functional group is selected from a group consisting of Br, Cl, and F. In another embodiment, the alkyl halide functional group comprises one or more moieties of Br, Cl, or F. In a further embodiment, the alkoxyl functional group comprises —$OCH_3$, —COOH, or —COOR.

In some embodiments, the sulfur polymer further comprises one or more functional termonomers at between about 5 to 50% wt of the polymer. In other embodiments, the functional termonomers are between about 5 to 15% wt of the polymer, 15 to 25% wt of the polymer, 25 to 35% wt of the polymer, or 35 to 50% wt of the polymer. Preferably, each functional termonomers has at least one polymerizable moiety. In another embodiment, each functional termonomers has two or more polymerizable moieties. The polymerizable moiety of the functional termonomers can be linked to the functional group of the styrenic comonomers. Non-limiting examples of functional termonomers include a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, and an ethylenically unsaturated monomer.

In other embodiments, the styrenic comonomers are water-soluble. The sulfur monomers and styrenic comonomers can be polymerized in an aqueous solution. An example of the aqueous solution is water.

The sulfur polymer can be made, for example, by polymerization of molten sulfur with the styrenic comonomers. Thus, in one aspect, the invention provides a method for making the sulfur polymer as described above. For example, in one embodiment, the method includes heating a mixture including sulfur and the styrenic comonomers together at a temperature in the range of about 120° C. to about 230° C., e.g., in the range of about 120° C. to about 150° C. The person of skill in the art will select conditions that provide the desired level of polymerization. In certain embodiments, the polymerization reaction is performed under ambient pressure. However, in other embodiments, the polymerization reaction can be performed at elevated pressure (e.g., in a bomb or an autoclave). Elevated pressures can be used to polymerize more volatile comonomers, so that they do not vaporize under the elevated temperature reaction conditions.

According to one embodiment, the present invention features a method of synthesizing a stable sulfur polymer. The method may comprise providing elemental sulfur; providing one or more styrenic monomers, wherein the styrenic monomers comprise at least one vinyl moiety and one or more functional groups; providing a nucleophilic activator; melting the elemental sulfur to form liquid sulfur; adding the nucleophilic activator to the liquid sulfur, wherein the nucleophilic activator catalyzes ring-opening of the liquid sulfur via nucleophilic activation, thereby forming sulfur radicals; adding the styrenic comonomers to the sulfur radicals; and polymerizing the styrenic comonomers with the sulfur radicals, thereby forming the stable sulfur polymer. Without wishing to limit the invention to a particular theory or mechanism, the nucleophilic activator can increase a rate of polymerization of the styrenic comonomers and the sulfur radicals by a factor of about 2-100 as compared to the rate of polymerization without the nucleophilic activator. Furthermore, the nucleophilic activator enables the polymerization of the styrenic comonomers with the sulfur radicals to occur at a temperature of about 110-130° C., for example, about 120° C. Examples of nucleophilic activators include, but are not limited to, amine-containing compounds, nitrogen-containing heterocycles, sulfide-containing compounds, imidazoles, functional imidazoles, anilines, aminostyrene derivatives, 1,8-diazabicyclo[5.4.0]undec-7-ene (DBU), 1,4-diazabicyclo[2.2.2]octane (DABCO), nucleophilic heterocycles, N-heterocyclic carbenes, phosphines, ionic liquids, thiols, ureas, and nucleophilic organocatalysts.

It is theorized that polymerization occurs by chain transferring a benzylic hydrogen of the styrenic comonomer to link the sulfur radical to the vinyl moiety of the styrenic comonomer. The styrenic comonomers can copolymerize with molten liquid sulfur to form stable copolymers via chain transfer of benzylic hydrogen in the copolymer backbone. Without wishing to limit the invention to a particular theory or mechanism, the chain transfer of benzylic hydrogen can enable introduction of branching to suppress depolymerization, presumably through looping of growing sulfur radicals to form cyclic polysulfides.

Another to embodiment of the present invention features a method of synthesizing a stable sulfur polymer. The method may comprise providing elemental sulfur, providing one or more styrenic monomers comprising a vinyl moiety and one or more functional groups, melting the elemental sulfur to form a liquid solution of sulfur diradicals, adding the styrenic comonomers to the liquid solution; and polymerizing the styrenic comonomers with the sulfur radicals by chain transferring a benzylic hydrogen of the styrenic comonomers to link the sulfur radicals to the vinyl moiety, thereby forming the stable sulfur polymer. In some embodiments, the step of polymerizing the styrenic comonomers with the sulfur radicals is performed at a temperature of between about 120-230° C., e.g., in the range of about 120-150° C., or about 150-170° C., or about 170-190° C., or about 190-210° C., or about 210-230° C.

In other embodiments, the method may further comprise grafting one or more functional termonomers to the sulfur polymer by linking a polymerizable moiety of the functional termonomers to the functional group of the styrenic comonomers. Non-limiting examples of the functional termonomers may include a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, and an ethylenically unsaturated monomer. Other examples of functional termonomers may include aniline monomers, thiophene monomers, and pyrrole monomer, which can be monomers for making conductive polymers.

In some embodiments, the step of grafting one or more functional termonomers to the sulfur polymer may further comprise dissolving the sulfur polymer and the functional termonomers in a solvent and adding an initiating agent to the solvent, which promotes copolymerization of the sulfur polymer and the functional termonomers. Preferably, the solvent is a biphasic mixture from a non-polar solvent, such as tetrahydrofuran (THF) and water. In other embodiments, the solvent comprises water. Non-limiting examples of initiating agents include ammonium persulfate (APS) and potassium persulfate, $FeCl_3$, and related complexes.

In some embodiments, the sulfur polymer can be modified by reacting an available reactive functional group on the functional styrenic comonomer with a terpolymer to form a new copolymer material. The technique of reacting may be oxidative coupling, copolymerization, or any appropriate method of polymerization. Non-limiting techniques of polymerization includes free radical polymerization, controlled radical polymerization, ring-opening polymerization, ring-opening metathesis polymerization, step-growth polymerization, or chain-growth polymerization.

An alternate embodiment of the present invention features a method of synthesizing a dynamic, covalent sulfur polymer as described herein. The method can comprise providing elemental sulfur, providing one or more styrenic monomers comprising a vinyl moiety and one or more functional groups, melting the elemental sulfur to form a liquid solution of sulfur diradicals comprising dynamic sulfur-sulfur (S—S) bonds, adding the styrenic comonomers to the liquid solution, polymerizing the styrenic comonomers with the sulfur radicals by chain transferring a benzylic hydrogen of the styrenic comonomers to link the sulfur radicals to the vinyl moiety, thereby forming the stable sulfur polymer, grafting a functional conjugated copolymer to the sulfur polymer by linking a polymerizable moiety of the functional conjugated copolymer to the functional group of the styrenic comonomers, and dynamically activating the dynamic S—S bonds by a stimulus to enable re-processing or melt processing of the sulfur polymer. In one embodiment, grafting of the functional conjugated copolymer to the sulfur polymer can comprise dissolving the sulfur polymer and the functional conjugated copolymer in a solvent and adding an initiating agent to the solvent to initiate radical polymerization of the sulfur polymer and the functional conjugated copolymer. Preferably, the functional conjugated copolymer improves the electrical conductivity of the sulfur polymer.

The stable formation of amine functional copolymers via the copolymerization of elemental sulfur and 4-vinylaniline was afforded in liquid sulfur and while using solution polymerizations in arene solvents to form chemically stable copolymers. This discovery is particularly surprising since amine groups were previously known to degrade S—S bonds. These amine groups can be introduced by direct copolymerization of 4-vinylaniline into the copolymer without the need for protecting groups on the amine. Post-polymerization modification of the amine-containing sulfur polymers enables the creation of a new class of functional terpolymer materials thru reactions of the pendant amine side chain groups to form conductive polyaniline copolymers directly conjugated to the sulfur polymer backbone. These new polymer materials may be used in as high capacity electrodes for Li—S batteries since the introduction of new functionalities such as conductive polyaniline segments can increase the electrical conductivity of these resultant materials.

For illustrative purposes, the following are non-limiting examples of preparing a sulfur polymer, in particular, a sulfur-styrenic polymer.

Example 1. Non-Limiting Procedure for Preparing an Exemplary Sulfur Polymer

To a 25 mL vial equipped with a magnetic stir bar was loaded with sulfur (700 mg, 2.73 mmol) and 4-vinylaniline (300 mg, 2.52 mmol). The mixture was heated in an oil bath and stirred at a temperature of about 130° C. to yield a red-orange liquid. The reaction was cooled to yield a poly (S-r-vinylaniline).

Example 2. Non-Limiting Procedure for Preparing an Exemplary Sulfur Polymer Grafted to a Terpolymer Referring to FIGS. 7 and 8, about 50 mg of poly(S-r-vinylaniline) was added to a solvent of 5 ml tetrahydrofuran and 2 ml water, as shown in FIG. 8A. About 50 mg of aniline was added to the poly(S-r-vinylaniline) and solvent mixture, followed by 420 mg (2.5 eq) of ammonium persulfate $((NH_4)_2S_2O_8)$, as shown in FIG. 8B. The resulting polymer is a poly(S-r-vinylaniline)-graft-polyaniline, as shown in FIG. 8C.

In preferred embodiments, sulfur terpolymers and more complex copolymer materials, such as in the form of cross-linked polymers or non-crosslinked, intractable polymers, can be reprocessed by stimuli activation of dynamic S—S bonds in the polymer material. As used herein, the term "dynamic" is defined reversibly breaking of bonds. The introduction of S—S bonds into an intractable polymer material, or cross-linked polymer network, can allow for re-processing of the polymer material due to dynamic breaking of S—S bonds. In one embodiment, the sulfur polymers described herein are dynamic covalent polymers. The dynamic covalent polymers may comprise a terpolymer, or a more complex copolymer having S—S bonds and some other copolymer segment that is intractable, or cross-linked. Stimuli, such as thermal, light, or another form of stimuli, can induce dynamic activation of S—S bonds to enable re-processing, or melt processing of otherwise non-reversible, processable polymeric materials.

As an example, polyaniline can often exist in forms that are intractable, or difficult to melt process. The sulfur polymer of the present invention may contain polyaniline and is cross-linked. Since S—S bonds can become dynamic (i.e., reversibly break) at temperatures of between about 60-100° C.), the sulfur polymer can be briefly heat pressed, which scrambles the S—S bonds and sufficiently softens the material long enough to press into films or other molded forms. Typical polymers such as thermosets, cross-linked, and/or intractable polymers cannot be processed in this manner; therefore fusion of typical polymers with S—S bonds can make for new properties. For instance, new terpolymers, or more complex copolymer material that introduces a conjugated copolymer, such as polyaniline units, can improve the electrical conductivity of the material, and can also be used as an active material in cathodes for Li—S battery to increase the volumetric energy density of the battery.

The use of a new electroactive cathode material for an Li—S battery, which can be the sulfur polymer, upon discharge, generates soluble additive species in situ that co-deposit onto the cathode with lower sulfide discharge products. These additive species may be introduced into the electroactive material during the synthesis of the material, or added to the electrolyte or battery separator as a soluble species. These additive species are able to co-deposit with sulfide-containing discharge products via active electrochemical reactions, or passive non-electrochemical processes. Co-deposition of these additive species with sulfide discharge products onto the Li—S cathode plasticizes the electrode against mechanical fracture during battery charge-discharge cycling. Plasticization enables retention of charge capacity and improve cycle lifetime beyond 100 cycles. The electroactive material in this case is best embodied by a copolymer material comprising elemental sulfur and an organic comonomer. Upon discharge of this copolymer, soluble organosulfur species are formed which function to improve Li—S batteries as described above.

An exemplary embodiment features an electrochemical cell comprising an anode comprising metallic lithium, a cathode comprising any of the aforementioned sulfur polymers that generate soluble additive species in situ upon discharge and the soluble additive species co-deposit with lower sulfide discharge products onto the cathode, and a non-aqueous electrolyte interposed between the cathode and the anode. In some embodiments, the lower sulfide discharge products are $Li_2S_3$, $Li_2S_2$, or $Li_2S$. Preferably, the electrochemical cell has an increased volumetric energy density. For example, the capacity of the electrochemical cell ranges from about 200 to about 1200 mAh/g.

Any embodiment of the electrochemical cells may be used in electric vehicle applications, portable consumer devices portable consumer devices (e.g., Personal electronics, cameras, electronic cigarettes, handheld game consoles, and flashlights), motorized wheelchairs, golf carts, electric bicycles, electric forklifts, tools, automobile starters, and uninterruptible power supplies.

In some embodiments, the electrolyte and/or a separator comprises the sulfur polymer. The sulfur polymer generates soluble organosulfur species upon discharge. The soluble additive species are co-deposited with the lower sulfide discharge products by an electrochemical reaction or a non-electrochemical reaction.

Alternative embodiments of the sulfur polymer may further comprise one or more monofunctional monomers, or one or more polyfunctional monomers (e.g., difunctional or trifunctional). The one or more polyfunctional monomers is selected from a group consisting of a polyvinyl monomer (e.g., divinyl, trivinyl), a polyisopropenyl monomer (e.g., diisoprenyl, triisoprenyl), a polyacryl monomer (e.g., diacryl, triacryl), a polymethacryl monomer (e.g., dimethacryl, trimethacryl), a polyunsaturated hydrocarbon monomer (e.g., diunsaturated, triunsaturated), a polyepoxide monomer (e.g., diepoxide, triepoxide), a polythiirane monomer (e.g., dithiirane, trithiirane), a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomers, a polynitrone monomers, a polyaldehyde monomers, a polyketone monomers, and a polyethylenically unsaturated monomers.

In some embodiments, the one or more polyfunctional monomers is selected from a group consisting of a divinylbenzene, a diisopropenylbenzene, an alkylene di(meth)acrylate, a bisphenol A di(meth)acrylate, a terpene, a carotene, a divinyl (hetero)aromatic compound and a diisopropenyl (hetero)aromatic compound. In other embodiments, a polyfunctional monomer can have one or more amine, thiol, sulfide, alkynylly unsaturated, nitrone and/or nitroso, aldehyde, ketone, thiirane, ethylenically unsaturated, and/or epoxide moieties moieties; and one or more amine, thiol, sulfide, alkynylly unsaturated, nitrone and/or nitroso, aldehyde, ketone, thiirane, ethylenically unsaturated, and/or epoxide moieties, wherein the first and second moieties are different. A non-limiting example is a divinylbenzene monoxide.

In some embodiments, the one or more polyfunctional monomers are at a level of about 2 to about 50 wt %, or about 2 to about 10 wt %, or about 10 to about 20 wt %, or about 20 to about 30 wt %, or about 30 to about 40 wt %, or about 40 to about 50 wt % of the sulfur polymer. In other embodiments, the one or more monofunctional monomers are at a level up to about 5 wt %, or about 10 wt %, or about 15 wt % of the sulfur polymer.

According to another embodiment, the present invention features a sulfur polymer comprising about 10-95 wt % of sulfur monomers, and about 5-50 wt % of non-homopolymerizing monomers. The non-homopolymerizing monomers are copolymerize with the sulfur monomers via free radical polymerization to form the sulfur polymer. Preferably, the sulfur polymer has a molar mass of at least 2,000 g/mole and is a functional polymer. In other embodiments, the sulfur polymer comprises sulfur monomers at a range of about 5 to 10 wt %, or about 10 to 20 wt %, or about 20 to 30 wt %, or about 30 to 40 wt %, or about 40 to 50 wt %, or about 50 to 60 wt %, or about 60 to 70 wt %, or about 70 to 80 wt %, or about 80 to 95 wt % of the sulfur polymer. In some embodiments, the sulfur polymer comprises the non-homopolymerizing monomers at a range of about 5 to 10 wt %, or about 10 to 20 wt %, or about 20 to 30 wt %, or about 30 to 40 wt %, or about 40 to 50 wt % of the sulfur polymer.

According to another embodiment, the present invention features a sulfur polymer comprising about 10-95 wt % of sulfur copolymers, and about 5-50 wt % of non-homopolymerizing monomers. The non-homopolymerizing monomers are copolymerized with the sulfur copolymers, via free radical polymerization, to form the sulfur polymer. Preferably, the sulfur polymer has a molar mass of at least 2,000 g/mole and is a functional polymer. In some embodiments, the sulfur copolymer comprises sulfur monomers at about 10-95 wt % of the sulfur copolymers, and one or more comonomers at about 5-50 wt % of the sulfur copolymers. The comonomers may be selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, acrylic comonomers, methacrylate comonomers, and acrylonitrile comonomer. Preferably, the one or more comonomers are copolymerized with the sulfur monomers to form the sulfur copolymer. In still other embodiments, the sulfur copolymer comprises one or more comonomers at a range of about 5 to 10 wt %, or about 10 to 20 wt %, or about 20 to 30 wt %, or about 30 to 40 wt %, or about 40 to 50 wt % of the sulfur copolymer. In other embodiments, the sulfur copolymer comprises sulfur monomers at a range of about 5 to 10 wt %, or about 10 to 20 wt %, or about 20 to 30 wt %, or about 30 to 40 wt %, or about 40 to 50 wt %, or about 50 to 60 wt %, or about 60 to 70 wt %, or about 70 to 80 wt %, or about 80 to 95 wt % of the sulfur copolymer.

In some embodiments, the non-homopolymerizing monomers are ethylenically unsaturated monomers, such as maleimide monomers, norbornene monomers, allylic monomers, monomers having at least one vinyl ether moiety, and monomers having at least one isopropenyl moiety. In other embodiments, the non-homopolymerizing monomers can react with sulfur radicals of the sulfur monomers via a thiol-ene reaction or other related processes. For example, the thiol-ene reaction involves the thiolation of a C—C double bond followed by a proton-exchange. In accordance with the present invention, a sulfur radical reacts with a C—C double bond of the non-homopolymerizing monomer. In still other embodiments, the non-homopolymerizing monomers can react with sulfur copolymer radicals of the sulfur copolymers via the thiol-ene reaction or other related processes. For example, a sulfur copolymer radical reacts with a C—C double bond of the non-homopolymerizing monomer.

In yet other embodiments, the sulfur polymer may further comprise one or more termonomers selected from a group consisting of a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer. The termonomers may be present in an amount ranging from about 5 to 50 wt % of the sulfur polymer. For instance, the one or more termonomers are at a level of about 5 to about 10 wt %, or about 10 to about 20 wt %, or about 20 to about 30 wt %, or about 30 to about 40 wt %, or about 40 to about 50 wt % of the sulfur polymer.

Alternative embodiments of the sulfur polymers may further comprise one or more polyfunctional monomers (e.g., difunctional or trifunctional). The one or more polyfunctional monomers can be selected from a group consisting of a polyvinyl monomer (e.g., divinyl, trivinyl), a polyisopropenyl monomer (e.g., diisoprenyl, triisoprenyl), a polyacryl monomer (e.g., diacryl, triacryl), a polymethacryl monomer (e.g., dimethacryl, trimethacryl), a polyunsaturated hydrocarbon monomer (e.g., diunsaturated, triunsaturated), a polyepoxide monomer (e.g., diepoxide, triepoxide), a polythiirane monomer (e.g., dithiirane, trithiirane), a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, and a polyethylenically unsaturated monomer. In some embodiments, the one or more polyfunctional monomers is selected from a group consisting of a divinylbenzene, a diisopropenylbenzene, an alkylene di(meth)acrylate, a bisphenol A di(meth)acrylate, a terpene, a carotene, a divinyl (hetero)aromatic compound and a diisopropenyl (hetero)aromatic compound.

The polyfunctional monomers may be present in an amount ranging from about 5 to 50 wt % of the sulfur polymer. In some embodiments, the one or more polyfunctional monomers are at a level of about 5 to about 10 wt %, or about 10 to about 20 wt %, or about 20 to about 30 wt %, or about 30 to about 40 wt %, or about 40 to about 50 wt % of the sulfur polymer. In some embodiments, the one or more monofunctional monomers are at a level up to about 5 wt %, or about 10 wt %, or about 15 wt % of the sulfur polymer.

In some embodiments, the sulfur polymer is a thermoplastic or a thermoset. The sulfur polymer may be used in preparing elastomers, resins, lubricants, coatings, antioxidants, cathode materials for electrochemical cells, and dental adhesives/restorations. For example, the sulfur polymer may be formed into a polymeric film.

According to yet another embodiment of the present invention, a method of synthesizing a high molecular weight and functional sulfur polymer is provided. The method may comprise providing about 10-95 wt % of elemental sulfur; adding about 5-50 wt % of non-homopolymerizing monomers to the elemental sulfur, wherein the non-homopolymerizing monomers are capable of copolymerizing with the elemental sulfur; heating the elemental sulfur and non-homopolymerizing monomers mixture to initiate copolymerization; and copolymerizing the elemental sulfur and the non-homopolymerizing monomers via free radical polymerization, thereby forming the sulfur polymer. The method can be effective for synthesizing a functional sulfur polymer having a molar mass of at least 2,000 g/mole.

In one embodiment, the method may further comprise pre-heating the elemental sulfur to form a molten sulfur, prior to adding the non-homopolymerizing monomers. The elemental sulfur can be heated to a temperature of about 120 to 130° C. in order to form sulfur radicals that copolymerize with the non-homopolymerizing monomers.

In some embodiments, the elemental sulfur and non-homopolymerizing monomers are heated to a temperature of about 120 to 230° C. Heating the elemental sulfur allows for formation of sulfur radicals that can copolymerize with the non-homopolymerizing monomers via free radical polymerization. For example, the non-homopolymerizing monomers react with the sulfur radicals via a thiol-ene reaction or other related processes.

In some embodiments, the non-homopolymerizing monomers are ethylenically unsaturated monomers. Non-limiting examples of these non-homopolymerizing, ethylenically unsaturated monomers include maleimide monomers, norbornene monomers, allylic monomers, monomers having at least one vinyl ether moiety, and monomers having at least one isopropenyl moiety.

In some embodiments, the present invention features another method of synthesizing a high molecular weight and functional sulfur polymer. The method may comprise providing about 10-95 wt % of sulfur copolymers; adding about 5-50 wt % of non-homopolymerizing monomers to the sulfur copolymers, wherein the non-homopolymerizing monomers are capable of copolymerizing with the sulfur copolymers; heating the sulfur copolymers and non-homopolymerizing monomers mixture to initiate copolymerization; and copolymerizing the sulfur copolymers and the non-homopolymerizing monomers via free radical polymerization, thereby forming the sulfur polymer. Preferably, the method is effective for synthesizing a functional sulfur polymer having a molar mass of at least 2,000 g/mole.

In one embodiment, the sulfur copolymers may comprise sulfur monomers at about 10-95 wt % of the sulfur copolymers, and one or more comonomers at about 5-50 wt % of the sulfur copolymers. The comonomers may be selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, and acrylonitrile comonomer.

In an exemplary embodiment, the sulfur copolymer is prepared by the copolymerization of the one or more comonomers with the sulfur monomers. For example, elemental sulfur is heated to form sulfur radicals, the comonomers are added to the sulfur radicals, and the comonomers can polymerize with the sulfur radicals to form the sulfur copolymer.

In one embodiment, the non-homopolymerizing monomers may be ethylenically unsaturated monomers, such as maleimide monomers, norbornene monomers, allylic monomers, monomers having at least one vinyl ether moiety, and monomers having at least one isopropenyl moiety.

In another embodiment, the method of synthesizing the sulfur polymer may further comprise pre-heating the sulfur copolymer to form a liquid copolymer, prior to adding the non-homopolymerizing monomers. For example, the sulfur copolymer may be heated to a temperature of about 120 to 230° C. in order to form sulfur copolymer radicals that copolymerize with the non-homopolymerizing monomers.

In yet another embodiment, the sulfur copolymers and non-homopolymerizing monomers may be heated to a temperature of about 120 to 230° C. Heating this mixture allows for the formation of sulfur copolymer radicals that can copolymerize with the non-homopolymerizing monomers. For instance, the non-homopolymerizing monomers can react with the sulfur copolymer radicals via a thiol-ene reaction or other related processes.

According to alternative embodiments, the methods of synthesizing the sulfur polymer described herein may be performed in a solvent. The solvent may comprise an organic solvent, such as aromatic solvent.

In still other embodiments, the methods of synthesizing the sulfur polymer described herein may further comprise reacting an available reactive functional group of the functional sulfur polymer with one or more comonomers to form a sulfur terpolymer. The technique of reacting can be oxidative coupling, free radical polymerization, or copolymerization.

In some embodiments, the one or more comonomers are about 5-50 wt % of the sulfur terpolymer. In other embodiments, the one or more comonomers are about 5 about 5 to 10 wt %, or about 10 to 20 wt %, or about 20 to 30 wt %, or about 30 to 40 wt %, or about 40 to 50 wt % of the sulfur terpolymer. These comonomers may be a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer.

In other embodiments, the one or more comonomers may be a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, or a polyethylenically unsaturated monomer.

Examples of techniques of polymerizing include, but are not limited to, free radical polymerization, controlled radical polymerization, ring-opening polymerization, ring-opening metathesis polymerization, step-growth polymerization, and chain-growth polymerization. When polymerizing the elemental sulfur or sulfur copolymers with the non-homopolymerizing monomers, at least one functional sulfur moiety of the elemental sulfur or sulfur copolymers bonds with at least one functional moiety, i.e. the alkene moiety, of the non-homopolymerizing monomers.

For illustrative purposes, the following are non-limiting examples of preparing a sulfur polymer, namely, with non-conventional comonomers.

Example 3. Synthesis of Methyl 4-(Allyloxy)Benzoate

To a 250 mL round bottom flask was added 8.83 g (58.04 mmol) of methyl-4-hydroxybenzoate, 9.81 g (70.98 mmol) of potassium carbonate, 0.78 g (2.95 mmol) of 18-crown-6, 6.2 mL (71.64 mmol) of allyl bromide and 50 mL of acetone and the reaction mixture was refluxed overnight. The reaction mixture was gravity filtered and acetone was removed by rot-vap. Then the crude product was dissolved in DCM and washed with 1M NaOH, 1M NaHSO$_4$, brine and dried with Na$_2$SO$_4$. DCM was removed by rot-yap and 5.8 g of colorless liquid was collected (52% yield).

Example 4. Synthesis of Methyl 3,5-Bis(Allyloxy)Benzoate

To a 100 mL round bottom flask was added 0.98 g (5.80 mmol) of 3,5-dihydroxy methyl benzoate, 1.96 g (14.20 mmol) of potassium carbonate, 0.156 g (0.59 mmol) of 18-crown-6, 1.24 mL (14.33 mmol) and 30 mL acetone and the reaction mixture was refluxed overnight. The reaction mixture was gravity filtered and acetone was removed by rot-yap. Then the crude product was dissolved in DCM and washed with 1M NaOH, 1M NaHSO$_4$, brine and dried with Na$_2$SO$_4$. DCM was removed by rot-yap and 0.64 g of white solid was collected (44% yield).

Example 5. Sulfur-methyl 4-(allyloxy)benzoate Copolymerization

To a 5 mL glass vial equipped a magnetic stir bar was added 700 mg (2.73 mmol) of elemental sulfur and 300 mg (1.56 mmol) of methyl 4-(allyloxy)benzoate and the reaction mixture was heated to 170° C. The reaction mixture was not miscible at the beginning but became red, homogenous solution after 40 min. The complete consumption of 4-(allyloxy)benzoate was confirmed by 1H NMR spectra after 2 h yielding a dark brown fluid. The product turned opaque when cooling to room temperature. The crude product was dissolved in CS$_2$ and loaded on the silica column. The unreacted sulfur was eluted by hexanes (R$_f$=0.8, SiO$_2$, hexanes) and the polymer was eluted by THF (60% yield).

Example 6. Sulfur-methyl 3,5-bis(allyloxy)benzoate Copolymerization

To a 5 mL glass vial equipped a magnetic stir bar was added 900 mg (3.52 mmol) of elemental sulfur and 100 mg (0.40 mmol) of Sulfur-methyl 3,5-bis(allyloxy)benzoate and the reaction mixture was heated to 170° C. The reaction mixture was not miscible at the beginning but became red, homogenous solution after 40 min. The complete consumption of methyl 3,5-bis(allyloxy)benzoate was confirmed by 1H NMR spectra after 1.5 yielding a dark red robber. The product is insoluble in common organic solvents (CH$_2$Cl$_2$, CHCl$_3$, THF and CS$_2$).

Example 7. Sulfur-methyl 3,5-bis(allyloxy) benzoate-methyl 4-(allyloxy) benzoate Copolymerization To a 5 mL glass vial equipped a magnetic stir bar was added 350 mg (1.37 mmol) of elemental sulfur and 100 mg (0.52 mmol) of methyl 4-(allyloxy)benzoate and 50 mg (0.20 mmol) of methyl 3,5-bis(allyloxy)benzoate and the reaction mixture was heated to 170° C. The reaction mixture became red, homogenous solution after 40 min and vitrified after 50 min. The complete consumption of methyl 4-(allyloxy)benzoate and methyl 3,5-bis(allyloxy)benzoate was confirmed by 1H NMR spectra after 3 h yielding a dark brown solid. The crude product was dissolved in CS$_2$ and loaded on the silica column. The unreacted sulfur was eluted by hexanes (R$_f$=0.8, SiO$_2$, hexanes) and the polymer was eluted by THF (68% yield).

Example 8. Sulfur-2,4,6-Triallyloxy-1,3,5-triazine Copolymerization

To a 5 mL glass vial equipped a magnetic stir bar was added 900 mg (3.52 mmol) of elemental sulfur and 100 mg (0.40 mmol) of 2,4,6-Triallyloxy-1,3,5-triazine and the reaction mixture was heated to 170° C. 0.6 mL of 1,2-dichlorobenzene was used to dissolve the reagents. The reaction system turned red after 25 min and orange precipitate formed after 1 h. The complete consumption of 2,4,6-Triallyloxy-1,3,5-triazine was confirmed by NMR after 1 h. The reaction mixture was centrifuged and washed with methanol. 703 mg orange powder was isolated (yield 70%) and the product is insoluble in common organic solvents (CH$_2$Cl$_2$, CHCl$_3$, THF and CS$_2$).

Nucleophilic Activators

Figure 14:
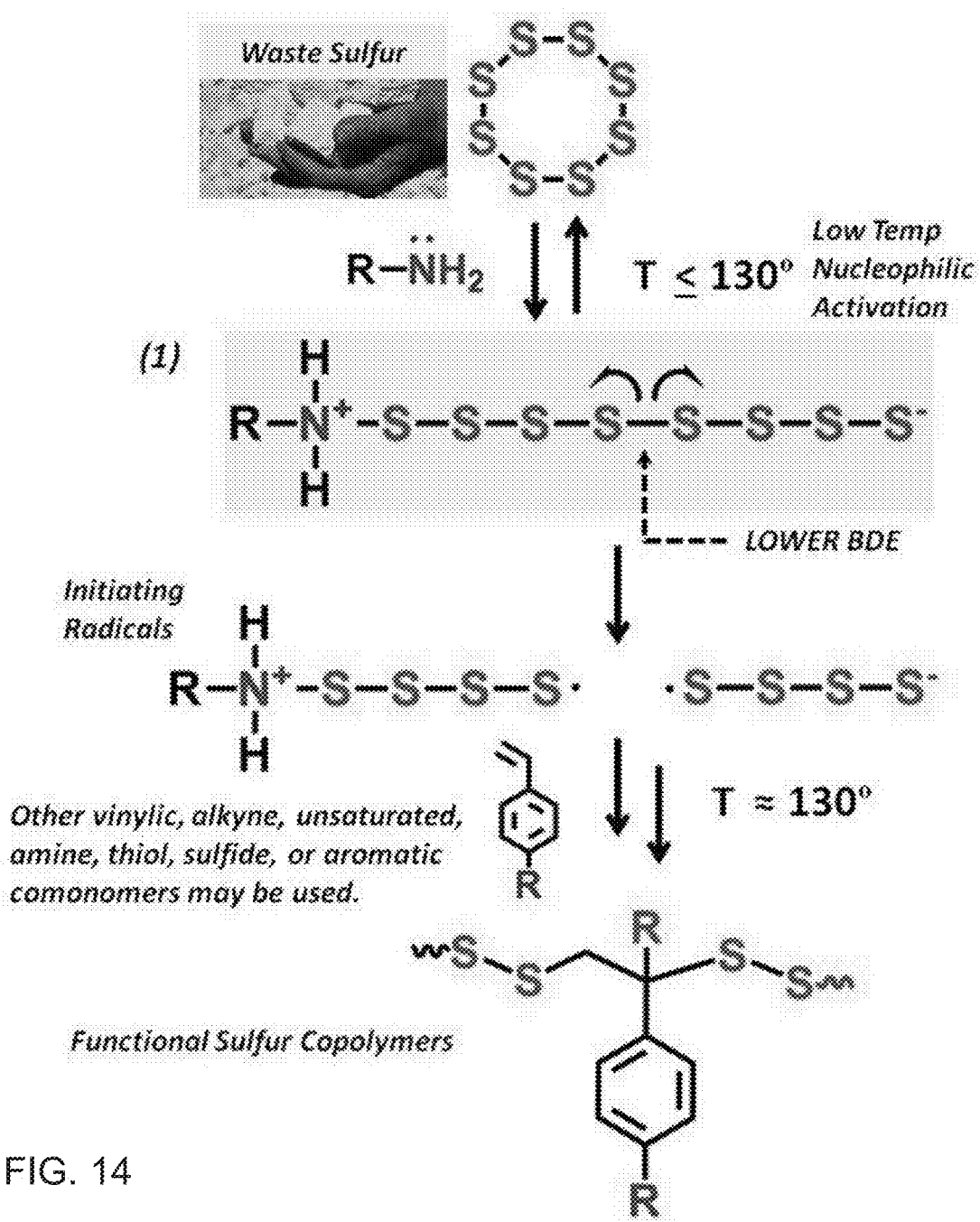
FIG. 14 shows an exemplary reaction scheme of sulfur copolymerization using nucleophilic activators according to an embodiment of the present invention. Unlike the known methods of free radical ring-opening polymerization of $S_8$, which require high temperatures in bulk molten sulfur, the proposed synthetic scheme for polymerization processes via the nucleophilic activation of $S_8$ with amines, or amine functional comonomers, can be done at relatively lower temperatures.
Figure 15:
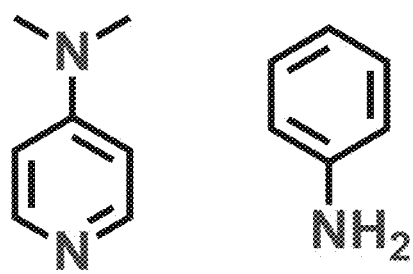
FIG. 15 shows non-limiting examples of heterocyclic amines as nucleophilic activators.
Figure 16:
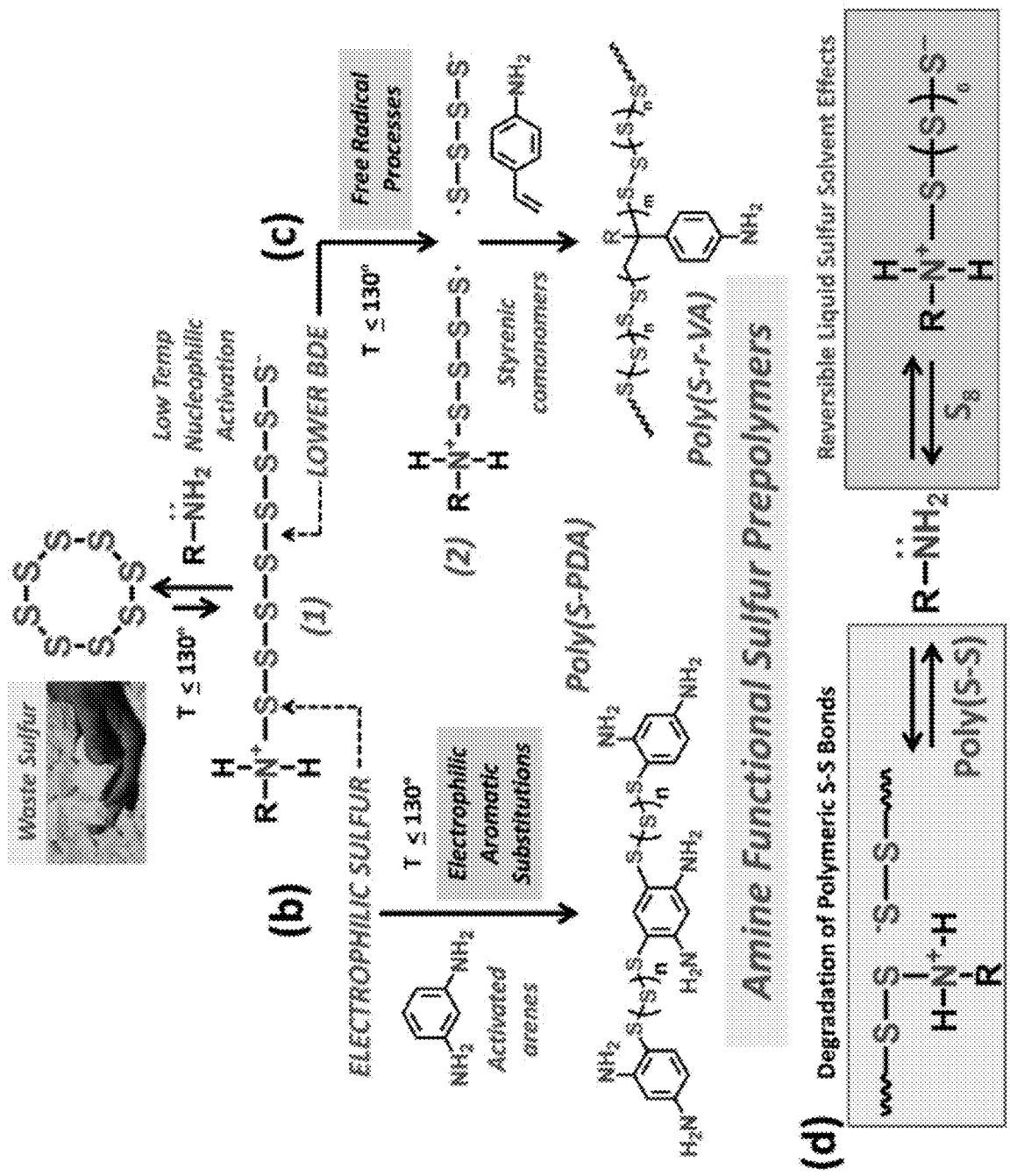
FIG. 16 shows non-limiting and exemplary reaction schemes using a sulfur-activator intermediate (1) in an electrophilic aromatic substitution reaction with 1,3-phenylenediamines (PDA) (b), and free radical polymerization (c) with vinylaniline to form amine functional sulfur copolymers. Reaction (d) shows a reaction scheme of reversible ring-opening of $S_8$ with nucleophilic activators to form reactive sulfobetaine intermediates.
Figure 17:
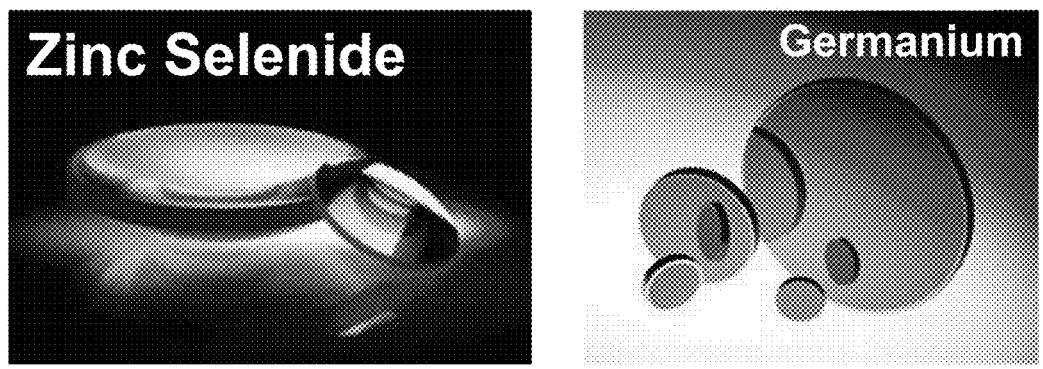
FIG. 17 shows infrared lenses constructed from materials of prior arts.
Figure 18:
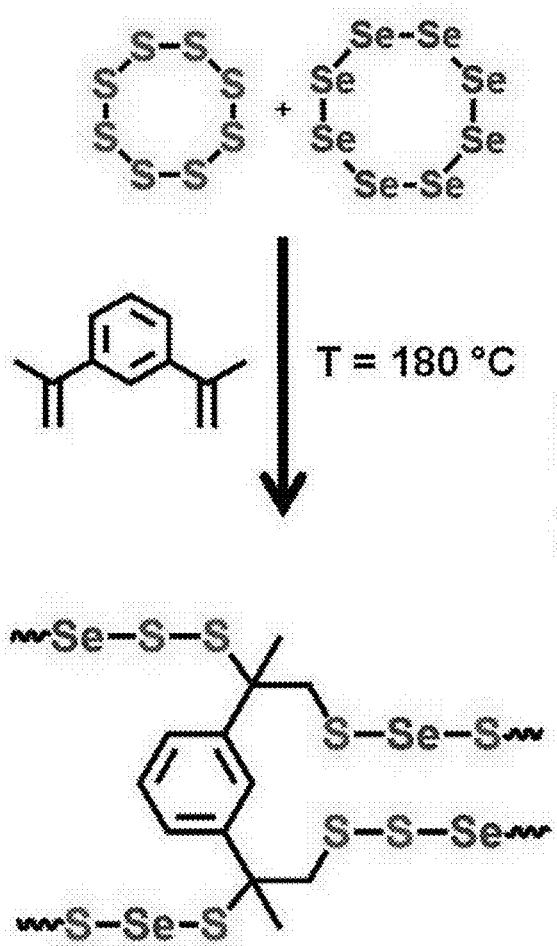
FIG. 18 shows an exemplary reaction schematic of elemental selenium and elemental sulfur polymerizing with comonomers to form chalcogenide-based copolymers with high Se and S content and high refractive index.
Figure 18:
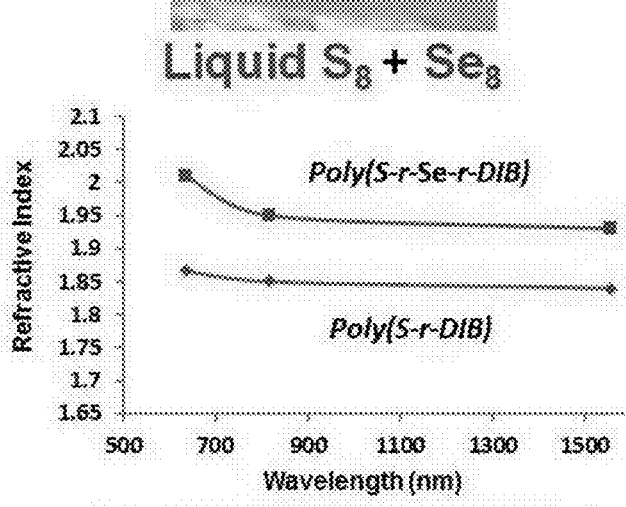
Figure 19:
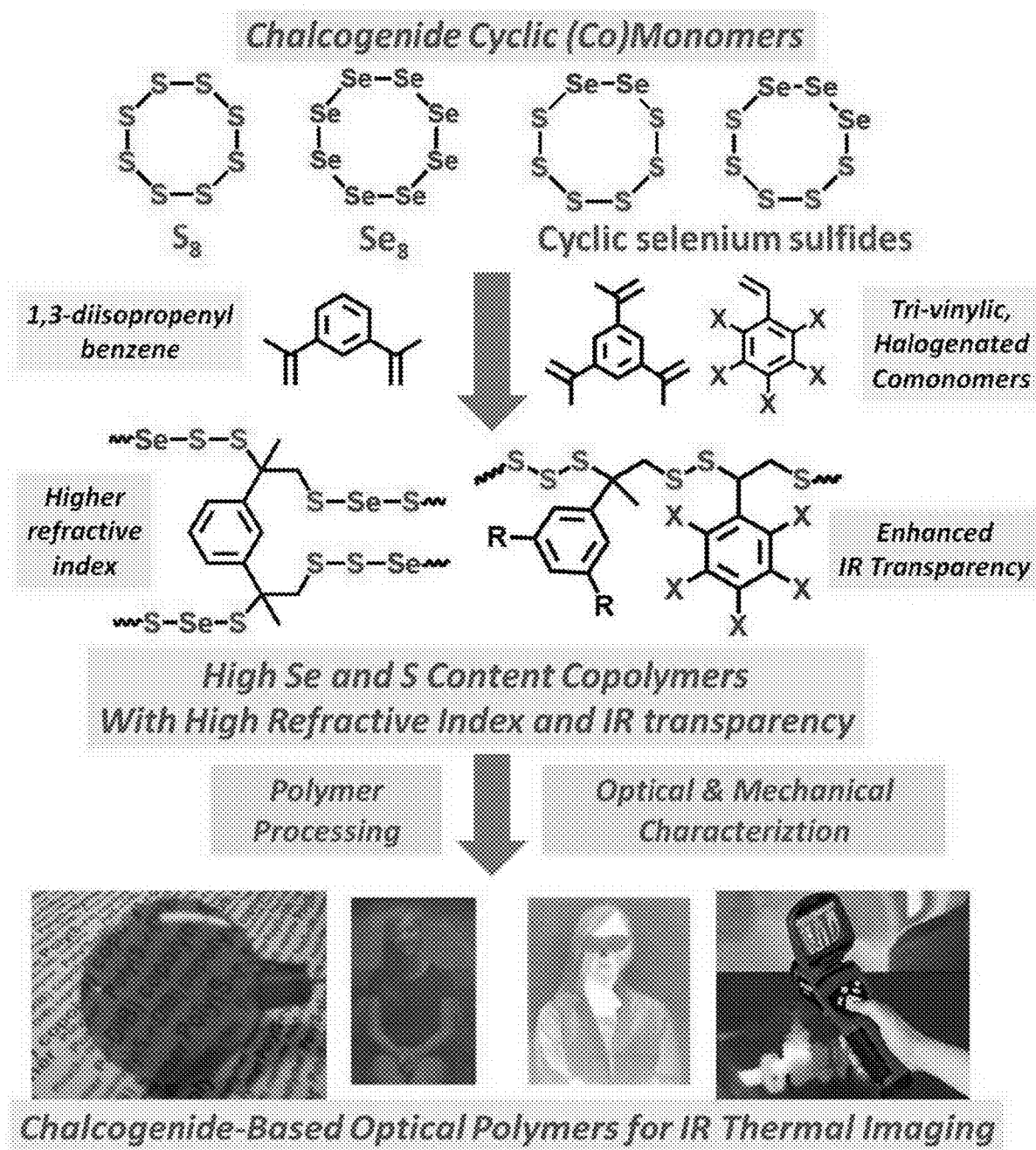
FIG. 19 shows an exemplary reaction schematic of cyclic selenium sulfides and elemental sulfur polymerizing with comonomers to form chalcogenide-based copolymers with high Se and S content. Further depicted are exemplary applications of said chalcogenide copolymers in IR thermal imaging.
Figure 20:
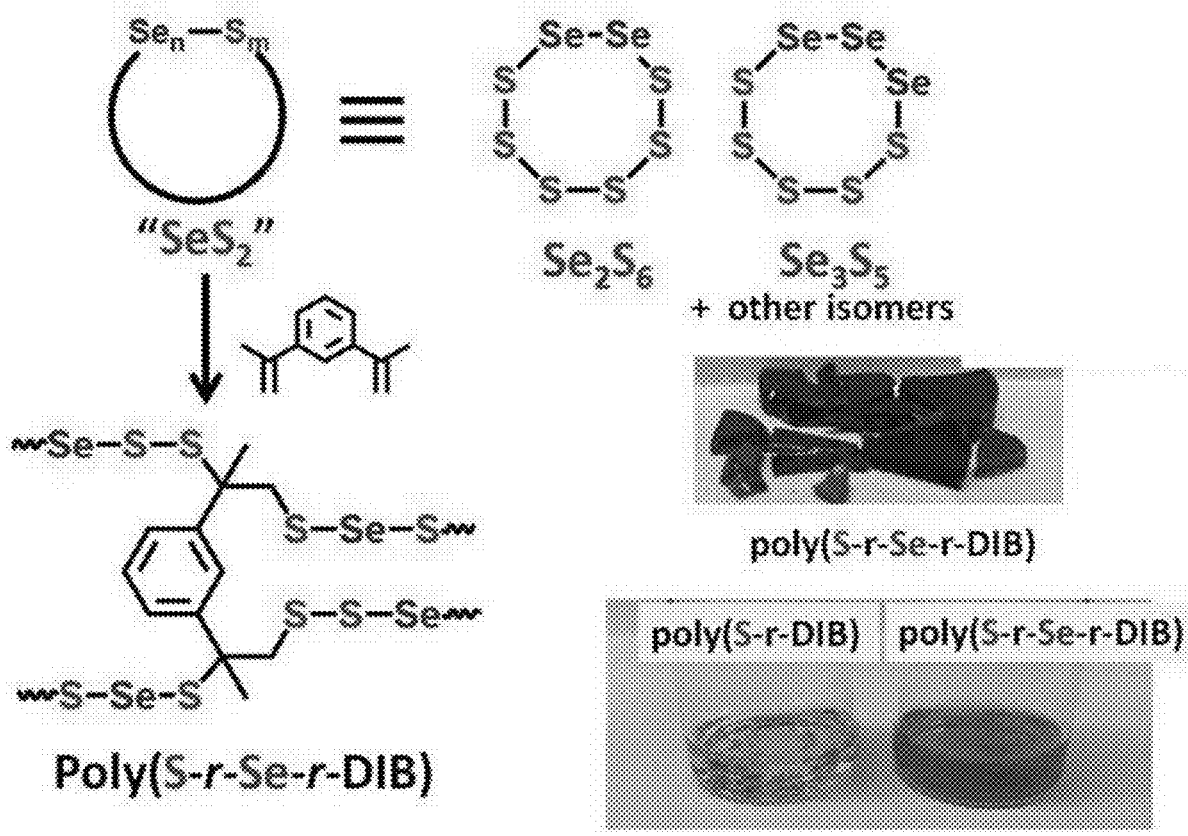
FIG. 20 shows an exemplary reaction schematic of cyclic selenium sulfides and elemental sulfur polymerizing with comonomers to form chalcogenide-based copolymers.
Figure 21A:
FIG. 21A shows an example of chalcogenide-based sulfur copolymer.
Figure 21A:
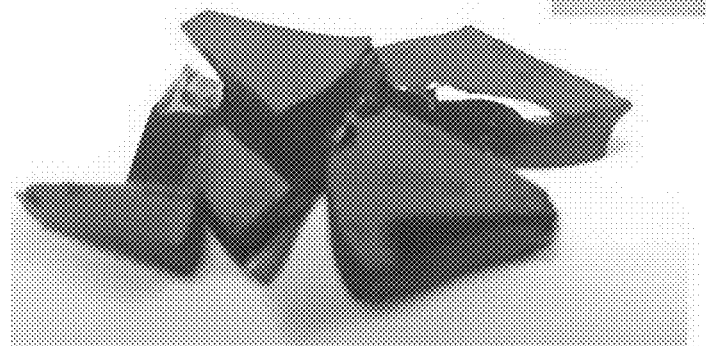
Figure 21A:
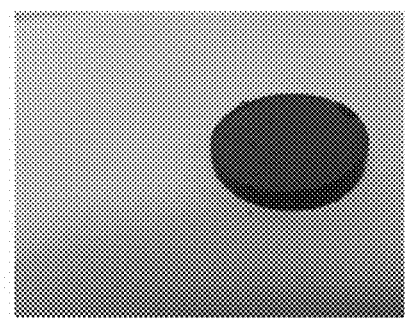
Figure 21B:
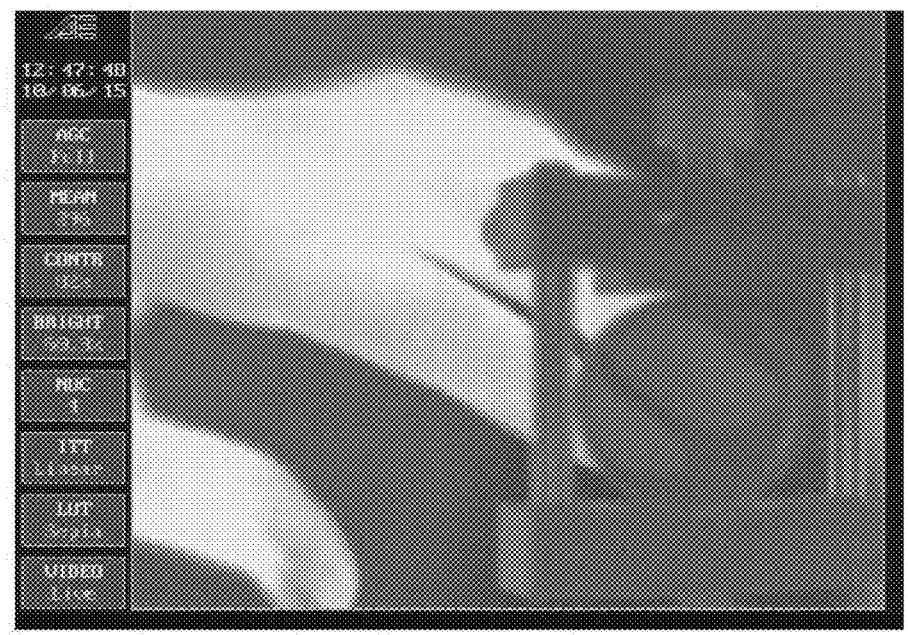
FIG. 21B depicts an IR imaging through an optical substrate containing a chalcogenide-based sulfur copolymer.
Figure 22:
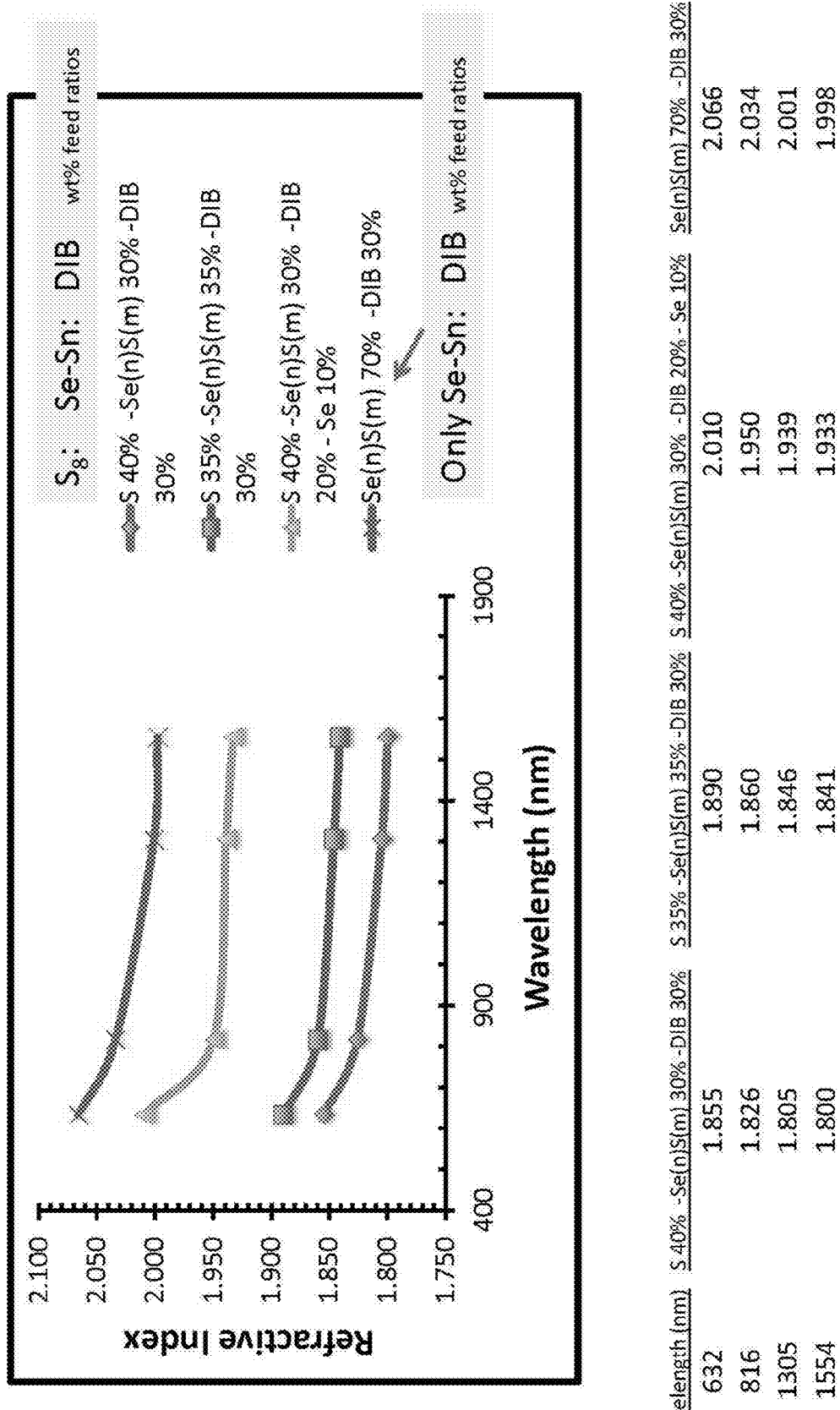
FIG. 22 shows a chart of refractive index vs. wavelength of chalcogenide-based copolymers having varying compositions.
Figure 23:
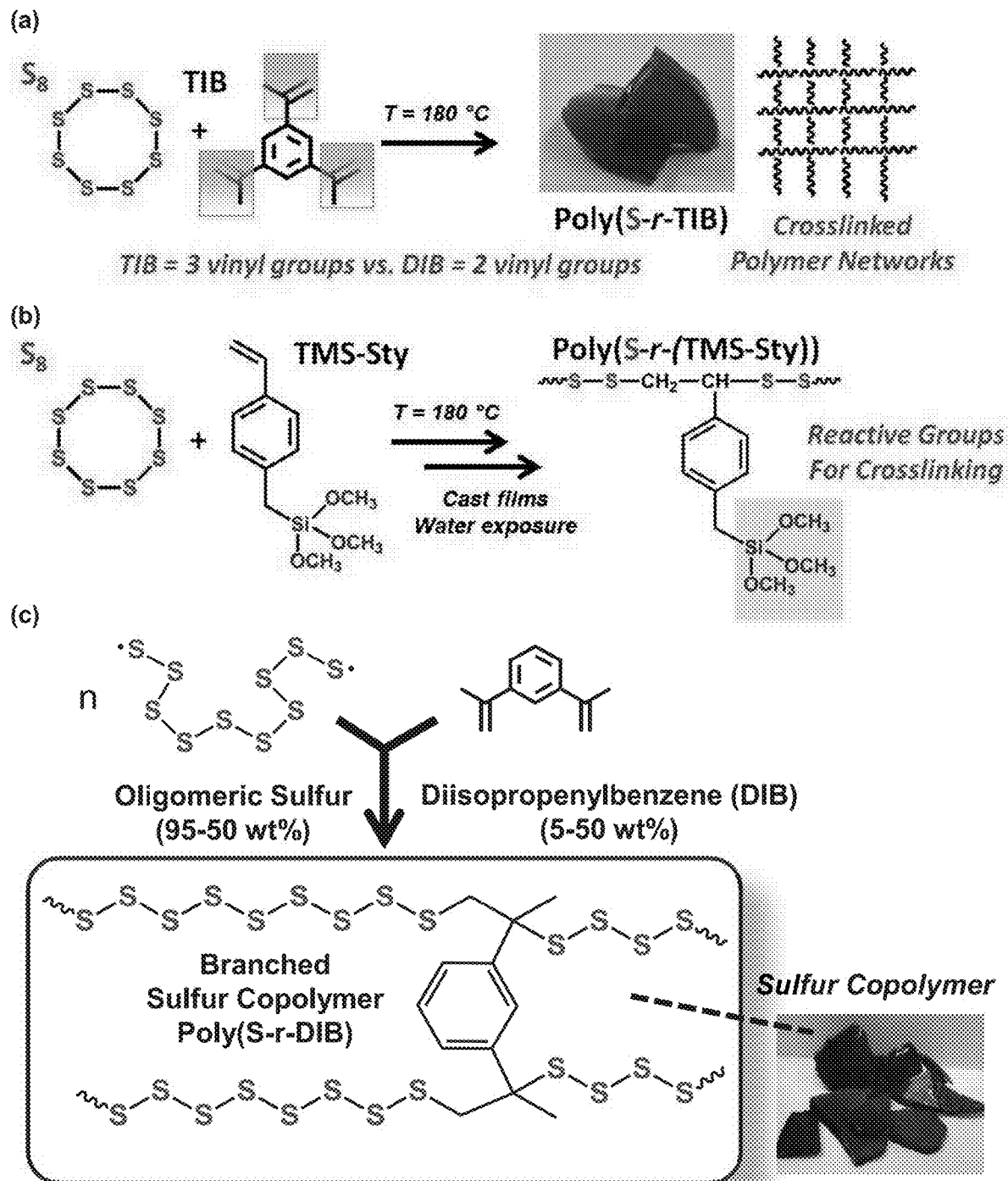
FIG. 23 shows examples of reaction schemes for sulfur copolymers with improved thermomechanical properties and high refractive indexes.

Referring now to FIG. 14-16, an embodiment of the present invention features a method of synthesizing a sulfur copolymer comprising providing about 20-95 mol % of elemental sulfur, heating the elemental sulfur to form a liquid sulfur, adding about 0.1-10 mol % of a nucleophilic activator to the liquid sulfur to form an activated sulfur intermediate, adding about 5-90 mol % of one or more comonomers to the activated sulfur intermediate, and polymerizing the one or more comonomers with the activated sulfur intermediate to form the sulfur copolymer. The step of polymerizing the comonomers with the activated linear polysulfide intermediate can occur at a temperature below about 130° C., for example, below about 120° C. In some embodiments, the nucleophilic activator can catalyze ring-opening of the liquid sulfur via nucleophilic activation, thereby forming the activated sulfur intermediate. Preferably, the nucleophilic activator enables formation of a homogeneous mixture of the comonomers and the activated sulfur intermediate such that the comonomers are miscible with the activated sulfur intermediate. As known to one of ordinary skill in the art, the term "miscible" is defined as an ability of substances to mix in all proportions, thereby forming a homogeneous solution.

Preferably, the elemental sulfur is heated to a temperature of about 120 to 140° C. For instance, the elemental sulfur is heated to a temperature of about 130° C. to form the liquid sulfur. In some embodiments, this temperature range allows homolytical cleaving of S—S bonds in the activated sulfur intermediate to generate sulfur radicals for copolymerization with the comonomers. In other embodiments, the activated sulfur intermediate is further cooled to a temperature below about 120° C. prior to adding to the comonomers.

In one embodiment, a technique of polymerizing can be free radical polymerization. As an example of free radical polymerization, the nucleophilic activator can lower the bond dissociation energy (BDE) of an S—S bond of the activated sulfur intermediate. The S—S bond can spontaneously break to form initiating sulfur radicals that can polymerize with the one or more comonomers. As shown in FIG. 16, reaction (c) demonstrates an example of free radical polymerization. In another embodiment, a technique of polymerizing can be electrophilic substitution. As an example of electrophilic substitution, such as, the electrophilic aromatic substitution of reaction (c) in FIG. 16, the one or more comonomers can bond to the activated sulfur intermediate. The activated sulfur intermediate may be a sulfobetaine intermediate.

In some embodiments, the elemental sulfur are between about 20 to 30 mol %, 30 to 40 mol %, 40 to 60 mol %, 60 to 80 mol %, or 80 to 95 mol %. For example, the elemental sulfur is at least about 50 mol %. In other embodiments, the one or more comonomers are between about 5 to 20 mol %, 20 to 40 mol %, 40 to 60 mol %, 60 to 80 mol %, or 80 to 90 mol %. In further embodiments, the nucleophilic activator is between about 0.1 to 2 mol %, 2 to 4 mol %, 4 to 6 mol %, 6 to 8 mol %, or 8 to 10 mol %.

The choice of nucleophilic activator may be determined according to its ability to reduce the BDE in the S—S bond and to achieve a desired reactivity in the homolytical cleavage of the S—S bonds. Non-limiting examples of the nucleophilic activator may include, but are not limited to amine-containing compounds, nitrogen-containing heterocycles, nucleophilic heterocycles, sulfide-containing compounds, imidazoles, functional imidazoles, anilines, aminostyrene derivatives, 1,8-diazabicyclo[5.4.0]undec-7-ene (DBU), 1,4-diazabicyclo[2.2.2]octane (DABCO), N-heterocyclic carbenes, phosphines, ionic liquids, thiols, ureas, or nucleophilic organocatalysts.

In some embodiments, the one or more comonomers is selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, or styrenic comonomers. In other embodiments, the nucleophilic activator and the one or more comonomers are identical. For instance, the nucleophilic activator and the one or more comonomers are the same compound, such as phenylenediamine (PDA). The one or more comonomers may contain at least one functional moiety that can copolymerize with sulfur or the activated sulfur intermediate.

In some embodiments, the sulfur copolymer may have one or more available reactive functional groups disposed on the one or more comonomers. The one or more comonomers may be bonded to the activated sulfur intermediate via a primary functional group of the comonomer. The comonomer may have a secondary functional group, i.e. the available reactive functional group, which is not bonded to the activated sulfur intermediate.

In other embodiments, the one or more comonomers may be styrenic comonomers. The styrenic comonomers may comprise a vinyl moiety and one or more available reactive functional groups. The vinyl moiety can bonded to the initiating sulfur radical to form a sulfur copolymer. In one embodiment, the one or more available reactive functional groups are selected from a group consisting of a halogen functional group, an amine functional group, an alkyl functional group, an alkyl halide functional group, an alkoxyl functional group, a phenyl functional group, or a nitro functional group. In another embodiment, the one or more available reactive functional groups are selected from a group consisting of carboxylic acids, carboxylate salts, sulfonic acids, sulfonate salts, quaternary ammonium salts, ethers, oligo-ethers, polyethers, polyamines, esters, amides, or alcohols. For example, the halogen functional group is selected from a group consisting of Br, Cl, and F. The alkyl halide functional group may comprise one or more moieties of Br, Cl, or F. In other embodiments, the functional group comprises —$OCH_3$, —COOH, or —COOR.

In other embodiments, the method may further comprise removing the nucleophilic activator from the sulfur copolymer. The nucleophilic activator may be removed by washing or rinsing away from the sulfur copolymer.

In still other embodiments, the method may further comprise reacting the available reactive functional group of the sulfur copolymer with one or more termonomers. The technique of reacting may be oxidative coupling, polymerization, or copolymerization. In one embodiment, the one or more termonomers may be a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, a or a styrenic monomer. In another embodiment, the one or more termonomers may be a group consisting of a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, a polyethylenically unsaturated monomer, or a polystyrenic monomer.

In some embodiments, the method of synthesizing the sulfur copolymer may be performed in a solution. For example, the solution may be an aqueous medium or an organic solvent, such as toluene, THF, DMSO, and DMF. Preferably, synthesis of the sulfur copolymer may be performed in a solution for styrene-containing comonomers.

In one embodiment, the sulfur copolymers may comprise dynamic sulfur-sulfur (S—S) bonds. Preferably, when the dynamic S—S bonds of the sulfur copolymer are broken, the S—S bonds are reconnected by thermal reforming.

In some embodiments, the sulfur copolymer may be a thermoplastic or a thermoset for use in elastomers, resins, lubricants, coatings, antioxidants, cathode materials for electrochemical cells, dental adhesives/restorations. For example, the sulfur copolymer may be a thermoplastic rubber or a thermoplastic elastomer. In another embodiment, the sulfur copolymer may be in a form of a polymeric film. For example, the sulfur copolymer may be a thin film coating for a surface of a substrate.

Another embodiment of the present invention features a sulfur polymer comprising about 20-95 mol % of elemental sulfur, about 0.1-10 mol % of a nucleophilic activator, and about 5-90 mol % of one or more comonomers. Preferably, the nucleophilic activator reacts with the elemental sulfur to ring open the elemental sulfur via nucleophilic activation to form an activated sulfur intermediate prior to polymerizing with the one or more monomers, wherein the nucleophilic activator enables formation of a homogeneous mixture of the comonomers and the activated sulfur intermediate such that the comonomers are miscible with the activated sulfur intermediate.

Non-limiting examples of the nucleophilic activator may include, but are not limited to amine-containing compounds, nitrogen-containing heterocycles, nucleophilic heterocycles, sulfide-containing compounds, imidazoles, functional imidazoles, anilines, aminostyrene derivatives, 1,8-diazabicyclo[5.4.0]undec-7-ene (DBU), 1,4-diazabicyclo[2.2.2]octane (DABCO), N-heterocyclic carbenes, phosphines, ionic liquids, thiols, ureas, and nucleophilic organocatalysts.

In some embodiments, the one or more comonomers may be amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, or styrenic comonomers. In other embodiments, the sulfur polymer may have one or more available reactive functional groups disposed on the one or more comonomers, with the provision that the one or more available reactive functional groups is not directly linked to the sulfur. In still other embodiments, the nucleophilic activator and the one or more comonomers are identical, i.e. the same compound.

In some embodiments, the styrenic comonomers may comprise a vinyl moiety and one or more available reactive functional groups. The vinyl functional group of the styrenic comonomers can react with the activated sulfur intermediate to form the sulfur copolymer having the one or more available reactive functional groups. In one embodiment, the one or more available reactive functional groups may comprise a halogen functional group, an amine functional group, an alkyl functional group, an alkyl halide functional group, an alkoxyl functional group, a phenyl functional group, or a nitro functional group. In another embodiment, the one or more available reactive functional groups may be carboxylic acids, carboxylate salts, sulfonic acids, sulfonate salts, quaternary ammonium salts, ethers, oligo-ethers, polyethers, polyamines, esters, amides, or alcohols. For example, the halogen functional group or the may be a Br, Cl, and F. As another example, the alkyl halide functional group may comprise one or more moieties of Br, Cl, or F. In other embodiments, the functional group comprises —OCH$_3$, —COOH, or —COOR.

In other embodiments, the sulfur polymer may further comprise about 5 to 50 mol % of one or more termonomers. Each termonomer may be linked to the available reactive functional group disposed on the one or more comonomers. In one embodiment, the one or more termonomers may be a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer. In another embodiment, the one or more termonomers are selected from a group consisting of a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, a polyethylenically unsaturated monomer, or a polystyrenic monomer.

In some embodiments, the sulfur polymer may further comprise a solution. For example, the elemental sulfur, the nucleophilic activator, and the one or more comonomers may be disposed in the solution. The solution may be an aqueous medium or an organic solvent such as toluene, THF, DMSO, and DMF.

Another embodiment of the present invention features a method of making an article formed from any of the sulfur polymers described herein. In some embodiments, the method may comprise heating the sulfur polymer to a temperature in the range of about 120° C. to about 230° C. to form a prepolymer, forming the prepolymer into a shape of the article to yield a formed prepolymer, and curing the formed prepolymer to yield the article. In one embodiment, the prepolymer is coated and cured as a thin film on a substrate. In another embodiment, the prepolymer is shaped and cured using a mold.

Further embodiments of the present invention features an electrochemical cell comprising an anode comprising metallic lithium, a cathode comprising any of the sulfur polymer described herein, and a non-aqueous electrolyte interposed between the cathode and the anode. In some embodiments, the electrochemical cell may have an increased volumetric energy density. In other embodiments, a capacity of the electrochemical cell ranges from about 200 to about 1500 mAh/g.

In still other embodiments, the present invention may feature an optical substrate comprising any of the sulfur polymer described herein. The optical substrate may be a substantially transparent optical body, such as a film, a lens, or a free-standing object. In some embodiments, the optical substrate has a refractive index in the range of about 1.7 to about 2.6 and at least one wavelength in the range of about 500 nm to about 10 μm. Preferably, the optical substrate has an optical transparency in the visible and infrared spectrum.

Experimental

The following are exemplary and non-limiting embodiments of copolymerizing elemental sulfur with a comonomer using a nucleophilic activator.

Example 9. Copolymerization of Sulfur and 4-vinylaniline

Elemental sulfur ($S_8$) was added to a glass vial equipped with a magnetic stir bar and heated to about 120-130° C. until liquid sulfur was formed. A 4-vinylaniline was added dropwise to the liquid sulfur. The reaction mixture was heated for about 20-30 minutes until no 4-vinylaniline monomers remained.

Example 10. Copolymerization of Sulfur and Styrene

Polymerizing of liquid sulfur and styrene (at T≈120° C.) in the presence of about 1-10 mol % of a nucleophilic activator that can ring-open $S_8$ to form sulfobetaine intermediates resulted in a 2-100 fold rate acceleration.

Example 11

$S_8$ was added to a glass vial equipped with a magnetic stir bar and heated to 130° C. until liquid sulfur was formed. Styrene and about 1 mol % of 1-methylimidazole was added to the liquid sulfur. The reaction mixture was heated at 120° C. for about 2.5 hours until no styrene monomers remained.

Another embodiment of the present invention features a method of solubilizing elemental sulfur ($S_8$) in a reactive media. The method may comprise providing about 5-99 mol % of elemental sulfur, heating the elemental sulfur to form a liquid sulfur, adding about 0.1-10 mol % of a nucleophilic activator to the liquid sulfur, wherein the nucleophilic activator promotes ring-opening of the liquid sulfur via nucleophilic activation, thereby forming an activated linear polysulfide intermediate, and adding the activated linear polysulfide intermediate to the reactive media thereby forming a homogeneous reaction mixture. Preferably, the activated linear polysulfide intermediate is soluble in the reactive media at a temperature below about 120° C. As used herein, the term "solubilize", and derivatives thereof, are defined as forming homogeneous reaction mixtures, which is characterized by the formation of transparent fluid phases.

In yet another embodiment, the present invention may feature a sulfur copolymer prepared by a process comprising the steps of providing about 5-99 mol % of elemental sulfur, heating the elemental sulfur to form a liquid sulfur, adding about 0.1-10 mol % of a nucleophilic activator to the liquid sulfur, wherein the nucleophilic activator promotes ring-opening of the liquid sulfur via nucleophilic activation, thereby forming an activated linear polysulfide intermediate, adding about 5-50 mol % of one or more comonomers to the activated linear polysulfide intermediate, wherein the nucleophilic activator enables formation of a homogeneous mixture of the comonomers and the activated linear polysulfide intermediate such that the comonomers are miscible with the activated linear polysulfide intermediate, and polymerizing the one or more comonomers with the activated linear polysulfide intermediate to form a sulfur copolymer, wherein polymerizing the comonomers with the activated linear polysulfide intermediate occurs at a temperature below about 120° C. In a further embodiment, the process may further comprise adding the activated linear polysulfide intermediate to a reactive media prior to adding the comonomers, thereby forming a homogeneous reaction mixture wherein the activated linear polysulfide compound is soluble in the reactive media at a temperature below about 120° C. In yet another embodiment, the process further comprises reacting the available reactive functional group of the sulfur copolymer with one or more termonomers.

In some embodiments, the nucleophilic activator is selected from a group consisting of amine-containing compounds, nitrogen-containing heterocycles, sulfide-containing compounds, imidazoles, functional imidazoles, anilines, aminostyrene derivatives, 1,8-diazabicyclo[5.4.0.]undec-7-ene (DBU), 1,4-diazabicyclo[2.2.2]octane (DABCO), nucleophilic heterocycles, N-heterocyclic carbenes, phosphines, aromatic phosphines, ionic liquids, thiols, ureas, and nucleophilic organocatalysts. Preferably, the nature of the nucleophilic activator can be used to tune the solubility of the elemental sulfur with the activator, or with other comonomers in presence of sulfur and nucleophilic activator. Hence, use of nucleophilic activators with substituents may be used or designed to modify the solubility, or miscibility of activated sulfur intermediates into polar or nonpolar reactive media, such as solvents or comonomers that are unsaturated or vinylic substances that can copolymerize with elemental sulfur.

In one embodiment, the reactive media may comprise an organic solvent, such as toluene, THF, DMSO, and DMF, a diluent, an aqueous medium, or a combination thereof. One or more comonomers may be added to the homogenous reaction mixture and polymerize with the activated linear polysulfide intermediate to form a sulfur copolymer. In another embodiment, the reactive media may comprise one or more comonomers, which can polymerize with the activated linear polysulfide intermediate to form a sulfur copolymer.

In some embodiments, the elemental sulfur, the nucleophilic activator and the reactive media can be initially premixed prior to heating. In other embodiments, the elemental sulfur, the nucleophilic activator and the comonomers can be initially premixed prior to heating. In still other embodiments, the elemental sulfur, the nucleophilic activator, the comonomers, and the reactive media can be initially premixed prior to heating. Initiators, such as conventional azo or peroxide initiators, may also be added in any of the premixed compositions.

In some embodiments, a technique of polymerizing is free radical polymerization, wherein the nucleophilic activator lowers a bond dissociation energy of an S—S bond of the polysulfide intermediate, wherein spontaneous breaking of the S—S bond forms initiating sulfur radicals that polymerize with the one or more comonomers. The nucleophilic activator and elemental sulfur enable a neat mixture, or a mixture diluted in a solvent to temperatures less than, or equal to the melting point of sulfur, with the addition of an initiator, catalyst, or other mediator that can promote free radical copolymerization. In other embodiments, the technique of polymerizing is electrophilic substitution, wherein the one or more comonomers bond to the activated polysulfide intermediate. In further embodiments, an initiator may be added to the reaction mixture to initiate and enhance rate of polymerization of the one or more comonomers and the activated linear polysulfide intermediate.

In one embodiment, the one or more comonomers is selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, and acrylonitrile comonomers. Other examples of comonomers include, but are not limited to, DIB and analogues, alkynes, alkenes, unsaturated, cyclic saturated, aliphatic compounds with unsaturation, methacrylates, acrylates, dienes, polydienes, acrylonitrile, vinyl ethers, vinyl esters and functional vinylic comonomers. In still other embodiments, the ethylenically unsaturated comonomers are comonomers that are capable of thiol-ene, or thiol-yne reactions.

Preferably, the nucleophilic activator upon reaction with liquid sulfur renders the mixture soluble at temperatures lower than 120° C. (which is the melting point of sulfur) in conventional vinylic or unsaturated comonomers, which includes those from the family of styrenics, acrylates, methacrylates, acrylonitrile, vinyl esters, vinyl ethers, dienes, polyenes, cyclic unsaturated compounds. Without wishing to limit the invention to a particular theory or mechanism, the limited solubility of elemental sulfur in conventional comonomers or solvents, and the limited miscibility of liquid sulfur in the same can be resolved by the nucleophilic activators. For volatile comonomers with low miscibility in liquid sulfur, these methods enable for the first time a route to form homogeneous mixtures suitable for free radical copolymerization reactions.

In one embodiment, the elemental sulfur is heated to a temperature of about 120° C., i.e. the melting point of elemental sulfur. In another embodiment, the elemental sulfur is heated to a temperature of about 120-130° C. In one referred embodiment, the activated linear polysulfide intermediate is cooled to a temperature below about 120° C. prior to adding to the reactive media. For instance, the polysulfide intermediate may be cooled to about 70-115° C. As another example, the polysulfide intermediate may be cooled to about or below the boiling point of the comonomers.

In some embodiments, the sulfur copolymer has one or more available reactive functional groups disposed on the one or more comonomers. The one or more available reactive functional groups can be a halogen functional group, such as Br, Cl, and F, an amine functional group, an alkyl functional group, an alkyl halide functional group, which may comprise one or more moieties of Br, Cl, or F, an alkoxyl functional group, a phenyl functional group, a nitro functional group, carboxylic acids (COOH), carboxylate salts, sulfonic acids, sulfonate salts, quaternary ammonium salts, ethers (—$OCH_3$), oligo-ethers, polyethers, polyamines, esters (—COOR), amides, or alcohols.

In other embodiments, the nucleophilic activator and the one or more comonomers are identical. The one or more comonomers may have a functional moiety that copolymerizes with the activated polysulfide intermediate. In alternate embodiments, the nucleophilic activator is removed, i.e. washed away, from the sulfur copolymer.

According to some embodiments, the available reactive functional group of the sulfur copolymer may be reacted with one or more termonomers. A technique of reacting can be oxidative coupling, polymerization, or copolymerization. Examples of termonomers include, but are not limited to, a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer. Further examples of the one or more termonomers include, but are not limited to, a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomer, a polynitrone monomer, a polyaldehyde monomer, a polyketone monomer, a polyethylenically unsaturated monomer, or a polystyrenic monomer.

In preferred embodiments, the sulfur copolymer may be a thermoplastic or a thermoset for use in elastomers, resins, lubricants, coatings, antioxidants, cathode materials for electrochemical cells, dental adhesives/restorations.

Another embodiment of the present invention features a method of making an article formed from any of the sulfur copolymers described herein. In some embodiments, the method may comprise heating the sulfur copolymer composition to a temperature in the range of about 120° C. to about 230° C. to form a prepolymer, forming the prepolymer into a shape of the article to yield a formed prepolymer, and curing the formed prepolymer to yield the article. In one embodiment, the prepolymer is coated and cured as a thin film on a substrate. In another embodiment, the prepolymer is shaped and cured using a mold.

In still other embodiments, the present invention may feature an optical substrate comprising any of the sulfur copolymers described herein. The optical substrate may be a substantially transparent optical body, such as a film, a lens, or a free-standing object. In some embodiments, the optical substrate has a refractive index in the range of about 1.7 to about 2.6 and at least one wavelength in the range of about 500 nm to about 10 µm. Preferably, the optical substrate has an optical transparency in the visible and infrared spectrum.

Further embodiments of the present invention features an electrochemical cell comprising an anode comprising metallic lithium, a cathode comprising any of the sulfur copolymers described herein, and a non-aqueous electrolyte interposed between the cathode and the anode. In some embodiments, the electrochemical cell may have an increased volumetric energy density. In other embodiments, a capacity of the electrochemical cell ranges from about 200 to about 1500 mAh/g.

Optical Polymers

Referring now to FIGS. 17-36, the chalcogenide copolymers that are described herein are the first class of polymeric materials that exhibit high transparency in the short-wave and mid-IR regimes due to the presence of largely IR inactive S—S bonds. Furthermore, since these chalcogenide copolymers are readily melt, or solution processed, fabrication of free standing films, windows, or lenses can be easily conducted. Access to these kinds of high quality and inexpensive lenses are anticipated to open new opportunities in low cost IR optical devices and technologies including IR thermal imaging rifle scopes and home monitoring.

According to one embodiment, the present invention features a chalcogenide copolymer comprising one or more cyclic selenium sulfide monomers having the formula $Se_n S_{(8-n)}$; and one or more comonomers each selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, and acrylonitrile comonomers at a level in the range of about 5-50 wt % of the chalcogenide copolymer. Assuming that n=7, i.e. $Se_7S$, then the cyclic selenium sulfide monomers may comprise at most about 70 wt % of selenium. In preferred embodiments, the chalcogenide copolymer has a refractive index of about 1.7-2.6 at a wavelength in a range of about 500 nm to about 8 µm. The cyclic selenium sulfide monomers is polymerized with the comonomers such that at least one functional sulfur moiety of the selenium-sulfide is bonded to at least one functional moiety of the one or more monomers.

In some embodiments, n in an integer that can range from 1 to 7. For example, when n=2, the cyclic selenium sulfide monomers have the formula $Se_2S_6$. As another example, when n=3, the cyclic selenium sulfide monomers have the formula $Se_3S_5$. Preferably, the one or more cyclic selenium sulfide monomers can comprise all possible isomers of a specific formula. In alternative embodiments, the selenium sulfide monomers can be of the formula $Se_n S_m$, wherein n ranges from 1 to 7 and m ranges from 1 to 7, wherein the selenium sulfide monomers are not necessarily cyclic.

In other embodiments, the chalcogenide copolymer may further comprise one or more sulfur monomers, comprising elemental sulfur ($S_8$), at a level of about 1-60 wt % of the chalcogenide copolymer. In still other embodiments, the chalcogenide copolymer may further comprise elemental selenium (e.g., $Se_8$ or other allotropes), at a level of about 1-60 wt % of the chalcogenide copolymer. For instance, the chalcogenide copolymer may comprise one or more cyclic selenium sulfide monomers, sulfur monomers, and the one or more comonomers; or the the chalcogenide copolymer may comprise one or more cyclic selenium sulfide monomers, elemental selenium, and the one or more comonomers. Further still, the chalcogenide copolymer may comprise one or more cyclic selenium sulfide monomers, sulfur monomers, elemental selenium, and the one or more comonomers.

In some embodiments, the chalcogenide copolymer may comprise $S_8$ and elemental selenium, in place of the cyclic selenium sulfide monomers. Without wishing to limit the invention to a particular theory or mechanism, the Se—Se bonds of elemental selenium are broken up in the presence of sulfur radicals generated by the ring opening of $S_8$, thereby forming a sulfur-selenium copolymer. Additional comonomers may be added with the $S_8$ and elemental selenium, or thereafter to the sulfur-selenium copolymer.

In one embodiment, the chalcogenide copolymer comprises one or more cyclic selenium sulfide monomers at a range of about 1 to 5 wt %, or about 5 to 10 wt %, or about 10 to 20 wt %, or about 20 to 30 wt %, or about 30 to 40 wt %, or about 40 to 50 wt %, or about 50 to 60 wt %, or about 60 to 70 wt % of the chalcogenide copolymer. In another embodiment, the cyclic selenium sulfide monomers may comprise selenium units of at most about 20 wt %, or at most about 30 wt %, or at most about 40 wt % or at most about 50 wt %, or at most about 60 wt %, or at most about 70 wt % of the cyclic selenium sulfur monomers.

In some embodiments, the chalcogenide copolymer comprises one or more comonomers at a range of about 5 to 10 wt %, or about 10 to 20 wt %, or about 20 to 30 wt %, or about 30 to 40 wt %, or about 40 to 50 wt % of the chalcogenide copolymer. In other embodiments, the chalcogenide copolymer comprises sulfur monomers at a range of about 1 to 5 wt %, or about 5 to 10 wt %, or about 10 to 20 wt %, or about 20 to 30 wt %, or about 30 to 40 wt %, or about 40 to 50 wt % of the chalcogenide copolymer. In further embodiments, the chalcogenide copolymer comprises elemental selenium at a range of about 1 to 5 wt %, or about 5 to 10 wt %, or about 10 to 20 wt %, or about 20 to 30 wt %, or about 30 to 40 wt %, or about 40 to 50 wt % of the chalcogenide copolymer. For instance, the chalcogenide copolymer may comprise 30 wt % sulfur, 35 wt % cyclic selenium-sulfide, and 35 wt % 1,3diisopropenyl benzene.

In yet other embodiments, the chalcogenide copolymer may further comprise one or more termonomers selected from a group consisting of a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer. The termonomers may be present in an amount ranging from about 5 to 50 wt % of the chalcogenide copolymer.

In still other embodiments, the chalcogenide copolymer may further comprise one or more polyfunctional monomers selected from a group consisting of a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomers, a polynitrone monomers, a polyaldehyde monomers, a polyketone monomers, and a polyethylenically unsaturated monomers. The polyfunctional monomers may be present in an amount ranging from about 5 to 50 wt % of the chalcogenide copolymer.

According to some embodiments, the chalcogenide copolymer is substantially transparent in an infrared or visible spectrum. For instance, the chalcogenide copolymer may substantially transparent in a spectrum having a wavelength range of about 1000-1500 nm, or 1500-3000 nm, or about 3000-5000 nm, or about 5-10 microns. Preferably, the chalcogenide copolymer can be formed into a substantially transparent substrate, wherein the transparent substrate is a film, a lens, or a free-standing object.

According to another embodiment, the present invention features a method of producing a chalcogenide copolymer, said method comprising providing cyclic selenium sulfide having the formula $Se_nS_{(8-n)}$, wherein the cyclic selenium sulfide monomers comprises at most about 70 wt % of selenium; heating the cyclic selenium sulfide to form a liquid selenium sulfide; adding about 5-50 wt % of one or more comonomers to the liquid selenium sulfide, wherein the one or more monomers is selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, and acrylonitrile comonomers; and polymerizing the comonomers with the liquid selenium sulfide to form the chalcogenide copolymer. The chalcogenide copolymer may be further heated until the chalcogenide copolymer is substantially vitrified. Preferably, the chalcogenide can have a refractive index of about 1.7-2.6 at a wavelength in a range of about 500 nm to about 8 µm.

In some embodiments, n in an integer that can range from 1 to 7. For example, when n=2, the cyclic selenium sulfide can have the formula $Se_2S_6$. As another example, when n=3, the cyclic selenium sulfide can have the formula $Se_3S_5$. Preferably, the cyclic selenium sulfide can comprise all possible isomers of a specific formula. In alternative embodiments, the selenium sulfide can be of the formula $Se_nS_m$, wherein n ranges from 1 to 7 and m ranges from 1 to 7, wherein the selenium sulfide are not necessarily cyclic.

In other embodiments, the method may further comprise adding about 5-50 wt % of elemental sulfur to the cyclic selenium sulfide prior to adding the comonomers. In yet other embodiments, the method may further comprise adding adding about 5-50 wt % of elemental selenium to the cyclic selenium sulfide prior to adding the comonomers.

Examples of techniques of polymerizing include, but are not limited to, free radical polymerization, controlled radical polymerization, ring-opening polymerization, ring-opening metathesis polymerization, step-growth polymerization, and chain-growth polymerization. When polymerizing the comonomers with the liquid selenium sulfide, at least one functional sulfur moiety of the selenium sulfide to bond with at least one functional moiety of the one or more monomers.

In still other embodiments, the method may further comprise polymerizing the chalcogenide copolymer with one or more termonomers selected from a group consisting of a vinyl monomer, an isopropenyl monomer, an acryl monomer, a methacryl monomer, an unsaturated hydrocarbon monomer, an epoxide monomer, a thiirane monomer, an alkynyl monomer, a diene monomer, a butadiene monomer, an isoprene monomer, a norbornene monomer, an amine monomer, a thiol monomer, a sulfide monomer, an alkynylly unsaturated monomer, a nitrone monomer, an aldehyde monomer, a ketone monomer, an ethylenically unsaturated monomer, or a styrenic monomer. The termonomers may be present in an amount ranging from about 5 to 50 wt % of the chalcogenide copolymer.

In still other embodiments, the method may further comprise polymerizing the chalcogenide copolymer with one or more polyfunctional monomers (e.g., difunctional or trifunctional). The one or more polyfunctional monomers may be selected from a group consisting of a polyvinyl monomer (e.g., divinyl, trivinyl), a polyisopropenyl monomer (e.g., diisoprenyl, triisoprenyl), a polyacryl monomer (e.g., diacryl, triacryl), a polymethacryl monomer (e.g., dimethacryl, trimethacryl), a polyunsaturated hydrocarbon monomer (e.g., diunsaturated, triunsaturated), a polyepoxide monomer (e.g., diepoxide, triepoxide), a polythiirane monomer (e.g., dithiirane, trithiirane), a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomers, a polynitrone monomers, a polyaldehyde monomers, a polyketone monomers, and a polyethylenically unsaturated monomers. The polyfunctional monomers may be present in an amount ranging from about 5 to 50 wt % of the chalcogenide copolymer.

In some embodiments, the one or more polyfunctional monomers is selected from a group consisting of a divinylbenzene, a diisopropenylbenzene, an alkylene di(meth)acrylate, a bisphenol A di(meth)acrylate, a terpene, a carotene, a divinyl (hetero)aromatic compound and a diisopropenyl (hetero)aromatic compound.

In some embodiments, the one or more polyfunctional monomers are at a level of about 2 to about 50 wt %, or about 2 to about 10 wt %, or about 10 to about 20 wt %, or about 20 to about 30 wt %, or about 30 to about 40 wt %, or about 40 to about 50 wt % of the chalcogenide copolymer. In some embodiments, the one or more monofunctional monomers are at a level up to about 5 wt %, or about 10 wt %, or about 15 wt % of the chalcogenide copolymer.

According to some embodiments, the method produces a chalcogenide copolymer that is substantially transparent in an infrared or visible spectrum. For instance, the chalcogenide copolymer may substantially transparent in a spectrum having a wavelength range of about 1000-1500 nm, or 1500-3000 nm, or about 3000-5000 nm, or about 5-10 microns. Preferably, the chalcogenide copolymer can be formed into a substantially transparent substrate, wherein the transparent substrate is a film, a lens, or a free-standing object.

For instance, the chalcogenide copolymer is coated on a substrate and cured as a thin film; or shaped and cured using a mold; or fabricated into an optical device component, such as a lens or window, for use as a transmitting material in an infrared imaging device. The chalcogenide copolymer may be processable via solution or melt processing methods. In some embodiments, the chalcogenide copolymer is in the form of a thin film. In other embodiments, the chalcogenide copolymer is in the form of a three-dimensional solid having a thickness of at least 1 mm in size.

For illustrative purposes, the following is a non-limiting example of preparing a chalcogenide copolymer.

Example 12. Representative Procedure for the Synthesis of Poly(Sulfur-Random-Selenium-Random-(1,3-Diisopropenylbenzene)

To an 11 ml scintillation vial, equipped with a magnetic stir bar, was loaded with about 1.4 g (70 wt %, 2.0 g scale) Selenium Sulfide ($Se_nS_m$; 1.4 g) and about 0.65 mL (30 wt %, 2.0 g scale, d(DIB)=0.925 g/mL) 1,3-diisopropenylbenzene (DIB). The contents of the vial were mixed via a vortex for about 3 minutes. The vial was then lowered into a 180° C. thermostated oil bath (set to 850 rpm) for about 80 minutes. The vial was then removed from the oil bath and the contents of the vial were poured into a PDMS mold (located in an 180° C. oven, and preheated for at least one hour), where it was allowed to cure for about 55 minutes. The mold was then removed from the oven and allowed to cool to RT.

According to one embodiment, the present invention features an optical sulfur copolymer comprising one or more sulfur monomers at a level at least about 50 wt % of the optical sulfur copolymer, and one or more comonomers selected amine monomers, thiol monomers, sulfide monomers, alkynylly unsaturated monomers, epoxide monomers, nitrone monomers, aldehyde monomers, ketone monomers, thiirane monomers, or ethylenically unsaturated monomers at a level in the range of about 10 wt % to about 50 wt % of the optical sulfur copolymer. The optical sulfur copolymer can have a refractive index of about 1.7-2.6 and at least one wavelength in a range of about 500 nm to about 10 μm.

In another embodiment, the optical sulfur copolymer may comprise one or more sulfur monomers at a level of about 5-95 wt % of the optical sulfur copolymer, one or more comonomers at a level in the range of about 1-50 wt % of the optical sulfur copolymer, and one or more selenium comonomers at a level of about 10-90 wt % of the optical sulfur copolymer. In some embodiments, at least one functional sulfur moiety of the one or more sulfur monomers is bonded to at least one functional moiety of the one or more monomers. The one or more comonomers may be selected from amine monomers, thiol monomers, sulfide monomers, alkynylly unsaturated monomers, epoxide monomers, nitrone monomers, aldehyde monomers, ketone monomers, thiirane monomers, or ethylenically unsaturated monomers. In other embodiments, the selenium comonomers are derived from cyclic selenium sulfide, elemental selenium, or a combination thereof. The optical sulfur copolymer can have a refractive index of about 1.7-2.6 and at least one wavelength in a range of about 500 nm to about 10 μm.

In some embodiments, the one or more sulfur monomers is at a level at least about 60 wt % of the optical sulfur copolymer, or at least about 70 wt % of the optical sulfur copolymer, or at least about 80 wt % of the optical sulfur copolymer, or at least about 90 wt % of the optical sulfur copolymer. In other embodiments, the one or more co monomers is at a level of about 1-15 wt % of the optical sulfur copolymer, or about 15-30 wt % of the optical sulfur copolymer, or about 30-40 wt % of the optical sulfur copolymer, or about 40-50 wt % of the optical sulfur copolymer. For example, the one or more monomers may be ethylenically unsaturated monomers, such as diisopropenylbenzene monomers. The diisopropenylbenzene monomers may be 1,3-diisopropenylbenzene monomers. In further embodiments, the selenium comonomers are at a level of about 10-20 wt % of the optical sulfur copolymer, or about 20-40 wt % of the optical sulfur copolymer, or about 40-60 wt % of the optical sulfur copolymer, or about 60-80 wt %, or about 80-90 wt % of the optical sulfur copolymer.

In one embodiment, the optical sulfur copolymer may comprise about 50 wt % sulfur monomers, about 15 wt % comonomers, and about 35 wt % selenium. For example, the sulfur copolymer may comprise sulfur, DIB and selenium (Se). The sulfur copolymer may have a refractive index of about n=2.01. Typically, Se has a refractive index n~2.6-2.7 in IR regime. Without wishing to limit the present invention to a particular theory or mechanism, by adding Se to the inverse vulcanization process, it can enable a dramatic increase in refractive index, as measured using ellipsometric characterization methods across the wavelength regime from 500-1500 nm.

In one embodiment, the optical sulfur copolymer may further comprise one or more epoxide monomers at a level in the range of about 10 wt % to about 50 wt % of the optical sulfur copolymer. At least one epoxy functional moiety of the epoxide monomers may be bonded to a functional moiety of the sulfur copolymer. Preferably, when one or more S—S bonds of the sulfur copolymer are broken, the S—S bonds are reconnected by thermal reforming.

In another embodiment, the optical sulfur copolymer may further comprise one or more termonomers selected from amine monomers, thiol monomers, sulfide monomers, alkynylly unsaturated monomers, epoxide monomers, nitrone monomers, aldehyde monomers, ketone monomers, thiirane monomers, and ethylenically unsaturated monomers at a level in the range of about 10 wt % to about 50 wt % of the optical sulfur copolymer.

In further embodiments, the optical sulfur copolymer may further comprise one or more polyfunctional monomers selected from a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomers, a polynitrone monomers, a polyaldehyde monomers, a polyketone monomers, and a polyethylenically unsaturated monomers.

In some embodiments, the optical sulfur copolymer is substantially transparent in an infrared or visible spectrum. For example, the optical sulfur copolymer can be substantially transparent in an electromagnetic spectrum having a wavelength range of about 1000-1500 nm, or about 3000-5000 nm, or about 5-10 microns. In other embodiments, the selenium of the optical sulfur copolymer may have a refractive index of about 2.6-2.7 in the infrared spectrum. In further embodiments, the optical sulfur copolymer is formed into a substantially transparent substrate, such as a film, a lens, or a free-standing object.

Another embodiment of the present invention features a method of producing a sulfur copolymer. The method may comprise providing elemental sulfur, heating the elemental sulfur to a temperature of about 120-130° C. to form a molten sulfur, and polymerizing one or more comonomers with the molten sulfur to form the sulfur copolymer. The one or more monomers may be selected from amine monomers, thiol monomers, sulfide monomers, alkynylly unsaturated monomers, epoxide monomers, nitrone monomers, aldehyde monomers, ketone monomers, thiirane monomers, and ethylenically unsaturated monomers. Preferably, the amount of elemental sulfur is at least 500 g. In some embodiments, the technique of polymerizing is free radical polymerization, controlled radical polymerization, ring-opening polymerization, ring-opening metathesis polymerization, step-growth polymerization, or chain-growth polymerization.

The present invention may also feature a method of producing an optical sulfur copolymer comprising providing elemental sulfur, heating the elemental sulfur to form a molten sulfur, mixing one or more comonomers with the molten sulfur, and heating the optical sulfur copolymer for a period of time to sufficiently vitrify the optical sulfur copolymer. In an alternate embodiment, the method of producing an optical sulfur copolymer may comprise providing about 5-95 wt % elemental sulfur, heating the elemental sulfur to form a molten sulfur, mixing about 10-90 wt % selenium monomers with the molten sulfur to form a sulfur-selenium mixture, mixing about 1-50 wt % one or more comonomers with the sulfur-selenium mixture such that the one or more comonomers polymerizes with the molten sulfur to form the optical sulfur copolymer, and heating the optical sulfur copolymer for a period of time, such as 5 to 15 minutes, to sufficiently vitrify the optical sulfur copolymer.

In some embodiments, the one or more monomers is selected amine monomers, thiol monomers, sulfide monomers, alkynylly unsaturated monomers, epoxide monomers, nitrone monomers, aldehyde monomers, ketone monomers, thiirane monomers, and ethylenically unsaturated monomers, wherein the one or more comonomers polymerizes with the molten sulfur to form the optical sulfur copolymer. In other embodiments, the selenium comonomers are derived from cyclic selenium sulphide, elemental selenium, or a combination thereof. In further embodiments, the technique of polymerizing is free radical polymerization, controlled radical polymerization, ring-opening polymerization, ring-opening metathesis polymerization, step-growth polymerization, or chain-growth polymerization.

Figure 24:
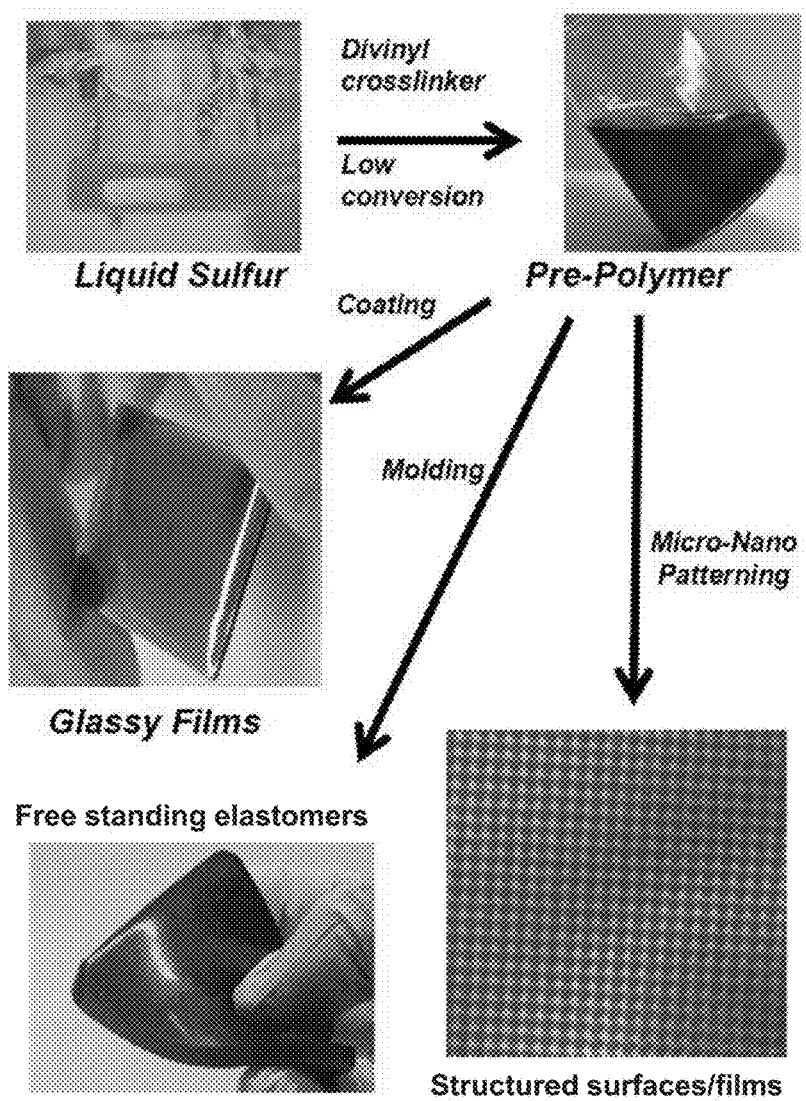
FIG. 24 shows various products prepared from a sulfur prepolymer.
Figure 25:
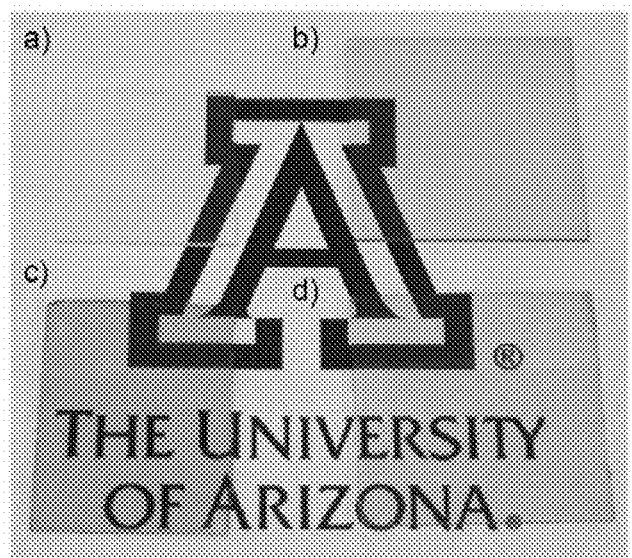
FIG. 25 shows a set of spin-coated films.
Figure 26:
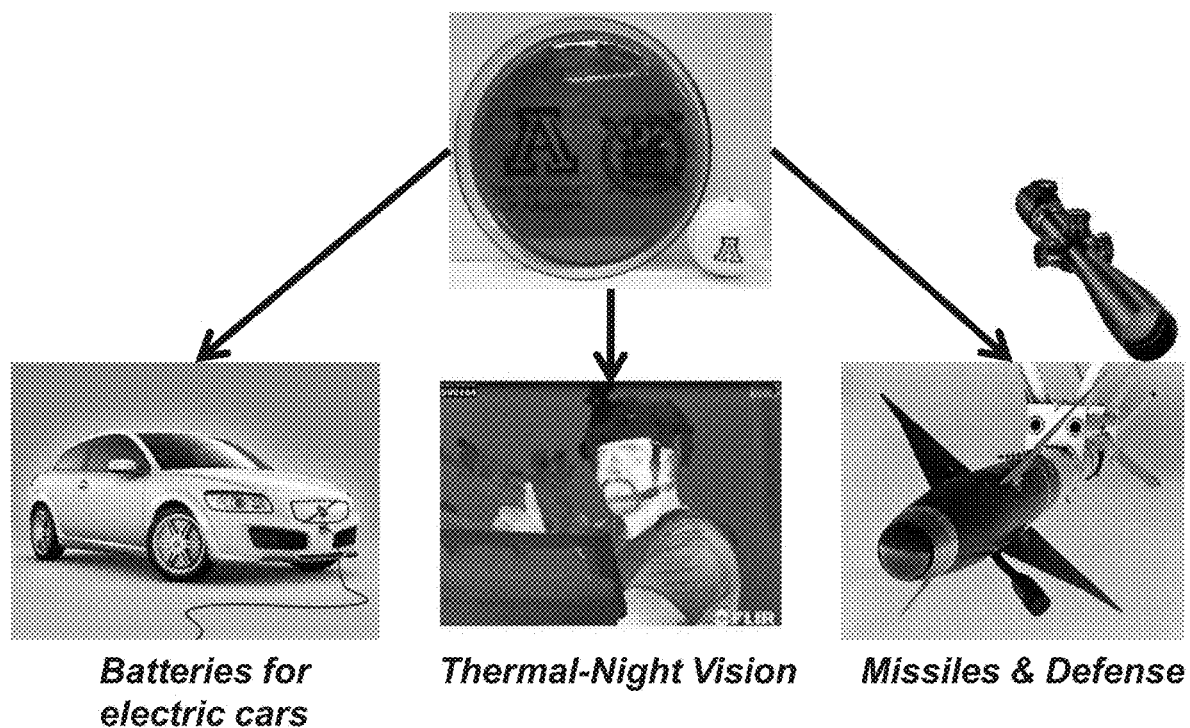
FIG. 26 shows various applications in which the sulfur copolymers of the present invention may be utilized.
Figure 27:
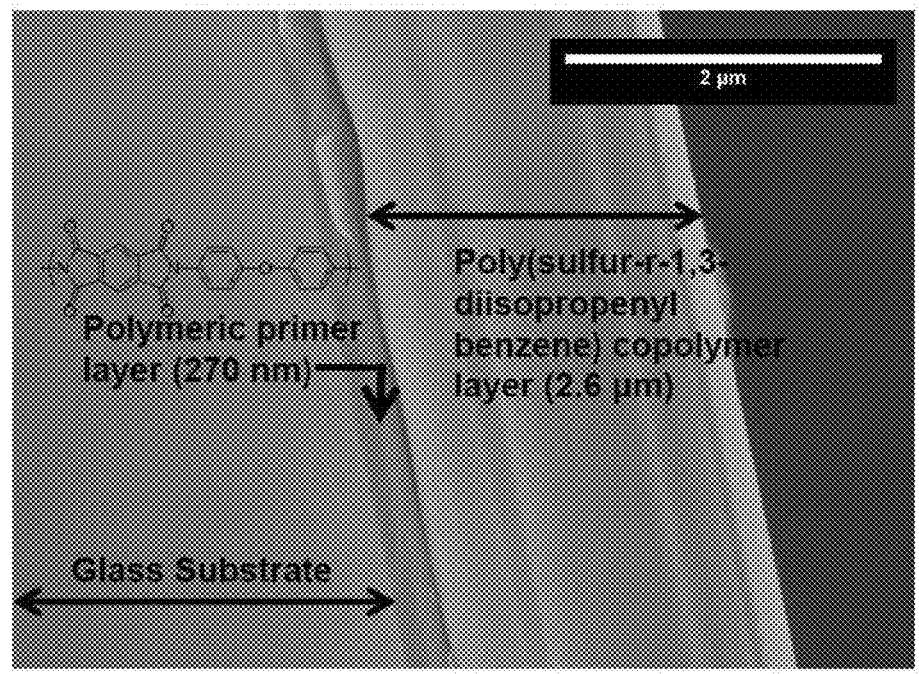
FIG. 27 is a cross-sectional micrograph of a poly(S-r-DIB) copolymer layer (2.6 μm in thickness) formed on a polyimide layer (270 nm) on a glass substrate.
Figure 28:
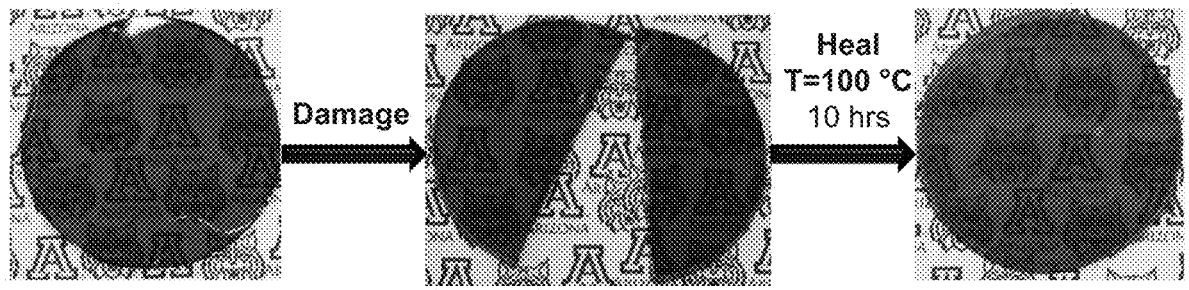
FIG. 28 shows a non-limiting example of Young's Modulus for a pristine and a self-healed sulfur copolymers having 20 wt % diisopropenylbenzene (DIB).
Figure 29:
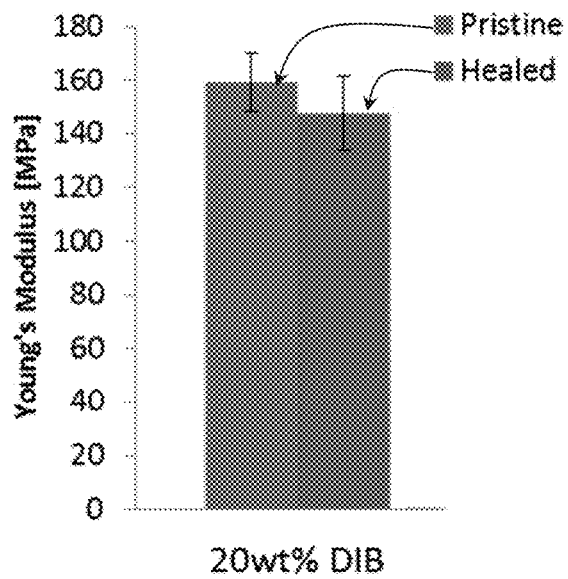
FIG. 29 shows a non-limiting example of a stress-strain curve for sulfur copolymers.
Figure 30:
FIG. 30 shows a digital image of lenses (left) poly(S-r-DIB) with 80 wt % $S_8$ and (right) glass to demonstrate the enhanced focusing power of the poly(S-r-DIB) lens afforded by the increased refractive index.
Figure 31:
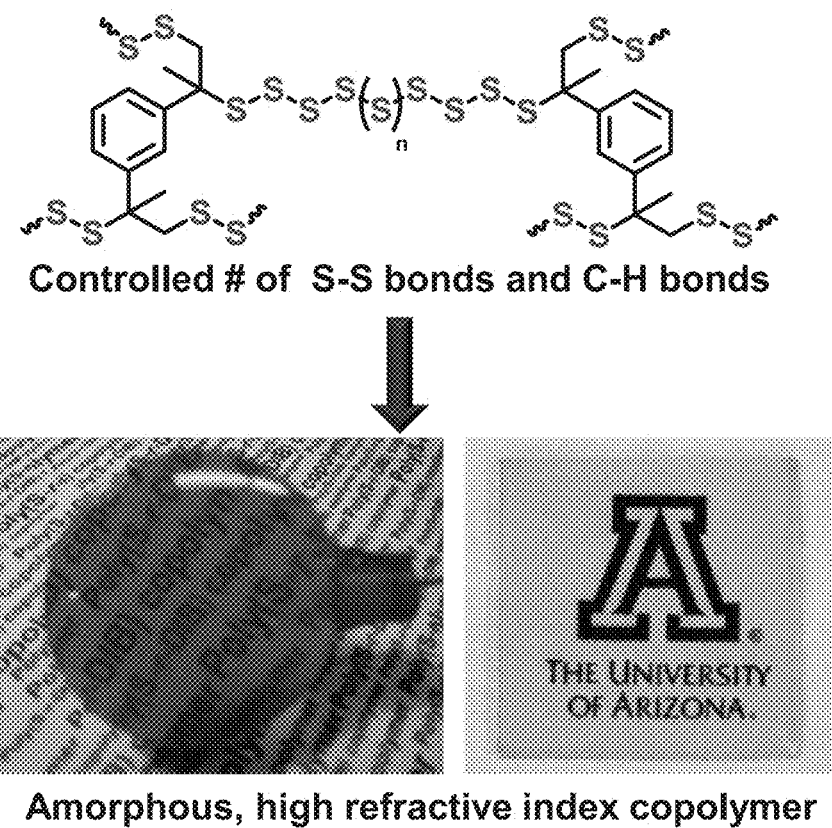
FIG. 31 shows a non-limiting example of infrared lens constructed from a sulfur copolymer of the present invention.
Figure 32:
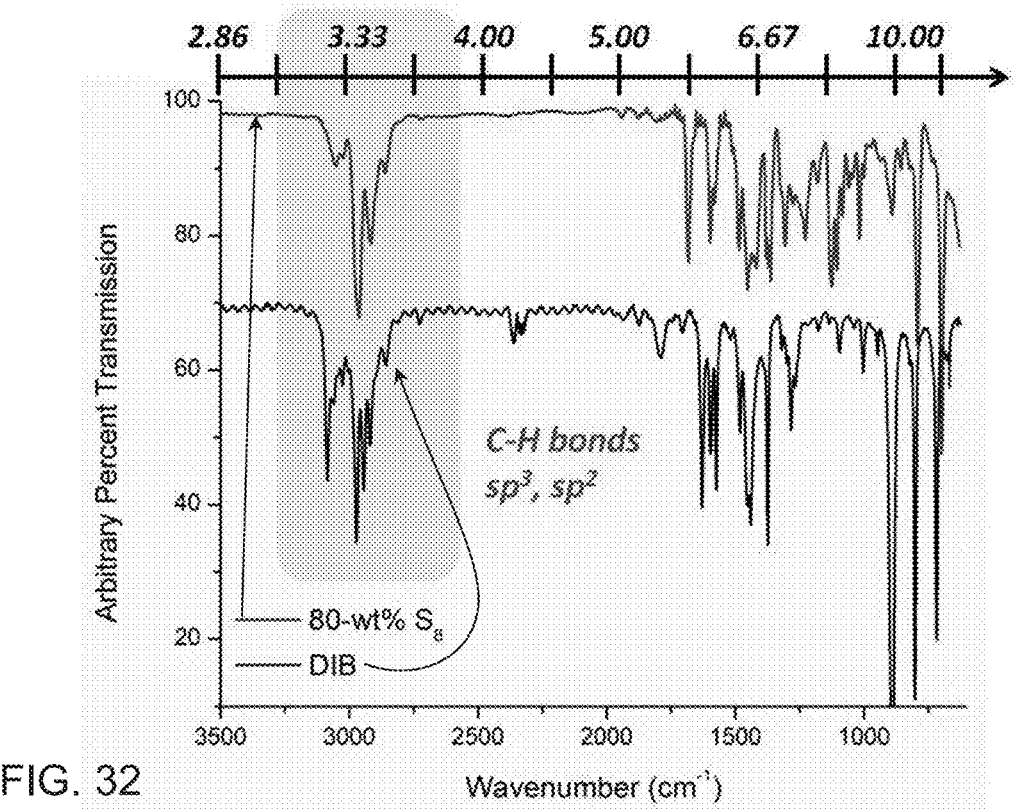
FIG. 32 shows a graph of transparency for 80%-wt $S_8$ and DIB.

As shown in FIG. 24-26, the sulfur copolymers that have been described herein are the first class of polymeric materials that exhibit high transparency in the short-wave and mid-IR regimes due to the presence of largely IR inactive S—S bonds. Furthermore, since these sulfur copolymers are readily melt, or solution processed, fabrication of free standing films, windows, or lenses can be easily conducted. Access to these kinds of high quality and inexpensive lenses are anticipated to open new opportunities in low cost IR optical devices and technologies including IR thermal imaging rifle scopes and home monitoring.

Figure 33:
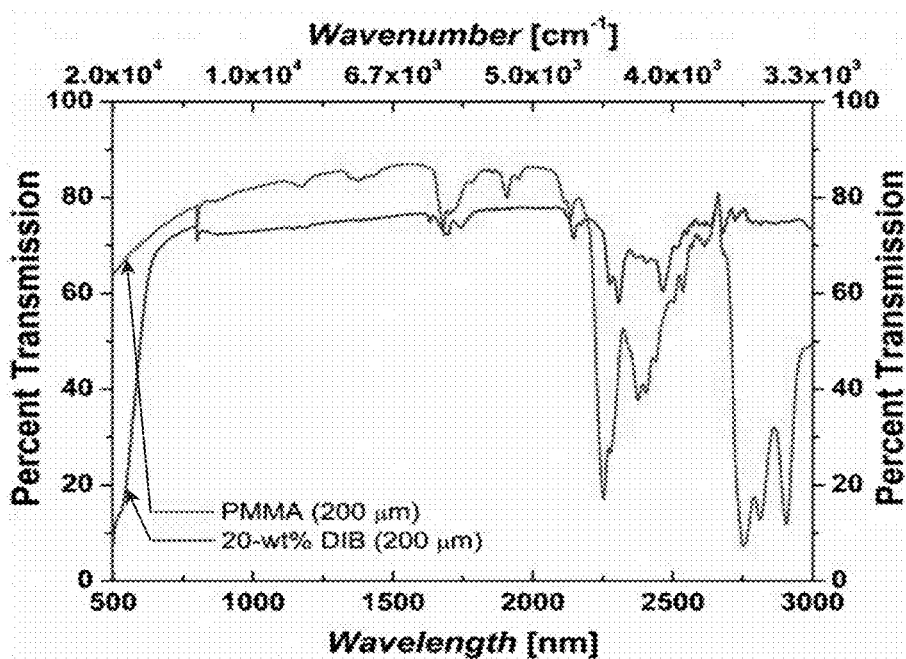
FIG. 33 shows a graph of transparency for a sulfur copolymer and PMMA.
Figure 34:
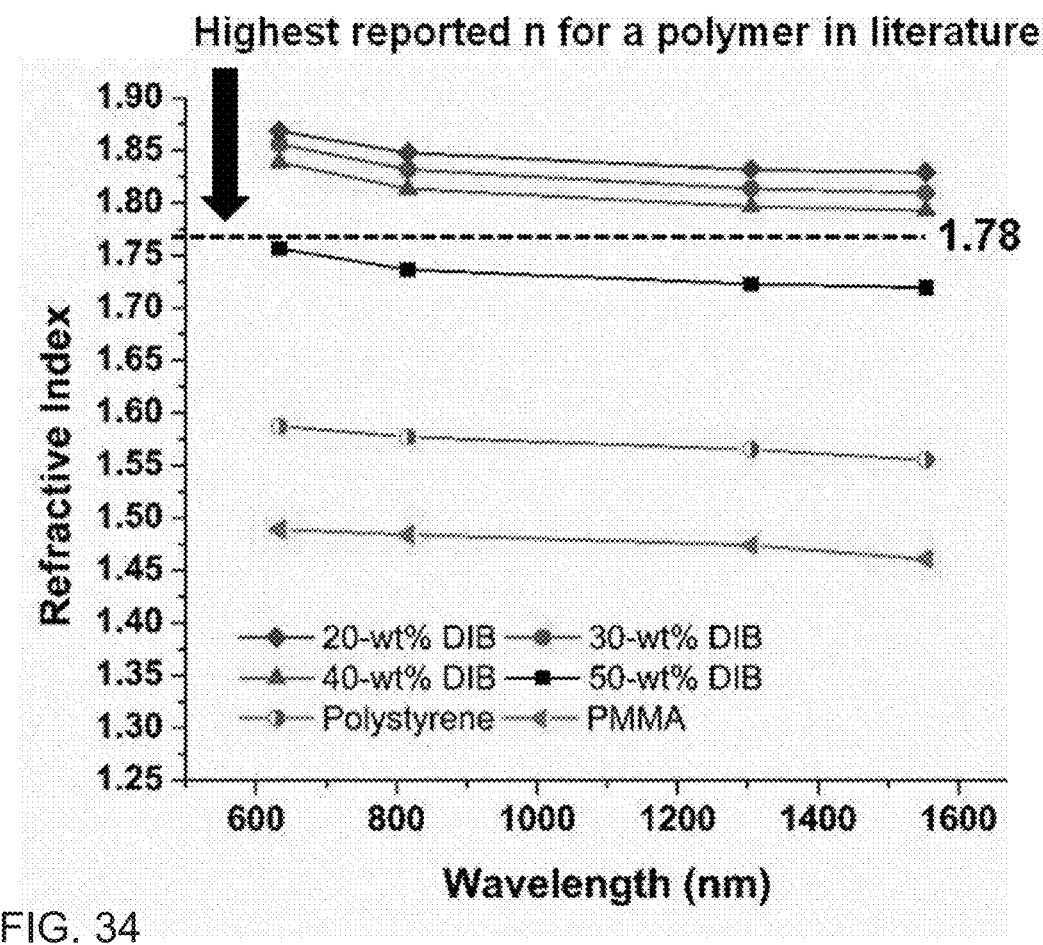
FIG. 34 shows a graph of refractive indexes for various polymers and sulfur copolymers.
Figure 35:
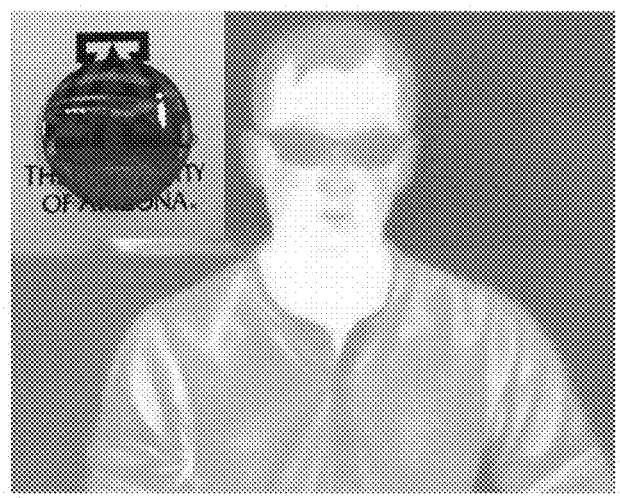
FIG. 35 shows mid-IR imaging with a sulfur copolymer lens.
Figure 36:
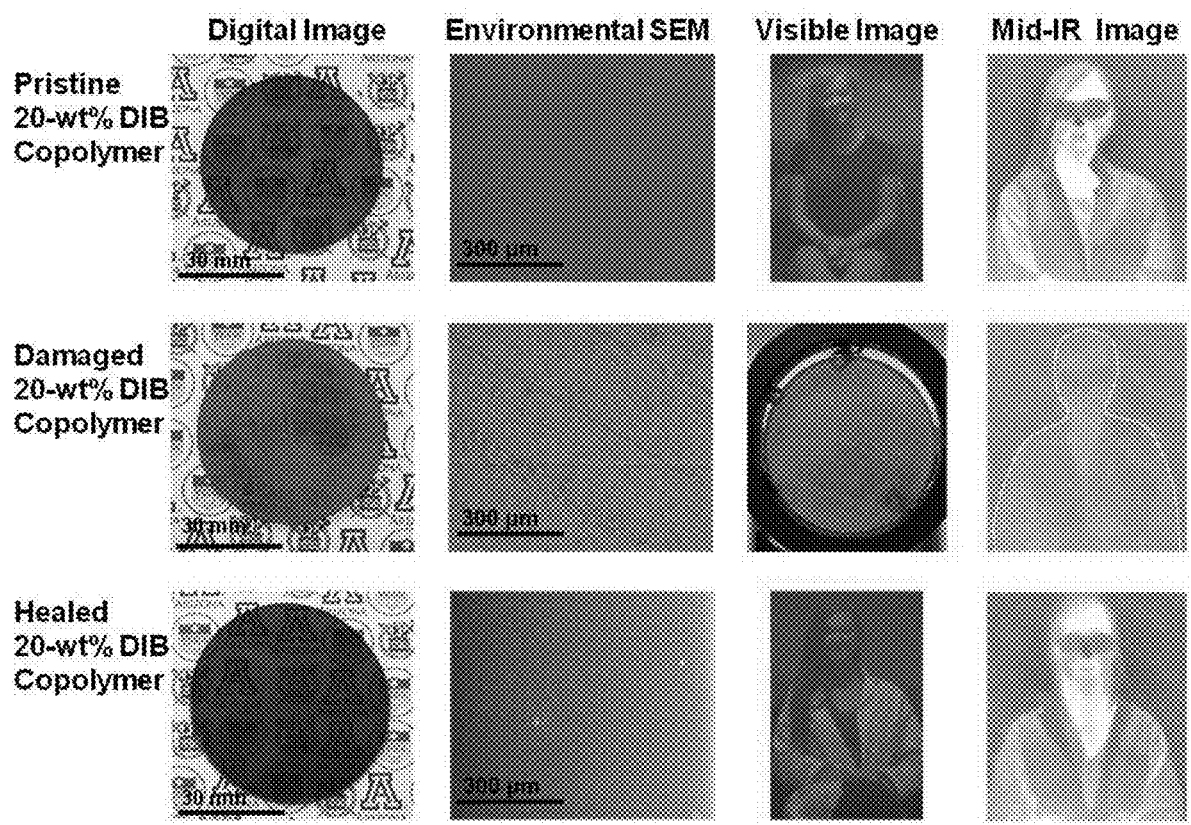
FIG. 36 shows comparisons of pristine, damaged, and self-healed sulfur copolymer lenses for visible and mid-IR imaging.

As shown in FIGS. 33-34, the refractive index of poly(S-r-DIB) film is >22% higher than PMMA, and the transparency of poly(S-r-DIB) film is 6× higher at 2900 nm. Sulfur-rich copolymers were synthesized via inverse vulcanization to create novel copolymers with high refractive indices and optical transparency in the near to mid-infrared (1.5 um and 3-5 um) regions. By directly varying the feed ratio of comonomers during inverse vulcanization, the content of S—S bonds in these materials was controlled, thereby enabling correlation of optical properties with copolymer composition. All copolymer compositions possess a refractive index above n=1.7 at 1550 nm. Furthermore, these sulfur copolymers were readily solution, or melt processed into thin films, or free standing lenses for IR imaging.

Another feature of the present invention teaches the synthesis of an optical sulfur copolymer via the copolymerization of elemental sulfur with comonomers. The optical sulfur copolymer comprises monomers of sulfur and comonomers of ethylenically unsaturated monomers (e.g., vinylic, divinylic, multi-vinylic comonomers, substituted alkenes, and functional alkenes), alkynylly unsaturated monomer (e.g., alkynes, dialkynes, and multi-alkynes), amine monomers (e.g., amines, diamines, and multi-amines), thiol monomer (e.g., thiols, dithiols, multi-functional thiols), nitrone and nitroso monomers (e.g., nitrones, dinitrones, and multi-nitrones), aldehyde monomers (e.g., aldehydes, dialdehydes, and multi-aldehydes), ketone monomers, thiirane monomers, or epoxide monomers.

For example, new types of optical sulfur copolymer were prepared by the copolymerization of elemental sulfur with vinylic compounds carrying thiophene, or amine, or pyrrole side chain groups, where subsequent oxidative or electrochemical polymerization affords the new copolymer material. Vinylic monomers, utilizing groups, such as, styrenics, incorporating thiophene groups, such as, 3,4-alkylenedioxythiophenes and 3,4-propylenedioxythiophenes (ProDOT) are examples of these functional monomers. As another example, new optical sulfur copolymer are also demonstrated by the copolymerization of elemental sulfur with amines e.g., phenylenediamines that can be oxidatively copolymerized with aniline to prepare polyaniline-sulfur copolymer materials.

In an alternative embodiment, a new polymeric material is prepared by post-modification of the amine, thiol, or other functional groups of the optical sulfur copolymer to either modify the chemical functionality of the copolymer, crosslink the copolymer, or form other new copolymers, such as polyethers via epoxide copolymerizations, polyurethanes and polyamides.

In another embodiment, the optical sulfur copolymer is prepared via distinct synthesis and post-functionalization methods to introduce conjugated polymers, such as, polythiophenes, polyanilines, or polypyrroles. Methods include, but are not limited to, the copolymerization of a vinylic comonomer carrying a pendant thiophene that forms the polythiophene phase after an oxidative, or electrochemical polymerization. Other methods include copolymerization of sulfur with diamines that carry free reactive amines that can copolymerize with monomers, such as, aniline, and then oxidative or electrochemical polymerization to form the polyaniline phase.

In some embodiments, the optical sulfur copolymer comprises one or more sulfur monomers at a level in the range of about 5 to about 99 wt % of the optical sulfur copolymer, and one or more monomers at a level in the range of about 1 wt % to about 95 wt % of the optical sulfur copolymer. In another embodiment, the sulfur copolymer comprises one or more sulfur monomers at a level in the range of about 50 to about 97.5 wt % of the sulfur copolymer, and one or more monomers at a level in the range of about 2.5 wt % to about 50 wt % of the sulfur copolymer, or one or more sulfur monomers at a level in the range of about 50 to about 95 wt % of the sulfur copolymer, and one or more monomers at a level in the range of about 5 wt % to about 50 wt % of the sulfur copolymer.

In some embodiments, the optical sulfur copolymer comprises one or more sulfur monomers at a level of at least about 5 wt % of the optical sulfur copolymer. The sulfur copolymer may comprise one or more sulfur monomers at a level of at least about 10 wt %, or at least about 20 wt %, or at least about 30 wt %, or at least about 40 wt %, or at least about 50 wt %, or at least about 60 wt %, or at least about 70 wt %, or at least about 80 wt %, or at least about 90 wt % of the sulfur copolymer.

In other embodiments, the optical sulfur copolymer comprises one or more sulfur monomers at a level in the range of about 5 to about 10 wt % of the optical sulfur copolymer. The sulfur copolymer may comprise one or more sulfur monomers at a level in the range of about 10 to 20 wt %, or in the range of about 20 to 30 wt %, or in the range of about 30 to 40 wt %, or in the range of about 40 to 50 wt %, or in the range of about 50 to 60 wt %, or in the range of about 60 to 70 wt %, or in the range of about 70 to 80 wt %, or in the range of about 80 to 90 wt %, or in the range of about 90 to 95 wt % of the sulfur copolymer.

In some embodiments, the optical sulfur copolymer comprises one or more comonomers at a level of at least 0.1 wt % of the optical sulfur copolymer, or at least about 0.5 wt %, or at least about 1 wt %, or at least about 5 wt %, or at least about 10 wt %, or at least about 20 wt %, or at least about 30 wt %, or at least about 40 wt %, or at least about 50 wt %, or at least about 60 wt %, or at least about 70 wt %, or at least about 80 wt %, or at least about 90 wt %, or at least about 95 wt % of the sulfur copolymer.

In other embodiments, the optical sulfur copolymer comprises one or more comonomers at a level in the range of about 5 to about 10 wt % of the optical sulfur copolymer. The sulfur copolymer may comprise one or more comonomers at a level in the range of about 10 to 20 wt %, or in the range of about 20 to 30 wt %, or in the range of about 30 to 40 wt %, or in the range of about 40 to 50 wt %, or in the range of about 50 to 60 wt %, or in the range of about 60 to 70 wt %, or in the range of about 70 to 80 wt %, or in the range of about 80 to 90 wt %, or in the range of about 90 to 95 wt % of the sulfur copolymer.

In a further embodiment, the optical sulfur copolymer comprises one or more selenium comonomers at a level in the range of about 5 wt % to 10 wt % of the optical sulfur copolymer. The sulfur copolymer may comprise one or more selenium comonomers at a level in the range of about 10 to 20 wt %, or in the range of about 20 to 30 wt %, or in the range of about 30 to 40 wt %, or in the range of about 40 to 50 wt %, or in the range of about 50 to 60 wt %, or in the range of about 60 to 70 wt %, or in the range of about 70 to 80 wt %, or in the range of about 80 to 90 wt % of the optical sulfur copolymer.

In some embodiments, the present invention features a method for making any of the aforementioned optical sulfur copolymers. The method comprises heating a mixture comprising sulfur and one or more monomers at a temperature in the range of about 120° C. to about 230° C., and allowing for polymerization of the mixture. For example, the mixture may be heated to a temperature between about 120° C. to 130° C., or about 130° C. to 140° C., or about 140° C. to 150° C., or about 150° C. to 160° C., or about 160° C. to 170° C., or about 170° C. to 180° C., or about 180° C. to 190° C., or about 190° C. to 200° C., or about 200° C. to 210° C., or about 210° C. to 220° C., or about 220° C. to 230° C.

In other embodiments, an article is made from any of the aforementioned optical sulfur copolymer. For instance, the method of forming the article may comprise heating a mixture comprising sulfur and one or more monomers at a temperature in the range of about 160° C. to about 230° C. to form a prepolymer, forming the prepolymer into the shape of the article, to yield a formed prepolymer shape, and heating the formed prepolymer shape to yield the article.

In another embodiment, a method of forming the article comprises admixing the optical sulfur copolymer in a non-polar organic solvent, forming the admixed optical sulfur copolymer into the shape of the article, and removing the solvent from the optical sulfur copolymer to yield the article. In some embodiments, the optical sulfur copolymer is provided as a mixture with a solvent for forming. In other embodiments, the optical sulfur copolymer is coated and cured as a thin film on a substrate. In still other embodiments, the optical sulfur copolymer is shaped and cured using a mold.

In some embodiments, any of the optical sulfur copolymers can be modified by reacting an available reactive functional group on the polymeric composition with a second comonomer to form a new copolymer material. The technique of reacting may be oxidative coupling, polymerization, or copolymerization. In some embodiments, the reactive functional group is an amine or a thiol. The second comonomer may comprise an epoxide, isocyanate, acid chloride, carboxylic acid, ester, or alkyl halide group. In some embodiments, when the reactive functional group is an amine, the new copolymer material is a polyurethane or a polyamide. In some embodiments, when the reactive functional group is an aniline or a phenylenediamine, and the new copolymer material contains oligo- or polyaniline segments. In some embodiments, the reactive functional group is a thiophene and the new copolymer material contains oligo- or polythiophene segments.

According to some embodiments, the present invention features a method of making an optical substrate. The method may comprise heating any of the copolymers described herein to a temperature in the range of about 160-230° C.; and forming the copolymer into a shape of the optical substrate. Preferably, the optical substrate has a refractive index of about 1.7-2.6 at a wavelength in a range of about 500 nm to about 8 μm, and can be substantially transparent in an infrared or visible spectrum. The optical substrate may an optical device component, such as a lens or window, for use as a transmitting material in an infrared imaging device.

According to other embodiments, the present invention features a method of preparing an optical thin-film polymer. The method may comprise providing any of the copolymers described herein in a form of a powder; placing the copolymer between two plates; heating the plates and the copolymer to a first temperature; applying a first pressure to the two plates to compress the copolymer for a first allotted time to form the optical thin-film polymer; applying a second pressure to the two plates to compress the optical thin-film polymer for a second allotted time, wherein the second pressure is greater than the first pressure; and cooling the optical thin-film polymer. Preferably, the optical thin-film polymer has a refractive index of about 1.7-2.6 at a wavelength in a range of about 500 nm to about 8 μm, and can be substantially transparent in an infrared or visible spectrum. The optical thin-film polymer may be used as a transmitting material in an infrared imaging device.

According to further embodiments, the present invention features a method of preparing an optical polymer lens. The method may comprise preparing a lens mold; providing any of the copolymers described herein; pouring the copolymer into the lens mold to form a molded copolymer; curing the molded copolymer to vitrify the molded copolymer into the optical polymer lens; and removing the optical polymer lens from the lens mold. Preferably, the optical polymer lens has a refractive index of about 1.7-2.6 at a wavelength in a range of about 500 nm to about 8 μm, and can be substantially transparent in an infrared or visible spectrum. The optical polymer lens can be used as a transmitting material in an infrared imaging device.

In exemplary embodiments, the step of preparing the lens mold may comprise mixing an elastomeric base with a curing agent to form a replica mixture; pouring the replica mixture over a master lens to form the lens mold; placing the lens mold under reduced pressure to remove bubbles in the lens mold; curing the lens mold; and removing the lens mold from the master lens.

In further embodiments, the present invention features a method of depositing a copolymer onto a substrate. The method may comprise providing any of the copolymers described herein; heating the substrate; and coating the heated substrate with the copolymer. The method may further comprise curing the heated substrate coated with the copolymer. Preferably, the copolymer has a refractive index of about 1.7-2.6 at a wavelength in a range of about 500 nm to about 8 μm, and is substantially transparent in an infrared or visible spectrum. The copolymer-coated substrate can be used as a transmitting material in an infrared imaging device.

In an exemplary embodiment, the step of coating the heated substrate with the copolymer comprises spin-coating the copolymer onto the heated substrate. In one embodiment, the process of spin-coating may comprise spinning the heated substrate at a first rotational speed with a first acceleration for a first time period while simultaneously disposing the copolymer on the heated substrate to coat the heated substrate with the copolymer; and spinning the heated substrate coated with the copolymer at a second rotational speed with a second acceleration for a second time period. Preferably, the first rotational speed is less than the second rotational speed. Alternatively, the first rotational speed is greater than the second rotational speed In one embodiment, the first time period or second time period is about 10 to 30 seconds. For instance, the first time period is about 20 seconds, and the second time period is about 10 seconds.

In some embodiments, the copolymers described herein are provided as a mixture with a solvent for forming. In other embodiments, the copolymer is coated and cured as a thin film on a substrate. In still other embodiments, the copolymer is shaped and cured using a mold.

In some embodiments, any of the copolymers can be modified by reacting an available reactive functional group on the polymeric composition with a second comonomer to form a new copolymer material. The technique of reacting may be oxidative coupling, polymerization, or copolymerization.

In some embodiments, the copolymer is a thermoset. In some embodiments, the copolymer is a thermoplastic. In some embodiments, the copolymer is self-healing. In some embodiments, when one or more S—S bonds of the copolymer are broken, the S—S bonds are reconnected by thermal reforming.

In some embodiments, the present invention features a method of repairing an optical substrate, said method comprising providing the optical substrate comprising any of the copolymers described herein, the copolymer having one or more broken S—S bonds, and heat treating the optical substrate at a healing temperature for a period of time in order to reconnect the S—S bonds of the copolymer. In some embodiments, the healing temperature is between about 80° C. and 100° C. In some embodiments, the healing temperature is between about 100° C. and 150° C. In some embodiments, the healing temperature is at or near the melting point of the polymeric substrate. In some embodiments, the period of time is between about 4 and 15 hours. In some embodiments, the period of time is between about 8 and 12 hours.

Example 13. Thermal Reforming Procedure of a Self-Healing Optical Substrate

1. The optical substrate having a crack is placed in an oven.
2. The optical substrate is heated at a temperature of about 100° C. for about 3 hours.
3. The optical substrate is inspected to ensure that it is completely self-healed.

Because both anionic and radical polymerization can occur in the polymerization reaction mixtures, any desirable combination of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, and acrylonitrile comonomers can be used in the same copolymer. As non-limiting examples, in one embodiment of the invention, the one or more monomers are a combination of one or more amine monomers and one or more styrenic monomers.

In preferred embodiments, any of the sulfur polymers described herein can be melt processable or processable in a solution. The sulfur polymer can also be self-healing upon thermal reprocessing. For example, the sulfur monomers comprise dynamic sulfur-sulfur (S—S) bonds that when broken can be reconnected by thermal reforming.

A person of skill in the art will select activators monomers and relative ratios thereof in order to provide the desired properties to the polymer. In certain embodiments, the one or more monomers include one or more polyfunctional monomers, optionally in combination with one or more monofunctional monomers. A polyfunctional monomer is one that includes more than one (e.g., 2, or 3) polymerizable amine, thiol, sulfide, alkynylly unsaturated, nitrone and/or nitroso, aldehyde, ketone, thiirane, ethylenically unsaturated, and/or epoxide moieties. Polyfunctional monomers can be used to cross-link the sulfur or sulfur polymer chains to adjust the properties of the polymer, as would be understood by the person of skill in the art. The multiple polymerizable groups of a polyfunctional monomer can be the same or different.

Fréchet-type benzyl ether dendrimers bearing styrenic terminal groups are miscible with liquid sulfur and can be used as polyfunctional cross-linkers. In certain embodiments, the one or more polyfunctional monomers include one or more of a divinylbenzene, a diisopropenylbenzene, an alkylene di(meth)acrylate, a bisphenol A di(meth)acrylate, a terpene, a carotene, a divinyl (hetero)aromatic compound, and a diisopropenyl (hetero)aromatic compound. In other embodiments, a polyfunctional monomer can have one or more amine, thiol, sulfide, alkynylly unsaturated, nitrone and/or nitroso, aldehyde, ketone, thiirane, ethylenically unsaturated, and/or epoxide moieties moieties; and one or more amine, thiol, sulfide, alkynylly unsaturated, nitrone and/or nitroso, aldehyde, ketone, thiirane, ethylenically unsaturated, and/or epoxide moieties, wherein the first and second moieties are different. A non-limiting example is a divinylbenzene monoxide.

Embodiments of the present invention featuring any of sulfur polymers described herein may further comprise an elemental carbon material, which may be dispersed in the sulfur polymer, in an amount of at most about 50 wt % of the sulfur polymer. In some embodiments, the methods of synthesizing any of the sulfur polymers described herein may further comprise the step of dispersing an elemental carbon material in the sulfur copolymers. For example, the carbon material is at most about 5 wt %, or at most about 10 wt %, or at most about 20 wt %, or at most about 30 wt %, or at most about 40 wt %, or at most about 50 wt % of the sulfur polymer.

The sulfur polymers can be made, for example, by polymerization of a molten mixture of sulfur with the non-homopolymerizing monomers. Thus, in one aspect, the invention provides a method for making sulfur polymers as described above. The method includes heating a mixture of elemental sulfur or sulfur comonomers and the non-homopolymerizing monomers together at a temperature sufficient to initiate polymerization (i.e., through free radical polymerization, through anionic polymerization, or through both, depending on the monomers used). For example, in one embodiment, the method includes heating the mixture to a temperature in the range of about 120° C. to about 230° C., e.g., in the range of about of about 120° C. to about 170° C. or about 170° C. to about 230° C. The person of skill in the art will select conditions that provide the desired level of polymerization, In certain embodiments, the polymerization reaction is performed under ambient pressure. However, in other embodiments, the polymerization reaction can be performed at elevated pressure (e.g., in a bomb or an autoclave). Elevated pressures can be used to polymerize more volatile monomers, so that they do not vaporize under the elevated temperature reaction conditions.

In certain embodiments, it can be desirable to use a nucleophilic viscosity modifier in liquefying the elemental sulfur or sulfur comonomers, for example, before adding the non-homopolymerizing monomers. For example, in certain embodiments, the elemental sulfur or sulfur comonomers is first heated with a viscosity modifier, then the viscosity-modified elemental sulfur or sulfur comonomers is heated with the non-homopolymerizing monomers. The nucleophilic viscosity modifier can be, for example, a phosphorus nucleophile (e.g., a phosphine), a sulfur nucleophile (e.g., a thiol) or an amine nucleophile (e.g., a primary or secondary amine). When the elemental sulfur or sulfur comonomers is heated in the absence of a nucleophilic viscosity modifier, the elemental sulfur or sulfur comonomers rings can open to form, e.g., diradicals, which can combine to form linear polymer chains which can provide a relatively high overall viscosity to the molten material. Nucleophilic viscosity modifiers can break these linear chains into shorter lengths, thereby making shorter polymers that lower the overall viscosity of the molten material, making the elemental sulfur or sulfur comonomers mixture easier to mix with and other species, and easier to stir for efficient processing. Some of the nucleophilic viscosity modifier will react to be retained as a covalently bound part of the polymer, and some will react to form separate molecular species, with the relative amounts depending on nucleophile identity and reaction conditions. While some of the nucleophilic viscosity modifier may end up as a separate molecular species from the polymer chain, as used herein, nucleophilic viscosity modifiers may become part of the polymer. Non-limiting examples of nucleophilic viscosity modifiers include triphenylphosphine, aniline, benzenethiol, and N,N-dimethyl-aminopyridine. Nucleophilic viscosity modifiers can be used, for example, in an amount up to about 10 wt %, or even up to about 5 wt % of the sulfur polymer. When a nucleophilic viscosity modifier is used, in certain embodiments it can be used in the range of about 5 wt % to about 15 wt % of the sulfur polymer.

In certain embodiments, a monofunctional monomer can be used to reduce the viscosity of the sulfur polymer, for example, before adding other monomers (e.g., before adding any polyfunctional monomer). For example, in certain embodiments, the elemental sulfur or sulfur copolymers is first heated with one or more monofunctional monomers. While not intending to be bound by theory, the inventors surmise that inclusion of monofunctional monomers into the poly(sulfur) chains disrupts intermolecular associations of the elemental sulfur or sulfur copolymers, and thus decreases the viscosity. The monofunctional monomer can be, for example, a mono(meth)acrylate such as benzyl methacrylate, a mono(oxirane) such as a styrene oxide or a glycidyl phenyl ether, or a mono(thiirane) such as t-butyl thiirane or phenoxymethylthiirane. A monofunctional monomer can be used to modify the viscosity of the sulfur polymer, for example, in an amount up to about 10 wt %, up to about 5 wt %, or even up to about 2 wt % of the copolymer. When a monofunctional monomer can be used to modify the viscosity of the sulfur polymer, in certain embodiments it can be used in the range of about 0.5 wt % to about 5 wt %, or even about 0.5 wt % to about 3 wt % of the sulfur polymer.

Of course, viscosity modification is not required, so in other embodiments the elemental sulfur or sulfur copolymers are heated together with the non-homopolymerizing monomers (and particularly with one or more polyfunctional monomers) without viscosity modification. In other embodiments, a solvent, e.g., a halobenzene such as 1,2,4-trichlorobenzene, a benzyl ether, or a phenyl ether, can be used to modify the viscosity of the materials for ease of handling. The solvent can be added, for example, to the elemental sulfur or sulfur copolymers before reaction with a monomer in order to reduce its viscosity, or to the polymerized material in order to aid in processing into a desired form factor.

The polymers described herein can be partially cured to provide a more easily processable material, which can be processed into a desired form (e.g., into a desired shape, such as in the form of a free-standing shape or a device), then fully cured in a later operation. For example, one embodiment of the invention is a method of making an article formed from the sulfur polymers as described herein. The method includes heating the sulfur polymer at a temperature in the range of about 120° C. to about 220° C. (e.g. 120° C. to about 150° C.) to form a prepolymer; forming the prepolymer into the shape of the article, to yield a formed prepolymer shape; and further heating the formed prepolymer shape to yield the article. The prepolymer can be formed, for example, by conversion of the one or more monomers at a level in the range of about 20 to about 50 mol %. For example, heating the sulfur polymer to form the prepolymer can be performed for a time in the range of about 20 seconds to about five minutes, for example, at a temperature in the range of about 175° C. to about 195° C. In one embodiment, the heating is performed for less than about 2 minutes at about 185° C. The person of skill in the art will determine the desired level of monomer conversion in the prepolymer stage to yield a processable prepolymer material, and will determine process conditions that can result in the desired level of monomer conversion.

In one embodiment, the prepolymer can be provided as a mixture with a solvent for forming, e.g., via casting, molding or printing. The prepolymers described herein can form miscible mixtures or solutions with a variety of nonpolar high-boiling aromatic solvents, including, for example, haloarene solvents such as di- and trichlorobenzene (e.g., 1,2,4-trichlorobenzene). The solvent can be added, for example, after the prepolymer is prepared, to provide a softened or flowable material suitable for a desired forming step (e.g., casting, molding, or spin-, dip- or spray-coating.) In some embodiments, the prepolymer/solvent mixture can be used at elevated temperatures (e.g., above about 100° C., above about 120° C. or above about 140° C.) to improve flow at relatively low solvent levels (e.g., for use in casting or molding processes). In other embodiments, the prepolymer/solvent mixture can be used at a lower temperature, for example, at ambient temperatures. The prepolymers described herein can remain soluble even after the solvent cools.

In one embodiment, the prepolymer can be provided as a mixture with a solvent for forming, e.g., via casting, molding or printing. The prepolymers described herein can form miscible mixtures or solutions with a variety of solvents, such as non-polar high-boiling aromatic solvents, including, for example, haloarene solvents such as di- and trichlorobenzene (e.g., 1,2,4-trichlorobenzene). The solvent can be added, for example, after the prepolymer is prepared, to provide a softened or flowable material suitable for a desired forming step (e.g., casting, molding, or spin-, dip- or spray-coating.) In some embodiments, the prepolymer/solvent mixture can be used at elevated temperatures (e.g., above about 100° C., above about 120° C. or above about 140° C.) to improve flow at relatively low solvent levels (e.g., for use in casting or molding processes). In other embodiments, the prepolymer/solvent mixture can be used at a lower temperature, for example, at ambient temperatures (e.g., for use in spin-coating processes). Unlike molten sulfur, the prepolymers described herein can remain soluble even after the solvent cools.

In one embodiment, the prepolymer is coated and cured as a film on a substrate. While $S_8$ is typically intractable due to its crystallinity, the materials described herein can be formed as to be amenable to solution processing (e.g., in molten or solvent-admixed form) to fabricate thin film materials. Mixtures of molten prepolymer and solvent can be diluted to the concentration desired for a given spin-coating process.

When forming thin films of the materials described herein on substrates, it can often be desirable to use a polyimide primer layer. Thus, a solution of a polyamic precursor (e.g., polypyromellitamic acid-4,4'-dianiline, or compounds with oxyaniline linkages), or similar copolymer derivatives can be deposited onto a substrate and cured (e.g., by heating at a temperature in the range of about 120 to about 220° C.) to form a thin polyimide layer (e.g., as thin as 2 nm), upon which the materials described herein can be formed. Moreover, in many embodiments, even fully cured polymers as described herein can be melt processed or suspended or dissolved in solvent and deposited on to substrates in a manner similar to those described for prepolymeric materials.

In certain embodiments, the prepolymer can be shaped and cured using a mold. For example, in one embodiment, the prepolymer (i.e., in liquid or solvent-admixed form) can be deposited (e.g., by pouring) into a TEFLON or silicone (e.g., polydimethylsiloxane (PDMS)) mold, then cured to form a desired shape. In another embodiment, a softened prepolymer material (e.g., swollen with solvent and/or softened by heat) can be imprinted by stamping with a mold bearing the desired inverse surface relief, then cured and allowed to cool. Moreover, in many embodiments, even fully cured copolymers as described herein can be shaped with a mold in a manner similar to those described for prepolymeric materials. Sulfur terpolymers and more complex copolymer materials, such as in the form of cross-linked polymers, or non-crosslinked, intractable polymers, can be reprocessed by thermal or other stimuli activation of dynamic S—S bonds in the polymer system.

As described above, soluble sulfur polymers can be made by the person of skill in the art, for example, using relatively higher fractions of organic monomer(s). Such polymers can be solution processed to fabricate articles. For example, another aspect of the invention is a method of forming an article formed from a sulfur polymer as described herein, the method comprising admixing the sulfur polymer with a nonpolar organic solvent (e.g., to make a suspension or solution), forming the admixed sulfur polymer into the shape of the article, and removing the solvent from the sulfur polymer to yield the article. The admixture with solvent can, for example, dissolve the sulfur polymer. Various process steps can be performed at elevated temperatures, for example, to decrease viscosity of the admixed sulfur polymer and to aid in evaporation of solvent.

For example, in one embodiment, a room temperature solution of any sulfur polymer described herein (e.g., in prepolymeric form) is poured into a TEFLON or PDMS mold. A decrease in viscosity at elevated temperatures (e.g., > about 140° C.) can allow sufficient flow into even intricate mold shapes. Once the mold is filled, it can be placed in a vacuum oven at increased temperature (e.g., about 210° C.) under ambient pressure to cure and to drive off solvent. For thicker molded samples, vacuum can be pulled on the solution when it is in a low viscosity state in order to ensure the removal of bubbles. The mold is then removed from the oven and allowed to cool before removal from the mold.

As the polymeric materials described herein can be effectively thermoplastic in nature, the person of skill in the art will understand that other methods familiar in the thermoplastic industries, such as injection molding, compression molding, and melt casting, can be used in forming articles from the materials described herein.

The chemistry via the copolymerization of the one or more monomers of amine monomers, thiol monomers, sulfide monomers, alkynylly unsaturated monomers, nitrone monomers, aldehyde monomers, and ketone monomers in liquid as used herein produce these advantageous sulfur copolymer compositions. For example, the amine monomer, such as those on aromatic compounds, results in direct C—S bond formation and copolymerization with sulfur concurrently. Thiol monomers from a wide range of comonomer precursors widely used in the preparation of condensation polymers can be dissolved and copolymerization with liquid sulfur to afford high sulfur content copolymers. Unexpectedly, the thiol derived copolymer was solution processable despite the high content of sulfur and rigid aromatic moieties. Sulfide monomers can copolymerize with sulfur via either ionic, or free radical processes. Unexpectedly, the sulfide monomer was able to afford both low glass transition polymers, or higher glass transition polymers. As another example, the alkynylly unsaturated monomer is expected to react via known thiol-yne processes, however, unexpectedly, the alkynylly unsaturated monomer was able to afford polythiophene and other heterocycles. The nitrone monomer is expected to react via free radical polymerizations with sulfur radicals. Unexpectedly, the nitrone monomer was designed to afford polymeric materials when copolymerized with elemental sulfur. Aldehyde based monomers are not expected to react with sulfur radicals, however, the formation of polymers was observed when the appropriate di-, or multifunctional aldehydes are copolymerized with sulfur. Ketone based monomers are not expected to react with sulfur radicals, however, the formation of polymers was observed when the appropriate di-, or multifunctional ketones are copolymerized with sulfur.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. An optical sulfur copolymer comprising:
   a. sulfur monomers comprising sulfur chains derived from $S_8$, at a level of about 50-95 wt % of the optical sulfur copolymer;
   b. one or more comonomers each selected from a group consisting of amine monomers, thiol monomers, sulfide monomers, alkynylly unsaturated monomers, epoxide monomers, nitrone monomers, aldehyde monomers, ketone monomers, thiirane monomers, and ethylenically unsaturated monomers at a level in the range of about 1-49 wt % of the optical sulfur copolymer; and
   c. one or more selenium comonomers at a level of about 1-49 wt % of the optical sulfur copolymer;
   wherein the one or more selenium comonomers copolymerize with the sulfur chains derived from $S_8$;
   wherein the optical sulfur copolymer is transparent in an infrared spectrum.

2. The optical sulfur copolymer of claim 1, wherein the optical sulfur copolymer has a refractive index of about 1.78-2.6 at a wavelength in a range of about 500 nm to about 10 μm.

3. The optical sulfur copolymer of claim 1, wherein the one or more selenium comonomers have the formula $Se_n S_{(8-n)}$, where n is an integer that can range from 1-7; or
   wherein the selenium comonomers have the formula $Se_n S_m$, where n is an integer that can range from 1-7 and m is an integer that can range from 1-7.

4. The optical sulfur copolymer of claim 1, wherein the optical sulfur copolymer is transparent in an electromagnetic spectrum having a wavelength range of about 1000-1500 nm.

5. The optical sulfur copolymer of claim 1, wherein the optical sulfur copolymer is transparent in an electromagnetic spectrum having a wavelength range of about 3000-5000 nm.

6. The optical sulfur copolymer of claim 1, wherein the optical sulfur copolymer is transparent in an electromagnetic spectrum having a wavelength range of about 3-20 microns.

7. The optical sulfur copolymer of claim 1, wherein at least one functional sulfur moiety of the sulfur monomers is bonded to at least one functional moiety of the one or more monomers.

8. The optical sulfur copolymer of claim 1, wherein in addition to the sulfur monomers, the one or more comonomers, and the one or more selenium monomers, the sulfur copolymer further comprises one or more epoxide monomers at a level in the range of about 10 wt % to about 50 wt % of the optical sulfur copolymer.

9. The optical sulfur copolymer of claim 1, wherein in addition to the sulfur monomers, the one or more comonomers, and the one or more selenium monomers, the sulfur copolymer further comprises one or more of a fourth monomer selected from a group consisting of amine monomers, thiol monomers, sulfide monomers, alkynylly unsaturated monomers, epoxide monomers, nitrone monomers, aldehyde monomers, ketone monomers, thiirane monomers, and ethylenically unsaturated monomers at a level in the range of about 10 wt % to about 50 wt % of the optical sulfur copolymer.

10. The optical sulfur copolymer of claim 1, wherein in addition to the sulfur monomers, the one or more comonomers, and the one or more selenium monomers, the sulfur copolymer further comprises one or more polyfunctional monomers selected from a group consisting of a polyvinyl monomer, a polyisopropenyl monomer, a polyacryl monomer, a polymethacryl monomer, a polyunsaturated hydrocarbon monomer, a polyepoxide monomer, a polythiirane monomer, a polyalkynyl monomer, a polydiene monomer, a polybutadiene monomer, a polyisoprene monomer, a polynorbornene monomer, a polyamine monomer, a polythiol monomer, a polysulfide monomer, a polyalkynylly unsaturated monomers, a polynitrone monomers, a polyaldehyde monomers, a polyketone monomers, and a polyethylenically unsaturated monomers, wherein the polyfunctional monomer has moieties that are the same or different.

11. The optical sulfur copolymer of claim 1, wherein the optical sulfur copolymer is processable in a solution.

12. The optical sulfur copolymer of claim 1, wherein the optical sulfur copolymer is melt processable.

13. The optical sulfur copolymer of claim 1, wherein the optical sulfur copolymer is self-healing upon reprocessing.

14. The optical sulfur copolymer of claim 1, wherein the optical sulfur copolymer is formed into a transparent substrate.

15. The optical sulfur copolymer of claim 14, wherein the transparent substrate is a film, a lens, a window, or a free-standing object.

16. The optical sulfur copolymer of claim 1, wherein the optical sulfur copolymer is coated on a substrate and cured as a thin film.

17. The optical sulfur copolymer of claim 1, wherein the optical sulfur copolymer is shaped and cured using a mold.

18. The optical sulfur copolymer of claim 1, wherein the optical sulfur copolymer is fabricated into an optical device component for use as a transmitting material in an infrared imaging device.

* * * * *